US011933075B2

(12) United States Patent
Pavlovic et al.

(10) Patent No.: US 11,933,075 B2
(45) **Date of Patent: *Mar. 19, 2024**

(54) ELECTRONIC LOCK STATE DETECTION SYSTEMS AND METHODS

(71) Applicant: Knox Associates, Inc., Phoenix, AZ (US)

(72) Inventors: Bryan E. Pavlovic, Cave Creek, AZ (US); Tamara Hatzinger, Phoenix, AZ (US); Dominik Scheffler, Phoenix, AZ (US); Howard Needham, Scottsdale, AZ (US); Jason Pedersen, Glendale, AZ (US); John Kowalski, Phoenix, AZ (US); Timothy Sherack, Litchfield Park, AZ (US); William James, Crestview, FL (US)

(73) Assignee: KNOX Associates, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,614

(22) Filed: Dec. 28, 2022

(65) Prior Publication Data

US 2023/0287709 A1 Sep. 14, 2023

Related U.S. Application Data

(63) Continuation of application No. 17/119,967, filed on Dec. 11, 2020, now Pat. No. 11,598,121, which is a (Continued)

(51) Int. Cl.

| | |
|---|---|
| ***E05B 47/02*** | (2006.01) |
| ***G07C 9/00*** | (2020.01) |
| *E05B 47/00* | (2006.01) |

(52) U.S. Cl.
CPC .......... *E05B 47/02* (2013.01); *G07C 9/00571* (2013.01); *E05B 47/0012* (2013.01)

(58) Field of Classification Search
CPC . E05B 47/02; E05B 47/0012; G07C 9/00571; G07C 2009/00587;

(Continued)

(56) References Cited

U.S. PATENT DOCUMENTS 1,341,876 A 6/1920 Benham
1,345,574 A 7/1920 Benham (Continued)

FOREIGN PATENT DOCUMENTS

WO WO 2014 089156 6/2014

OTHER PUBLICATIONS

US 9,039,431 B2, 05/2015, Johnson (withdrawn)

(Continued)

*Primary Examiner* — Sisay Yacob
(74) *Attorney, Agent, or Firm* — Knobbe, Martens, Olson & Bear LLP

(57) ABSTRACT

An electronic key may include a partial capacitor comprising a capacitive metal plate in communication with a processor. The capacitive metal plate of the partial capacitor is configured to form a capacitor with a corresponding capacitive metal plate of a lock when brought into proximity with the metal plate of the lock. Data may be transferred from the key to the lock using a capacitor formed by combining the two metal plates, wherein a common ground is established between the metal plate of the key and the metal plate of the lock through a parasitic capacitance present between the key and lock circuitry. Audit trail data may be recorded based on usage of the key.

20 Claims, 57 Drawing Sheets

Related U.S. Application Data continuation of application No. 16/574,801, filed on Sep. 18, 2019, now Pat. No. 10,890,015.

(60) Provisional application No. 62/734,742, filed on Sep. 21, 2018.

(58) Field of Classification Search
CPC .......... G07C 2009/00761; G07C 2009/00777; G07C 2209/62; G07C 9/00309; G07C 9/00714; G07C 9/00896
See application file for complete search history.

(56) References Cited

U.S. PATENT DOCUMENTS 1,345,575 A 7/1920 Benham et al.
1,400,135 A 12/1921 Benham et al.
1,451,036 A 4/1923 Benham
1,522,572 A 1/1925 Benham
1,522,573 A 1/1925 Benham
1,534,495 A 4/1925 Benham
1,543,447 A 6/1925 Willey
1,546,001 A 7/1925 Benham et al.
1,561,207 A 11/1925 Benham
1,561,901 A 11/1925 Benham
1,573,536 A 2/1926 Benham
1,607,385 A 11/1926 Benham
1,611,712 A 12/1926 Benham et al.
1,630,238 A 5/1927 Benham
1,645,407 A 10/1927 Harry
1,646,987 A 10/1927 Benham
1,665,015 A 4/1928 Benham
1,665,016 A 4/1928 Benham et al.
1,691,030 A 11/1928 Benham et al.
1,718,606 A 6/1929 Soref
1,722,070 A 7/1929 Benham
1,722,071 A 7/1929 Benham
1,826,595 A 10/1931 Benham
1,845,354 A 2/1932 Soref
1,938,941 A 12/1933 Soref
1,942,045 A 1/1934 Benham
1,967,109 A 7/1934 Benham
2,083,816 A 6/1937 Benham
2,095,429 A 10/1937 Benham
2,105,337 A 1/1938 Soref et al.
2,113,864 A 4/1938 Soref et al.
2,127,089 A 8/1938 Schamp et al.
2,127,091 A 8/1938 Soref et al.
2,136,435 A 11/1938 Habram et al.
2,152,258 A 3/1939 Hirn
2,160,294 A 5/1939 Soref
2,169,907 A 8/1939 Soref et al.
2,170,097 A 8/1939 Soref et al.
2,173,720 A 9/1939 Keith et al.
2,191,694 A 2/1940 Hirn
2,227,283 A 12/1940 Soref
2,285,328 A 6/1942 Clarkson et al.
2,352,190 A 6/1944 John et al.
2,460,474 A 2/1949 Soref et al.
2,471,291 A 5/1949 Soref et al.
2,487,608 A 11/1949 Soref et al.
2,520,742 A 8/1950 Soref et al.
2,563,754 A 8/1951 Soref
2,565,440 A 8/1951 Soref et al.
2,766,608 A 10/1956 Hirn
2,766,609 A 10/1956 Hirn
2,766,610 A 10/1956 Hirn
2,820,360 A 1/1958 Soref et al.
2,824,439 A 2/1958 Soref et al.
2,842,950 A 7/1958 Soref et al.
2,857,045 A 10/1958 Foote et al.
2,858,691 A 11/1958 Hoffman
2,867,110 A 1/1959 Foote et al.
2,893,231 A 7/1959 Soref et al.
2,893,232 A 7/1959 Foote et al.
2,949,185 A 8/1960 Foote et al.
3,023,600 A 3/1962 Samuel et al.
3,023,602 A 3/1962 Foote et al.
3,031,876 A 5/1962 Foote et al.
3,031,877 A 5/1962 Foote et al.
3,050,977 A 8/1962 Foote et al.
3,052,114 A 9/1962 Foote et al.
3,073,145 A 1/1963 Potzick
3,190,089 A 6/1965 Foote et al.
3,236,372 A 2/1966 Foote
3,289,830 A 12/1966 Foote
3,373,583 A 3/1968 Parrock
3,378,908 A 4/1968 Buller
3,389,586 A 6/1968 Foote
3,392,471 A 7/1968 Foote
3,408,842 A 11/1968 Barnes et al.
3,422,560 A 1/1969 Foote
3,422,643 A 1/1969 Foote
3,422,644 A 1/1969 Foote
3,423,968 A 1/1969 Foote
3,423,969 A 1/1969 Foote
3,453,758 A 7/1969 Soref et al.
3,453,846 A 7/1969 Owen et al.
3,473,352 A 10/1969 Foote
3,475,930 A 11/1969 Foote
3,475,931 A 11/1969 Foote
3,476,429 A 11/1969 Foote
3,526,110 A 9/1970 Foote
3,548,486 A 12/1970 Foote
3,563,067 A 2/1971 Foote
3,572,063 A 3/1971 Foote
3,586,163 A 6/1971 Loehrer et al.
3,598,931 A 8/1971 Foote
3,624,945 A 12/1971 Foote
3,635,057 A 1/1972 Foote et al.
3,664,163 A 5/1972 Foote
3,667,260 A 6/1972 Foote
3,736,781 A 6/1973 Foote
3,742,742 A 7/1973 Foote
3,765,197 A 10/1973 Foote
3,783,656 A 1/1974 Foote
3,783,657 A 1/1974 Foote
3,787,082 A 1/1974 Foote
3,797,947 A 3/1974 Foote
3,835,676 A 9/1974 Foote
3,838,585 A 10/1974 Foote
3,908,415 A 9/1975 Foote
3,943,738 A 3/1976 Foote
3,977,221 A 8/1976 Foote
3,983,724 A 10/1976 Foote
4,047,406 A 9/1977 Foote
D250,990 S 2/1979 Hanneman et al.
4,180,996 A 1/1980 Lebrecht
4,185,478 A 1/1980 Stintzi
D281,949 S 12/1985 Hartmann et al.
4,569,545 A 2/1986 Hartmann et al.
4,615,191 A 10/1986 Grandy
D292,869 S 11/1987 Lebrecht
4,730,467 A 3/1988 Lebrecht
5,003,279 A 3/1991 Morinaga et al.
5,033,279 A 7/1991 Lebrecht
5,044,180 A 9/1991 Lebrecht
D324,162 S 2/1992 Lebrecht
D325,158 S 4/1992 Lebrecht
5,109,684 A 5/1992 Grandy, Sr.
D332,388 S 1/1993 Marotto
5,249,444 A 10/1993 Dancs
D341,766 S 11/1993 Zacher et al.
D342,009 S 12/1993 Lebrecht et al.
D342,010 S 12/1993 Lebrecht et al.
5,456,503 A 10/1995 Russell, IV
5,501,492 A 3/1996 Kajuch
5,513,505 A 5/1996 Dancs
5,516,160 A 5/1996 Kajuch
5,572,890 A 11/1996 Carpenter
5,647,617 A 7/1997 Kajuch
5,697,239 A 12/1997 Hanneman et al.
5,712,626 A 1/1998 Andreou et al.
5,713,612 A 2/1998 Kajuch

(56) References Cited

U.S. PATENT DOCUMENTS

| | | | |
|---|---|---|---|
| 5,735,153 | A | 4/1998 | Hanneman et al. |
| 5,755,121 | A | 5/1998 | Crass |
| 5,775,121 | A | 7/1998 | Kuma et al. |
| 5,794,925 | A | 8/1998 | Fantl et al. |
| 5,819,560 | A | 10/1998 | Grahovec et al. |
| 5,839,309 | A | 11/1998 | Fantl et al. |
| D406,043 | S | 2/1999 | Leclaire |
| D423,323 | S | 4/2000 | Fiegener et al. |
| D423,906 | S | 5/2000 | Fiegener et al. |
| D423,907 | S | 5/2000 | Fiegener et al. |
| D424,911 | S | 5/2000 | Geringer et al. |
| D425,397 | S | 5/2000 | Fiegener et al. |
| D425,398 | S | 5/2000 | Fiegener et al. |
| D425,400 | S | 5/2000 | Geringer et al. |
| D425,777 | S | 5/2000 | Geringer et al. |
| D426,763 | S | 6/2000 | Adler et al. |
| D427,503 | S | 7/2000 | Brockman et al. |
| D428,794 | S | 8/2000 | Fiegener et al. |
| 6,109,076 | A | 8/2000 | Kajuch |
| D432,390 | S | 10/2000 | Geringer et al. |
| D432,391 | S | 10/2000 | Heppner |
| D436,902 | S | 1/2001 | Kajuch et al. |
| D437,204 | S | 2/2001 | Kajuch et al. |
| D437,768 | S | 2/2001 | Grosz et al. |
| D439,823 | S | 4/2001 | Adler et al. |
| D440,861 | S | 4/2001 | Thompson |
| 6,263,713 | B1 | 7/2001 | Fantl |
| 6,305,198 | B1 | 10/2001 | Chastain et al. |
| D457,113 | S | 5/2002 | Zapushek et al. |
| D457,802 | S | 5/2002 | Meekma et al. |
| 6,389,857 | B1 | 5/2002 | Meekma et al. |
| 6,393,874 | B1 | 5/2002 | Zapushek et al. |
| D458,530 | S | 6/2002 | Grosz et al. |
| 6,401,501 | B1 | 6/2002 | Kajuch et al. |
| 6,401,505 | B1 | 6/2002 | Kajuch et al. |
| D461,392 | S | 8/2002 | Zapushek |
| 6,434,981 | B2 | 8/2002 | Fantl et al. |
| D462,735 | S | 9/2002 | Rohde et al. |
| D468,991 | S | 1/2003 | Makos et al. |
| D469,332 | S | 1/2003 | Meekma et al. |
| 6,539,758 | B2 | 4/2003 | Meekma et al. |
| D474,100 | S | 5/2003 | Zapushek |
| 6,629,440 | B1 | 10/2003 | Meekma et al. |
| D484,391 | S | 12/2003 | Hackbarth et al. |
| D484,777 | S | 1/2004 | Ruan |
| 6,705,137 | B2 | 3/2004 | Saladin et al. |
| 6,708,534 | B1 | 3/2004 | Ruan |
| 6,755,054 | B2 | 6/2004 | Burmesch et al. |
| 6,766,671 | B2 | 7/2004 | Haczynski et al. |
| D495,238 | S | 8/2004 | Handel et al. |
| D500,949 | S | 1/2005 | Handel |
| 6,846,002 | B2 | 1/2005 | Irgens et al. |
| 6,854,302 | B2 | 2/2005 | Zapushek et al. |
| 6,862,905 | B2 | 3/2005 | Zapushek |
| 6,865,914 | B2 | 3/2005 | Irgens et al. |
| D506,122 | S | 6/2005 | Welch |
| D506,665 | S | 6/2005 | Sun et al. |
| D506,667 | S | 6/2005 | Welch |
| 6,904,775 | B2 | 6/2005 | Makos et al. |
| D507,473 | S | 7/2005 | Welch |
| D507,474 | S | 7/2005 | Welch |
| D507,480 | S | 7/2005 | Kopp et al. |
| D511,291 | S | 11/2005 | Van Handel |
| D511,292 | S | 11/2005 | Hohmann et al. |
| D512,900 | S | 12/2005 | Tarter et al. |
| 6,978,647 | B2 | 12/2005 | Edwards, Jr. et al. |
| D514,409 | S | 2/2006 | Kopp et al. |
| D515,908 | S | 2/2006 | Kearns et al. |
| 7,006,483 | B2 | 2/2006 | Nelson, Jr. et al. |
| D516,408 | S | 3/2006 | Kearns et al. |
| D516,896 | S | 3/2006 | Kearns et al. |
| D517,396 | S | 3/2006 | Tarter et al. |
| D518,353 | S | 4/2006 | Van Handel |
| D518,357 | S | 4/2006 | Kearns et al. |
| D519,364 | S | 4/2006 | Kopp et al. |
| D520,339 | S | 5/2006 | Heppner |
| D521,359 | S | 5/2006 | Welch |
| 7,040,126 | B2 | 5/2006 | Edwards, Jr. |
| 7,066,483 | B2 | 6/2006 | Makos et al. |
| D524,142 | S | 7/2006 | Recknagel et al. |
| D524,144 | S | 7/2006 | Recknagel et al. |
| D524,145 | S | 7/2006 | Heppner |
| D524,632 | S | 7/2006 | Kearns et al. |
| D525,519 | S | 7/2006 | Van Handel et al. |
| D525,857 | S | 8/2006 | Recknagel et al. |
| D525,861 | S | 8/2006 | Mackey et al. |
| D528,401 | S | 9/2006 | Ruan |
| D528,402 | S | 9/2006 | Ruan |
| D528,409 | S | 9/2006 | Kopp et al. |
| 7,104,563 | B2 | 9/2006 | Makos et al. |
| D529,368 | S | 10/2006 | Ruan |
| D529,369 | S | 10/2006 | Ruan |
| D529,786 | S | 10/2006 | Heppner |
| D531,008 | S | 10/2006 | Recknagel et al. |
| D533,002 | S | 12/2006 | Recknagel et al. |
| D533,435 | S | 12/2006 | Kearns et al. |
| D533,437 | S | 12/2006 | Ruan |
| D533,764 | S | 12/2006 | Heppner |
| 7,145,237 | B2 | 12/2006 | Teraguchi |
| D535,555 | S | 1/2007 | Kopp et al. |
| D535,629 | S | 1/2007 | Kalous et al. |
| D536,236 | S | 2/2007 | Recknagel et al. |
| D537,320 | S | 2/2007 | Kearns et al. |
| D537,703 | S | 3/2007 | Kearns et al. |
| D537,704 | S | 3/2007 | Van Handel |
| D539,633 | S | 4/2007 | Van Handel |
| D540,160 | S | 4/2007 | Konop et al. |
| D540,653 | S | 4/2007 | Blomstrom |
| D541,135 | S | 4/2007 | Kalous et al. |
| 7,197,904 | B2 | 4/2007 | Marcelle et al. |
| 7,207,199 | B2 | 4/2007 | Smith et al. |
| D541,630 | S | 5/2007 | Blomstrom et al. |
| D541,631 | S | 5/2007 | Heppner |
| D542,625 | S | 5/2007 | Blomstrom et al. |
| D545,104 | S | 6/2007 | Sheridan et al. |
| 7,225,651 | B2 | 6/2007 | Edwards et al. |
| D546,663 | S | 7/2007 | Recknagel et al. |
| D547,161 | S | 7/2007 | Blomstrom et al. |
| D547,162 | S | 7/2007 | Heppner |
| D548,042 | S | 8/2007 | Smyczek et al. |
| D548,045 | S | 8/2007 | Heppner |
| D548,047 | S | 8/2007 | Kearns |
| D548,594 | S | 8/2007 | Van Handel et al. |
| D549,554 | S | 8/2007 | Heppner |
| 7,262,376 | B2 | 8/2007 | Brojanac et al. |
| 7,266,981 | B2 | 9/2007 | Flory et al. |
| 7,267,355 | B2 | 9/2007 | Irgens et al. |
| 7,273,223 | B2 | 9/2007 | Irgens et al. |
| D556,541 | S | 12/2007 | Blomstrom et al. |
| D557,107 | S | 12/2007 | Van Handel et al. |
| D557,591 | S | 12/2007 | Mackey |
| D558,025 | S | 12/2007 | Rohde et al. |
| 7,306,275 | B2 | 12/2007 | Kalous |
| D559,103 | S | 1/2008 | Van Handel et al. |
| D560,565 | S | 1/2008 | Kalous |
| 7,316,534 | B2 | 1/2008 | Hohmann et al. |
| D561,001 | S | 2/2008 | Rohde et al. |
| D561,005 | S | 2/2008 | Rohde et al. |
| D561,011 | S | 2/2008 | Van Handel |
| 7,334,443 | B2 | 2/2008 | Meekma et al. |
| D563,200 | S | 3/2008 | Nave et al. |
| D563,764 | S | 3/2008 | Hacker |
| D564,337 | S | 3/2008 | Brojanac et al. |
| D564,859 | S | 3/2008 | Brojanac et al. |
| 7,337,639 | B2 | 3/2008 | Edwards, Jr. |
| 7,348,504 | B2 | 3/2008 | Brojanac |
| D565,297 | S | 4/2008 | Stevens et al. |
| D566,521 | S | 4/2008 | Rohde et al. |
| D567,628 | S | 4/2008 | Rohde et al. |
| 7,353,671 | B2 | 4/2008 | Recknagel et al. |
| 7,360,380 | B2 | 4/2008 | Van Handel |
| D568,145 | S | 5/2008 | Handel |
| D569,609 | S | 5/2008 | Hacker |
| 7,367,683 | B2 | 5/2008 | Marcelle et al. |

(56) References Cited

U.S. PATENT DOCUMENTS

| | | | |
|---|---|---|---|
| D570,667 | S | 6/2008 | Zapushek et al. |
| D571,207 | S | 6/2008 | Rozanski |
| D571,208 | S | 6/2008 | Rozanski |
| D571,209 | S | 6/2008 | Rozanski |
| D571,210 | S | 6/2008 | Rozanski |
| D571,211 | S | 6/2008 | Rozanski |
| D571,212 | S | 6/2008 | Rozanski |
| D571,658 | S | 6/2008 | Rozanski |
| D571,659 | S | 6/2008 | Rozanski |
| D571,660 | S | 6/2008 | Rozanski |
| 7,380,425 | B2 | 6/2008 | Elliott et al. |
| 7,382,250 | B2 | 6/2008 | Marcelle et al. |
| D572,132 | S | 7/2008 | Rozanski |
| D573,870 | S | 7/2008 | Hacker |
| D573,871 | S | 7/2008 | Nave et al. |
| D574,629 | S | 8/2008 | Kalkwarf |
| 7,415,850 | B2 | 8/2008 | Smyczek et al. |
| D576,859 | S | 9/2008 | Blomstrom et al. |
| D576,860 | S | 9/2008 | Blomstrom et al. |
| D576,861 | S | 9/2008 | Blomstrom et al. |
| D576,862 | S | 9/2008 | Blomstrom et al. |
| D576,863 | S | 9/2008 | Blomstrom et al. |
| D576,864 | S | 9/2008 | Blomstrom et al. |
| D577,195 | S | 9/2008 | Stevens et al. |
| D577,278 | S | 9/2008 | Rohde et al. |
| D577,279 | S | 9/2008 | Rohde et al. |
| D577,523 | S | 9/2008 | Mehmen |
| D577,571 | S | 9/2008 | Stevens |
| 7,419,177 | B2 | 9/2008 | Kottke et al. |
| D578,757 | S | 10/2008 | Stevens et al. |
| D578,758 | S | 10/2008 | Stevens et al. |
| D578,864 | S | 10/2008 | Rohde et al. |
| D578,884 | S | 10/2008 | Rozanski |
| D580,195 | S | 11/2008 | Daino et al. |
| 7,448,236 | B2 | 11/2008 | Recknagel et al. |
| D582,251 | S | 12/2008 | Mackey et al. |
| D583,218 | S | 12/2008 | Nave et al. |
| 7,469,919 | B2 | 12/2008 | Kalous et al. |
| D584,605 | S | 1/2009 | Hedlund et al. |
| 7,481,085 | B2 | 1/2009 | Rohde et al. |
| D587,014 | S | 2/2009 | Hand |
| D587,047 | S | 2/2009 | Kalkwarf |
| D588,849 | S | 3/2009 | Kalkwarf |
| 7,497,705 | B2 | 3/2009 | Larson et al. |
| 7,501,593 | B2 | 3/2009 | Brojanac |
| D591,091 | S | 4/2009 | Daino et al. |
| 7,516,631 | B2 | 4/2009 | Hacker et al. |
| 7,516,843 | B2 | 4/2009 | Konop et al. |
| D592,485 | S | 5/2009 | Stevens |
| 7,526,933 | B2 | 5/2009 | Meekma |
| 7,535,346 | B2 | 5/2009 | Kalous |
| D594,311 | S | 6/2009 | Stevens |
| D594,731 | S | 6/2009 | Plato |
| 7,540,175 | B2 | 6/2009 | Kalous et al. |
| 7,543,838 | B2 | 6/2009 | Jacques |
| D595,506 | S | 7/2009 | Hacker |
| D595,563 | S | 7/2009 | Stevens |
| 7,556,229 | B2 | 7/2009 | Elliott et al. |
| 7,581,420 | B2 | 9/2009 | Manthe et al. |
| 7,581,423 | B2 | 9/2009 | Brojanac et al. |
| D602,723 | S | 10/2009 | Daino et al. |
| 7,610,784 | B2 | 11/2009 | Rohde et al. |
| D605,494 | S | 12/2009 | Plato |
| D605,928 | S | 12/2009 | Stevens et al. |
| D606,382 | S | 12/2009 | Stevens |
| D606,841 | S | 12/2009 | Stevens |
| D606,842 | S | 12/2009 | Stevens et al. |
| D607,175 | S | 12/2009 | Stevens |
| 7,624,489 | B2 | 12/2009 | Rohde et al. |
| D611,272 | S | 3/2010 | Daino |
| D615,275 | S | 5/2010 | Hacker |
| 7,708,140 | B2 | 5/2010 | Konop et al. |
| 7,712,343 | B2 | 5/2010 | Smith et al. |
| 7,743,917 | B2 | 6/2010 | Konop et al. |
| 7,752,876 | B2 | 7/2010 | Meekma et al. |
| D624,389 | S | 9/2010 | Stevens et al. |
| D628,877 | S | 12/2010 | Stevens |
| D629,280 | S | 12/2010 | Plato |
| D629,290 | S | 12/2010 | Stevens et al. |
| D631,225 | S | 1/2011 | Plato |
| D631,323 | S | 1/2011 | Stevens et al. |
| 7,866,771 | B2 | 1/2011 | Daino et al. |
| 7,870,764 | B2 | 1/2011 | Burmesch |
| 7,870,767 | B2 | 1/2011 | Brojanac et al. |
| D633,371 | S | 3/2011 | Stevens et al. |
| D634,915 | S | 3/2011 | Nave et al. |
| D635,324 | S | 3/2011 | Plato |
| D635,325 | S | 3/2011 | Plato |
| 7,905,351 | B2 | 3/2011 | Konop et al. |
| D637,062 | S | 5/2011 | Plato |
| D638,278 | S | 5/2011 | Plato |
| D638,279 | S | 5/2011 | Plato |
| D638,684 | S | 5/2011 | Stevens |
| 7,934,405 | B2 | 5/2011 | Burmesch et al. |
| 7,948,359 | B2 | 5/2011 | Marcelle et al. |
| D640,126 | S | 6/2011 | Plato |
| D640,127 | S | 6/2011 | Stevens |
| D640,445 | S | 6/2011 | Stevens |
| 7,963,134 | B2 | 6/2011 | Rafferty et al. |
| D641,232 | S | 7/2011 | Stevens |
| 7,977,590 | B2 | 7/2011 | Brojanac |
| 7,984,630 | B2 | 7/2011 | Peot et al. |
| 8,020,885 | B2 | 9/2011 | Cuellar et al. |
| D646,552 | S | 10/2011 | Plato |
| D646,952 | S | 10/2011 | Plato et al. |
| 8,028,551 | B2 | 10/2011 | Kalous |
| 8,031,061 | B2 | 10/2011 | Kalous |
| D648,207 | S | 11/2011 | Johnson |
| 8,056,377 | B2 | 11/2011 | Hacker |
| D650,548 | S | 12/2011 | Meekma et al. |
| 652,707 | A1 | 1/2012 | Plato et al. |
| D653,102 | S | 1/2012 | Kalous |
| 8,099,985 | B2 | 1/2012 | Burmesch et al. |
| D654,654 | S | 2/2012 | Meekma et al. |
| D655,885 | S | 3/2012 | Meekma et al. |
| D656,384 | S | 3/2012 | Wojtak |
| D659,344 | S | 5/2012 | Meekma et al. |
| D659,345 | S | 5/2012 | Meekma et al. |
| D660,130 | S | 5/2012 | Plato |
| 8,166,783 | B2 | 5/2012 | Burmesch et al. |
| D661,562 | S | 6/2012 | Stevens et al. |
| D664,024 | S | 7/2012 | Plato |
| D671,389 | S | 11/2012 | Plato |
| 8,302,435 | B2 | 11/2012 | Burmesch et al. |
| D673,836 | S | 1/2013 | Stevens et al. |
| 8,347,671 | B2 | 1/2013 | Brojanac et al. |
| D675,498 | S | 2/2013 | Stevens et al. |
| 8,375,751 | B2 | 2/2013 | Hacker |
| 8,402,798 | B2 | 3/2013 | Brojanac et al. |
| D679,168 | S | 4/2013 | Stevens et al. |
| 8,408,609 | B2 | 4/2013 | Brojanac |
| 8,419,083 | B2 | 4/2013 | Burmesch |
| 8,424,349 | B2 | 4/2013 | Marcelle et al. |
| D681,411 | S | 5/2013 | Qin et al. |
| 8,453,481 | B2 | 6/2013 | Meekma |
| 8,459,070 | B2 | 6/2013 | Johnson et al. |
| D685,250 | S | 7/2013 | Stevens et al. |
| D685,252 | S | 7/2013 | Stevens et al. |
| D688,114 | S | 8/2013 | Stevens |
| D688,546 | S | 8/2013 | Stevens et al. |
| D689,358 | S | 9/2013 | Stevens |
| 8,539,799 | B2 | 9/2013 | Nave |
| D691,458 | S | 10/2013 | Stevens |
| D691,869 | S | 10/2013 | Plato |
| D691,870 | S | 10/2013 | Stevens |
| 8,544,301 | B2 | 10/2013 | Nave |
| 8,555,686 | B2 | 10/2013 | Meekma et al. |
| D692,745 | S | 11/2013 | Stevens |
| D694,090 | S | 11/2013 | Nave |
| 8,573,010 | B2 | 11/2013 | Burmesch et al. |
| D695,589 | S | 12/2013 | Stevens et al. |
| 8,607,600 | B2 | 12/2013 | Burmesch et al. |
| D698,225 | S | 1/2014 | Stevens et al. |
| D700,826 | S | 3/2014 | Qin |

(56) References Cited

U.S. PATENT DOCUMENTS

| | | | | |
|---|---|---|---|---|
| D701,105 | S | 3/2014 | Stevens | |
| D701,106 | S | 3/2014 | Plato | |
| D701,745 | S | 4/2014 | Stevens | |
| D701,746 | S | 4/2014 | Stevens et al. | |
| D702,102 | S | 4/2014 | Stevens | |
| D702,528 | S | 4/2014 | Nave | |
| D703,023 | S | 4/2014 | Kalous et al. | |
| D703,024 | S | 4/2014 | Paulson et al. | |
| D703,025 | S | 4/2014 | Stevens | |
| D703,514 | S | 4/2014 | Stevens et al. | |
| 8,695,385 | B2 | 4/2014 | Meekma et al. | |
| 8,707,745 | B2 | 4/2014 | Kalous | |
| D704,032 | S | 5/2014 | Plato | |
| D704,531 | S | 5/2014 | Stevens | |
| D704,532 | S | 5/2014 | Stevens et al. | |
| D704,533 | S | 5/2014 | Nave | |
| D705,038 | S | 5/2014 | Stevens | |
| D705,641 | S | 5/2014 | Stevens et al. | |
| D706,113 | S | 6/2014 | Nave | |
| D706,114 | S | 6/2014 | Nave | |
| D706,115 | S | 6/2014 | Nave | |
| D707,101 | S | 6/2014 | Stevens | |
| D707,530 | S | 6/2014 | Nave | |
| D707,531 | S | 6/2014 | Nave | |
| 8,739,588 | B2 | 6/2014 | Burmesch et al. | |
| 8,769,999 | B2 | 7/2014 | Nave | |
| D710,182 | S | 8/2014 | Walczak et al. | |
| 8,806,905 | B2 | 8/2014 | Burmesch et al. | |
| 8,806,907 | B2 | 8/2014 | Kalous et al. | |
| 8,839,649 | B1 | 9/2014 | Miller et al. | |
| 8,847,086 | B2 | 9/2014 | Wojtak | |
| 8,850,858 | B2 | 10/2014 | Nave | |
| D720,203 | S | 12/2014 | Plato | |
| D720,204 | S | 12/2014 | Ferragu | |
| 8,904,831 | B2 | 12/2014 | Stevens | |
| D720,600 | S | 1/2015 | Paulson | |
| D720,601 | S | 1/2015 | Paulson | |
| D720,602 | S | 1/2015 | Paulson | |
| D720,983 | S | 1/2015 | Paulson | |
| D722,262 | S | 2/2015 | Stevens | |
| D723,354 | S | 3/2015 | Stevens | |
| D724,412 | S | 3/2015 | Stevens | |
| D724,928 | S | 3/2015 | Kalous et al. | |
| D724,929 | S | 3/2015 | Kalous et al. | |
| D724,930 | S | 3/2015 | Kalous et al. | |
| D724,931 | S | 3/2015 | Dudgeon et al. | |
| D724,932 | S | 3/2015 | Stevens | |
| D725,458 | S | 3/2015 | Plato | |
| 8,985,448 | B2 | 3/2015 | Jonely | |
| 8,997,536 | B2 | 4/2015 | Fuller et al. | |
| 9,003,844 | B2 | 4/2015 | Barraza et al. | |
| 9,003,845 | B2 | 4/2015 | Boesel et al. | |
| 9,016,095 | B2 | 4/2015 | Dudgeon et al. | |
| D729,026 | S | 5/2015 | Qin et al. | |
| D729,038 | S | 5/2015 | Stevens | |
| D729,608 | S | 5/2015 | Kalous et al. | |
| 9,041,510 | B2 * | 5/2015 | Wolski | G07C 9/00182 340/5.6 |
| D732,920 | S | 6/2015 | Walczak et al. | |
| D732,921 | S | 6/2015 | Walczak et al. | |
| D732,922 | S | 6/2015 | Walczak et al. | |
| 9,059,713 | B2 | 6/2015 | Jonely et al. | |
| 9,093,772 | B2 | 7/2015 | Johnson | |
| 9,141,090 | B2 | 9/2015 | Kalous et al. | |
| D745,365 | S | 12/2015 | Dudgeon et al. | |
| 9,208,964 | B2 | 12/2015 | Dudgeon et al. | |
| D746,659 | S | 1/2016 | Stevens et al. | |
| D746,660 | S | 1/2016 | Stevens et al. | |
| 9,321,573 | B2 | 4/2016 | Rozanski | |
| D760,576 | S | 7/2016 | Plato | |
| 9,411,993 | B2 | 8/2016 | Jonely | |
| D767,368 | S | 9/2016 | Sanford | |
| 9,455,839 | B2 | 9/2016 | Conrad et al. | |
| 9,501,046 | B2 | 11/2016 | Kalous et al. | |
| 9,600,696 | B2 | 3/2017 | Ebner | |
| 9,600,949 | B2 | 3/2017 | Conrad et al. | |
| 9,806,551 | B2 | 10/2017 | Jonely | |
| 9,843,566 | B2 | 12/2017 | Smith et al. | |
| 9,892,073 | B1 | 2/2018 | Conrad | |
| 9,894,066 | B2 | 2/2018 | Conrad | |
| 9,916,466 | B2 | 3/2018 | Daino et al. | |
| 9,920,550 | B2 | 3/2018 | Ebner | |
| 9,942,840 | B2 | 4/2018 | Smith et al. | |
| 9,965,910 | B2 | 5/2018 | Kalous et al. | |
| 9,996,999 | B2 | 6/2018 | Conrad et al. | |
| 10,094,885 | B2 | 10/2018 | Kalous et al. | |
| 10,142,843 | B2 | 11/2018 | Conrad et al. | |
| D844,318 | S | 4/2019 | Weiland et al. | |
| 2002/0000110 | A1 | 1/2002 | Fantl et al. | |
| 2002/0095959 | A1 | 7/2002 | Meekma et al. | |
| 2002/0108407 | A1 | 8/2002 | Zapushek | |
| 2002/0159395 | A1 | 10/2002 | George, Jr. et al. | |
| 2003/0015007 | A1 | 1/2003 | Zapushek et al. | |
| 2003/0019258 | A1 | 1/2003 | Irgens et al. | |
| 2003/0020256 | A1 | 1/2003 | Irgens et al. | |
| 2003/0037582 | A1 | 2/2003 | Billy, Jr. et al. | |
| 2003/0046852 | A1 | 3/2003 | Burmesch et al. | |
| 2003/0115919 | A1 | 6/2003 | Haczynski et al. | |
| 2003/0159479 | A1 | 8/2003 | Kajuch et al. | |
| 2003/0233858 | A1 | 12/2003 | Saladin et al. | |
| 2003/0234719 | A1 | 12/2003 | Denison | |
| 2004/0011092 | A1 | 1/2004 | Haczynski et al. | |
| 2004/0011093 | A1 | 1/2004 | Fantl | |
| 2004/0016268 | A1 | 1/2004 | Makos et al. | |
| 2004/0035160 | A1 | 2/2004 | Meekma et al. | |
| 2004/0159133 | A1 | 8/2004 | Marcelle et al. | |
| 2004/0159136 | A1 | 8/2004 | Edwards et al. | |
| 2004/0164415 | A1 | 8/2004 | Teraguchi | |
| 2004/0182120 | A1 | 9/2004 | Flory et al. | |
| 2004/0211230 | A1 | 10/2004 | Recknagel et al. | |
| 2004/0240934 | A1 | 12/2004 | Makos et al. | |
| 2004/0265049 | A1 | 12/2004 | Hohmann et al. | |
| 2005/0001408 | A1 | 1/2005 | Irgens et al. | |
| 2005/0022618 | A1 | 2/2005 | Irgens et al. | |
| 2005/0039504 | A1 | 2/2005 | Smith et al. | |
| 2005/0050695 | A1 | 3/2005 | Mackey et al. | |
| 2005/0051458 | A1 | 3/2005 | Kopp et al. | |
| 2005/0072199 | A1 | 4/2005 | Edwards, Jr. | |
| 2005/0092037 | A1 | 5/2005 | Meekma et al. | |
| 2005/0104327 | A1 | 5/2005 | Irgens et al. | |
| 2005/0151349 | A1 | 7/2005 | Irgens et al. | |
| 2005/0166649 | A1 | 8/2005 | Meekma | |
| 2005/0199019 | A1 | 9/2005 | Marcelle et al. | |
| 2005/0199628 | A1 | 9/2005 | Van Handel et al. | |
| 2005/0201076 | A1 | 9/2005 | Marcelle et al. | |
| 2006/0005586 | A1 | 1/2006 | Smyczek et al. | |
| 2006/0032280 | A1 | 2/2006 | Edwards, Jr. et al. | |
| 2006/0042336 | A1 | 3/2006 | Smith et al. | |
| 2006/0113261 | A1 | 6/2006 | Recknagel et al. | |
| 2006/0117821 | A1 | 6/2006 | Edwards, Jr. | |
| 2006/0119074 | A1 | 6/2006 | Makos et al. | |
| 2006/0162402 | A1 | 7/2006 | Elliot et al. | |
| 2006/0162403 | A1 | 7/2006 | Handel | |
| 2006/0163842 | A1 | 7/2006 | Jacques | |
| 2006/0204349 | A1 | 9/2006 | Hohmann et al. | |
| 2006/0208458 | A1 | 9/2006 | Kalous et al. | |
| 2006/0266090 | A1 | 11/2006 | Brojanac et al. | |
| 2006/0266631 | A1 | 11/2006 | Kalous et al. | |
| 2006/0278504 | A1 | 12/2006 | Brojanac | |
| 2006/0279067 | A1 | 12/2006 | Irgens et al. | |
| 2006/0283215 | A1 | 12/2006 | Manthe et al. | |
| 2006/0283216 | A1 | 12/2006 | Marcelle et al. | |
| 2006/0284399 | A1 | 12/2006 | Scott et al. | |
| 2006/0289369 | A1 | 12/2006 | Sheridan et al. | |
| 2006/0290103 | A1 | 12/2006 | Kottke et al. | |
| 2007/0007782 | A1 | 1/2007 | Kalous | |
| 2007/0012834 | A1 | 1/2007 | Elliott et al. | |
| 2007/0018541 | A1 | 1/2007 | Hacker et al. | |
| 2007/0113600 | A1 | 5/2007 | Marcelle et al. | |
| 2007/0125680 | A1 | 6/2007 | Konop et al. | |
| 2007/0220932 | A1 | 9/2007 | Meekma et al. | |
| 2007/0234766 | A1 | 10/2007 | Rohde et al. | |
| 2007/0240468 | A1 | 10/2007 | Kalous | |
| 2007/0240766 | A1 | 10/2007 | Brojanac et al. | |

(56) References Cited

U.S. PATENT DOCUMENTS

| | | | |
|---|---|---|---|
| 2007/0257772 | A1 | 11/2007 | Marcelle et al. |
| 2007/0266747 | A1 | 11/2007 | Rafferty et al. |
| 2008/0000278 | A1 | 1/2008 | Brojanac et al. |
| 2008/0001052 | A1 | 1/2008 | Kalous et al. |
| 2008/0061530 | A1 | 3/2008 | Recknagel et al. |
| 2008/0067043 | A1 | 3/2008 | Brojanac |
| 2008/0081494 | A1 | 4/2008 | Larsen et al. |
| 2008/0092606 | A1 | 4/2008 | Meekma |
| 2008/0098939 | A1 | 5/2008 | Kalous et al. |
| 2008/0100426 | A1 | 5/2008 | Kalous et al. |
| 2008/0106392 | A1 | 5/2008 | Kalous et al. |
| 2008/0127866 | A1 | 6/2008 | Hacker et al. |
| 2008/0129158 | A1 | 6/2008 | Kalkwarf |
| 2008/0129169 | A1 | 6/2008 | Daino et al. |
| 2008/0129172 | A1 | 6/2008 | Freeberg et al. |
| 2008/0129173 | A1 | 6/2008 | Freeberg et al. |
| 2008/0141745 | A1 | 6/2008 | Rohde et al. |
| 2008/0148548 | A1 | 6/2008 | Rohde et al. |
| 2008/0150407 | A1 | 6/2008 | Mehmen |
| 2008/0173049 | A1 | 7/2008 | Burmesch et al. |
| 2008/0184748 | A1 | 8/2008 | Burmesch |
| 2008/0202181 | A1 | 8/2008 | Burmesch et al. |
| 2008/0209962 | A1 | 9/2008 | Peot et al. |
| 2008/0210577 | A1 | 9/2008 | Van Handel et al. |
| 2008/0296330 | A1 | 12/2008 | Kalous et al. |
| 2008/0314093 | A1 | 12/2008 | Nave |
| 2009/0007614 | A1 | 1/2009 | Armstrong et al. |
| 2009/0072956 | A1 | 3/2009 | Kalous |
| 2009/0079163 | A1 | 3/2009 | Cuellar et al. |
| 2009/0145178 | A1 | 6/2009 | Nave et al. |
| 2009/0173655 | A1 | 7/2009 | Konop et al. |
| 2009/0183534 | A1 | 7/2009 | Brojanac |
| 2009/0193860 | A1 | 8/2009 | Meekma |
| 2009/0205934 | A1 | 8/2009 | Brojanac |
| 2009/0223258 | A1 | 9/2009 | Burmesch et al. |
| 2009/0223852 | A1 | 9/2009 | Konop et al. |
| 2009/0266119 | A1 | 10/2009 | Brojanac et al. |
| 2009/0282879 | A1 | 11/2009 | Marcelle et al. |
| 2009/0308113 | A1 | 12/2009 | Meekma et al. |
| 2010/0043508 | A1 | 2/2010 | Burmesch et al. |
| 2010/0073478 | A1 | 3/2010 | Kalous |
| 2010/0102572 | A1 | 4/2010 | Burmesch |
| 2010/0180804 | A1 | 7/2010 | Czarnecki et al. |
| 2010/0192641 | A1 | 8/2010 | Nave |
| 2010/0219098 | A1 | 9/2010 | Konop et al. |
| 2010/0281930 | A1 | 11/2010 | Hacker |
| 2011/0011139 | A1 | 1/2011 | Marcelle et al. |
| 2011/0056567 | A1 | 3/2011 | Brojanac et al. |
| 2011/0057461 | A1 | 3/2011 | Brojanac |
| 2011/0067461 | A1 | 3/2011 | Hacker |
| 2011/0100074 | A1 | 5/2011 | Meekma et al. |
| 2011/0132049 | A1 | 6/2011 | Meekma et al. |
| 2011/0185775 | A1 | 8/2011 | Edwards, Jr. et al. |
| 2011/0209506 | A1 | 9/2011 | Johnson et al. |
| 2011/0239714 | A1* | 10/2011 | Trempala .......... G07C 9/00706 70/283.1 |
| 2011/0277853 | A1 | 11/2011 | Burmesch |
| 2012/0000255 | A1 | 1/2012 | Nave et al. |
| 2012/0011902 | A1 | 1/2012 | Meekma |
| 2012/0047973 | A1 | 3/2012 | Su et al. |
| 2012/0085136 | A1 | 4/2012 | Burmesch et al. |
| 2012/0103033 | A1 | 5/2012 | Kalous |
| 2012/0180537 | A1 | 7/2012 | Burmesch et al. |
| 2012/0266636 | A1 | 10/2012 | Nave |
| 2012/0273330 | A1 | 11/2012 | Wojtak |
| 2013/0019641 | A1 | 1/2013 | Burmesch et al. |
| 2013/0052846 | A1 | 2/2013 | Johnson |
| 2013/0086956 | A1 | 4/2013 | Nave |
| 2013/0118216 | A1 | 5/2013 | Kalous et al. |
| 2013/0120110 | A1 | 5/2013 | Kalous et al. |
| 2013/0174621 | A1 | 7/2013 | Barraza et al. |
| 2013/0214903 | A1 | 8/2013 | Kalous et al. |
| 2013/0219793 | A1 | 8/2013 | O'rourke |
| 2013/0255335 | A1 | 10/2013 | Jonely |
| 2013/0264128 | A1 | 10/2013 | Plato et al. |
| 2013/0276487 | A1 | 10/2013 | Burmesch et al. |
| 2013/0335199 | A1 | 12/2013 | Jonely |
| 2013/0335200 | A1 | 12/2013 | Jonely |
| 2014/0027507 | A1 | 1/2014 | Jonely |
| 2014/0028443 | A1 | 1/2014 | Ebner |
| 2014/0060126 | A1 | 3/2014 | Stevens |
| 2014/0060128 | A1 | 3/2014 | Fuller et al. |
| 2014/0130722 | A1 | 5/2014 | Dudgeon et al. |
| 2014/0152420 | A1* | 6/2014 | Wolski .............. G07C 9/00182 70/283.1 |
| 2014/0157838 | A1 | 6/2014 | Nave |
| 2014/0165384 | A1 | 6/2014 | Dudgeon et al. |
| 2014/0166462 | A1 | 6/2014 | Jonely et al. |
| 2014/0167391 | A1 | 6/2014 | Elliott et al. |
| 2014/0250955 | A1 | 9/2014 | Miller et al. |
| 2014/0283008 | A1 | 9/2014 | Daino et al. |
| 2015/0170447 | A1* | 6/2015 | Buzhardt .......... G07C 9/00182 340/5.2 |
| 2015/0217918 | A1 | 8/2015 | Rozanski |
| 2016/0035163 | A1 | 2/2016 | Conrad et al. |
| 2016/0036594 | A1 | 2/2016 | Conrad et al. |
| 2016/0036788 | A1 | 2/2016 | Conrad et al. |
| 2016/0036814 | A1 | 2/2016 | Conrad et al. |
| 2016/0056656 | A1 | 2/2016 | Jonely |
| 2016/0105406 | A1 | 4/2016 | Smith et al. |
| 2016/0105644 | A1 | 4/2016 | Smith et al. |
| 2016/0105847 | A1 | 4/2016 | Smith et al. |
| 2016/0116510 | A1 | 4/2016 | Kalous et al. |
| 2016/0145902 | A1 | 5/2016 | Kalous |
| 2016/0342820 | A1 | 11/2016 | Jonely |
| 2017/0113856 | A1 | 4/2017 | Hollis et al. |
| 2017/0140595 | A1 | 5/2017 | Kalous et al. |
| 2017/0146124 | A1 | 5/2017 | Daino et al. |
| 2017/0234036 | A1 | 8/2017 | Ebner |
| 2017/0234038 | A1 | 8/2017 | Sanford |
| 2017/0236352 | A1 | 8/2017 | Conrad et al. |
| 2017/0236353 | A1 | 8/2017 | Conrad et al. |
| 2018/0016812 | A1 | 1/2018 | Sanford |
| 2018/0106871 | A1 | 4/2018 | Kalous et al. |
| 2018/0171663 | A1 | 6/2018 | Ebner |
| 2018/0223567 | A1 | 8/2018 | Hollis |
| 2018/0253920 | A1 | 9/2018 | Kalous et al. |
| 2018/0270232 | A1 | 9/2018 | Conrad |
| 2018/0293396 | A1 | 10/2018 | Daino et al. |
| 2020/0095804 | A1 | 3/2020 | Pavlovic et al. |
| 2021/0207402 | A1 | 7/2021 | Pavlovic et al. |

OTHER PUBLICATIONS

Newton, *Newton's Telecom Dictionary*, 27th Expanded and Updated Edition, 2013, p. 588.

PC Magazine Encyclopedia, Definition of Heartbeat, https://www.pcmag.com/encyclopedia/term/44190/heartbeat, accessed Sep. 14, 2019.

PCT Search Report dated Dec. 4, 2019 for International Application No. PCT/US2019/051775, filed Sep. 18, 2019, 22 pages.

* cited by examiner

ELECTRONIC LOCK STATE DETECTION SYSTEMS AND METHODS

RELATED APPLICATIONS

This disclosure is a continuation of and claims priority to U.S. application Ser. No. 17/119,967, which was filed on Dec. 11, 2020 and is titled "ELECTRONIC LOCK STATE DETECTION SYSTEMS AND METHODS," the disclosure of which is expressly incorporated by reference herein in its entirety for all purposes, and which claims priority to U.S. application Ser. No. 16/574,801, which was filed on Sep. 18, 2019 and is titled "ELECTRONIC LOCK STATE DETECTION SYSTEMS AND METHODS," the disclosure of which is expressly incorporated by reference herein in its entirety for all purposes, and which claims priority to U.S. Provisional Application No. 62/734,742, which was filed on Sep. 21, 2018 and is titled "ELECTRONIC LOCK STATE DETECTION SYSTEMS AND METHODS," the disclosure of which is expressly incorporated by reference herein in its entirety for all purposes. Any and all applications, if any, for which a foreign or domestic priority claim is identified in the Application Data Sheet of the present application are hereby incorporated by reference in their entireties under 37 CFR 1.57.

BACKGROUND

Electronic locks have a number of advantages over normal mechanical locks. For example, electronic locks may be encrypted so that only a key carrying the correct code will operate the lock. In addition, an electronic lock may contain a microprocessor so that, for example, a record can be kept of who has operated the lock during a certain time period or so that the lock is only operable at certain times. An electronic lock may also have the advantage that, if a key is lost, the lock may be reprogrammed to prevent the risk of a security breach and to avoid the expense associated with replacement of the entire lock.

One drawback of certain electronic locks is that they use a power supply to function properly. Typically, locks of this type are unable to use alternating current (AC) power supplies, such as from wall outlets, due to the inherit lack of security and mobility of such power supplies. Batteries may be used instead, but batteries may require constant replacement or recharging. If a battery dies, a lock might fail to function and thereby create a significant security risk. Electromagnets may also be employed, but the bulk of such devices in some instances limit the potential use of electronic locks to larger-scale applications.

One solution to these drawbacks is to place a power source such as a battery in the key instead of in the lock. This arrangement allows the lock to remain locked even in the absence of a power supply. Placing a battery in the key also allows the battery to be charged more easily because keys are generally more portable than locks.

When batteries are used in the key, electrical contacts are typically employed to transfer power and data from the key to the lock. However, electrical contacts suffer from the drawback of being susceptible to corrosion, potentially leading to failure of either the key or the lock. Moreover, if separate inductors are used instead to transfer both power and data, magnetic interference between the inductors can corrupt the data and disrupt power flow to the lock.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

FIGS. 11A-1 and 11A-2 illustrate an example schematic diagram of circuit components in accordance with certain embodiments.

FIGS. 11B-1 and 11B-2 illustrate an example schematic diagram of circuit components in accordance with certain embodiments.

FIGS. 12-1 and 12-2 depict still another example schematic diagram of circuit components in accordance with certain embodiments.

FIGS. 13A-1 and 13A-2 illustrate an example schematic diagram of circuit components in accordance with certain embodiments.

FIGS. 13B-1 and 13B-2 illustrate an example schematic diagram of circuit components in accordance with certain embodiments.

SUMMARY

Figure 1:
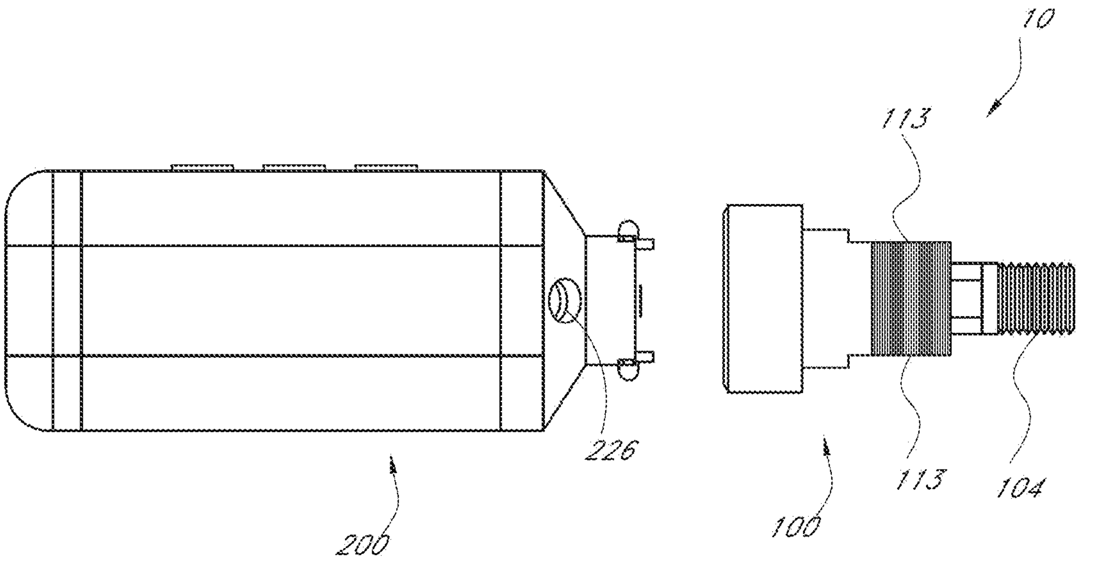
FIG. 1 is a side view of an embodiment of an electronic lock and key assembly.

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a method for detecting a lock state of an electronic lock. The method may be performed by an electronic key or a processor included with the electronic key. The electronic key may include: a housing; a power source disposed within the housing; a partial capacitor comprising a first capacitive metal plate, the first capacitive metal plate of the partial capacitor configured to form a capacitor with a corresponding second capacitive metal plate of an electronic lock when brought into proximity with the second capacitive metal plate of the electronic lock; and a processor in communication with the power source and with the partial capacitor, the processor programmed to transfer data signals to an electronic lock through the first capacitive metal plate to the second capacitive metal plate in the electronic lock. The method may include: mating the electronic key with the electronic lock; transmitting an unlock signal from the electronic key to the electronic lock; receiving, at the electronic key, a confirmation signal from the electronic lock, the confirmation signal indicating that the electronic lock has unlocked; recording, in a memory device of the electronic key, a first time at which the electronic lock has unlocked; transmitting a first heartbeat signal from the electronic key to the electronic lock; receiving, at the electronic key, a first response to the first heartbeat signal from the electronic lock; determining, by virtue of receiving the first response, that the electronic lock is still unlocked; transmitting one or more second heartbeat signals from the electronic key to the electronic lock; determining, after not receiving a second response to the one or more second heartbeat signals, that the electronic lock has relocked; recording, in a memory device of the electronic key, a second time at which the electronic lock has relocked; and outputting from the electronic key the first time at which the electronic key has unlocked and the second time at which the electronic key has relocked.

In some aspects, said determining, after not receiving a second response to the one or more second heartbeat signals, that the electronic lock has relocked comprises determining that the electronic lock has relocked after detecting no response to three of the second heartbeat signals, or some other defined number of second heartbeat signals (e.g., 2, 4, 5, 10, or more, or some number in between the preceding examples). Further, in some aspects, said outputting is performed in response to docking the electronic key with a docking device. Moreover, said outputting may comprise transmitting the first time at which the electronic key has unlocked and the second time at which the electronic key has relocked over a network to a remote server. In some aspects, the electronic lock is mated with the electronic key in a manner such that when the electronic lock is unlocked and the electronic key is rotated to an open position, the electronic key is unable to be removed from the electronic lock while the electronic key remains in the open position.

Certain aspects of the present disclosure relate to a method for detecting a lock state of an electronic lock. The method may include transmitting an unlock signal from an electronic key to an electronic lock mated with the electronic key; receiving, at the electronic key, a confirmation signal from the electronic lock, the confirmation signal indicating that the electronic lock has unlocked; recording, in a memory device of the electronic key, a first time at which the electronic lock has unlocked; transmitting a first heartbeat signal from the electronic key to the electronic lock; receiving, at the electronic key, a first response to the first heartbeat signal from the electronic lock; determining, by virtue of receiving the first response, that the electronic lock is still unlocked; transmitting one or more second heartbeat signals from the electronic key to the electronic lock; determining, after not receiving a second response to the one or more second heartbeat signals, that the electronic lock has relocked; recording, in a memory device of the electronic key, a second time at which the electronic lock has relocked; and outputting from the electronic key the first time at which the electronic key has unlocked and the second time at which the electronic key has relocked.

In some aspects, said determining, after not receiving a second response to the one or more second heartbeat signals, that the electronic lock has relocked comprises determining that the electronic lock has relocked after detecting no response to three heartbeat signals. Further, said outputting may be performed in response to docking the electronic key with a docking device. In some cases, said outputting comprises transmitting the first time at which the electronic key has unlocked and the second time at which the electronic key has relocked over a network to a remote server. In addition, the electronic lock may be mated with the electronic key in a manner such that when the electronic lock is unlocked and the electronic key is rotated to an open position, the electronic key is unable to be removed from the electronic lock while the electronic key remains in the open position.

Certain aspects of the present disclosure relate to a method of detecting a lock state of an electronic lock. The method may include: transmitting an unlock signal from an electronic key to an electronic lock; receiving, at the electronic key, a confirmation signal from the electronic lock, the confirmation signal indicating that the electronic lock has unlocked; recording, in a memory device of the electronic key, a first time at which the electronic lock has unlocked; transmitting one or more heartbeat signals from the electronic key to the electronic lock; determining, after not receiving a response to the one or more heartbeat signals, that the electronic lock has relocked; recording, in a memory device of the electronic key, a second time at which the electronic lock has relocked; and outputting from the electronic key the first time at which the electronic key has unlocked and the second time at which the electronic key has relocked.

In some cases, the unlock signal is transmitted after mating the electronic key with the electronic lock. Further, the unlock signal may be transmitted after receiving or confirming receipt of a keycode that matches a keycode stored at the electronic lock. Moreover, the one or more heartbeat signals may include a plurality of heartbeat signals. Further, the method may include receiving, at the electronic key, a first response to a first heartbeat signal included in the plurality of heartbeat signals from the electronic lock; and determining, by virtue of receiving the first response, that the electronic lock is still unlocked. The method may further include transmitting one or more additional heartbeat signals included in the plurality of heartbeat signals from the electronic key to the electronic lock; and determining, after not receiving a second response to the one or more additional heartbeat signals, that the electronic lock has relocked. Additionally, the method may include recording, in a memory device of the electronic key, a second time at which the electronic lock has relocked; and outputting from the electronic key the first time at which the electronic key has unlocked and the second time at which the electronic key has relocked.

Certain aspects of the present disclosure relate to an electronic key. The electronic key may include: a housing; a power source disposed within the housing; a partial capacitor comprising a first capacitive metal plate, the first capacitive metal plate of the partial capacitor configured to form a capacitor with a corresponding second capacitive metal plate of an electronic lock when brought into proximity with the second capacitive metal plate of the electronic lock; and a processor in communication with the power source and with the partial capacitor, the processor programmed to: transmit an unlock signal from the electronic key to the electronic lock when the electronic key is mated to the electronic lock; receive, at the electronic key, a confirmation signal from the electronic lock, the confirmation signal indicating that the electronic lock has unlocked; record, in a memory device of the electronic key, a first time at which the electronic lock has unlocked; transmit a first heartbeat signal from the electronic key to the electronic lock; receive, at the electronic key, a first response to the first heartbeat signal from the electronic lock; determine, by virtue of receiving the first response, that the electronic lock is still unlocked; transmit one or more second heartbeat signals from the electronic key to the electronic lock; determine, after not receiving a second response to the one or more second heartbeat signals, that the electronic lock has relocked; record, in a memory device of the electronic key, a second time at which the electronic lock has relocked; and output from the electronic key the first time at which the electronic key has unlocked and the second time at which the electronic key has relocked.

In some implementations, the first capacitive metal plate comprises an annulus. Further, the electronic key may include: a key power coil, wherein the key power coil and the first capacitive metal plate are concentric; and a nose portion disposed within a hole formed by the annulus, wherein the key power coil is disposed at least partially within the nose portion. In some cases, the processor is programmed to determine, after not receiving a second response to the one or more second heartbeat signals, that the electronic lock has relocked by at least determining that the electronic lock has relocked after detecting no response to three of the second heartbeat signals. In certain aspects, the electronic lock is mated with the electronic key in a manner such that when the electronic lock is unlocked and the electronic key is rotated to an open position, the electronic key is unable to be removed from the electronic lock while the electronic key remains in the open position.

Further, the processor may be programmed to output from the electronic key the first time at which the electronic key has unlocked and the second time at which the electronic key has relocked in response to docking the electronic key with a docking device or a docking station. In some cases, the docking station is configured to secure the electronic key in the docking device until a passcode is entered into the docking device. In some cases, the passcode is entered into the electronic key. In some such cases, the electronic key may provide the passcode to the docking device, which may determine whether to unlock the electronic key enabling removal of the electronic key from the docking device based on whether the passcode matches information stored at the docking device. In some cases, the docking device is configured to transmit the output from the electronic key to a remote server. Further, the output from the electronic key may constitute or comprise audit trail data that is stored in a cloud computing platform comprising the remote server. Moreover, in some implementations, the docking device is configured to charge the electronic key.

DETAILED DESCRIPTION

In the description below certain relative terms such as top, bottom, left, right, front and back are used to describe the relationship between certain components or features of the illustrated embodiments. Such relative terms are provided as a matter of convenience in describing the illustrated embodiments and are not intended to limit the scope of the technology discussed below.

Electronic key and lock assemblies can advantageously incorporate contactless power and/or data transfer as a technique of electrical communication between key and lock components. In addition to inductive power and/or data transfer using transmitters and receivers fitted with electrical coils, an alternative approach utilizes a capacitive, rather than inductive, interface as a mechanism of delivering an electrical signal. Use of a capacitive interface may provide certain advantages over an inductive interface. For example, with a capacitor, electromagnetic fields may be generally confined between and around conductive plates of the capacitor, which can facilitate eliminating magnetic flux guiding and/or shielding components, thereby reducing bulk and/or cost concerns.

Thus, in certain embodiments, an electronic key may include a partial capacitor comprising a capacitive metal plate in communication with a processor. The capacitive metal plate of the partial capacitor can form a capacitor with a corresponding capacitive metal plate of a lock when brought into proximity with the metal plate of the lock, thereby allowing for capacitive data or power transfer between the key and lock. A common ground can be established between the metal plate of the key and the metal plate of the lock through a parasitic capacitance present between the key and lock circuitry. Prior to describing such features, FIGS. 1-21 and the accompanying text below provide an overview of key and lock systems, some of which may incorporate capacitive data transfer characteristics.

I. OVERVIEW OF THE KEY AND LOCK SYSTEM

Figure 2:
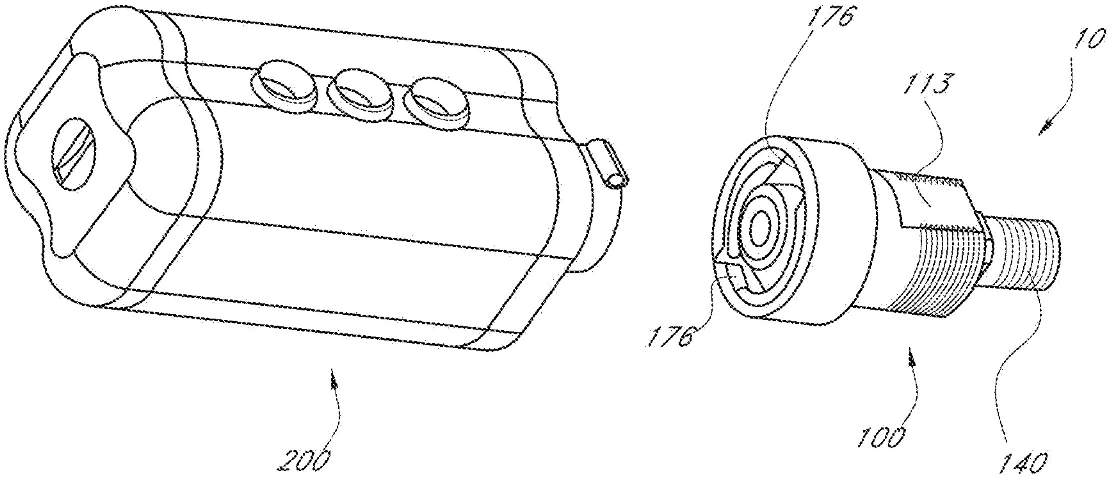
FIG. 2 is a perspective view of the electronic lock and key assembly of FIG. 1.

FIGS. 1 and 2 illustrate one embodiment of an electronic lock and key system, which is generally referred to by the reference numeral 10. The electronic lock and key system 10 includes a lock 100 and a key 200, which can engage one another and to selectively move the key 200 between a locked position and an unlocked position. The lock and key system 10 may be used to permit access to a location or enclosure in a variety of applications, such as a cabinet or other such storage compartment, for example, which may store valuable contents. Certain features, aspects and advantages of the lock and key system 10 may be applied to other types of lock applications, such as selectively permitting access to buildings or automobiles, for example, or for selectively permitting operation of a device. Thus, although the present lock and key system 10 is disclosed herein in the context of a cabinet or storage compartment application, the technology disclosed herein may be used with, or adapted for use with, other suitable lock applications, as well.

The illustrated electronic lock and key system 10 can use electronic means to verify the identity of the key and to actuate the internal mechanism of the lock 100. When the key 200 engages the lock 100, data transfer and power transfer is enabled between the lock 100 and the key 200. The lock 100 is then preferably permitted to be actuated by the key 200 to move from a locked position to an unlocked position and permit access to the space or location secured by the lock 100. In the illustrated arrangement, the direction of power transfer preferably is from the key 200 to the lock 100, as is described in greater detail below. However, in alternative arrangements, the direction of power transfer may be reversed or may occur in both directions.

The illustrated lock 100 is preferably used in a cabinet, or other such storage compartment, and can selectively secure a drawer or door of the cabinet relative to a body of the cabinet. However, as will be appreciated, the lock 100 may be used in, or adapted for use in, a variety of other applications. The lock 100 is preferably mounted to the cabinet in such a way so as to allow only a front portion of the lock 100 to be accessible when the cabinet is closed. The lock 100 includes an outer housing 102 with a cylinder 104 that is rotatable within the outer housing 102 when actuated by the key 200. An exposed end of the cylinder 104 can support a lock tab (not shown). The lock tab can cooperate with a stop. The lock 100 is associated with one of the drawer (or door) of the cabinet and the cabinet body, and the stop is associated with the other of the drawer (or door) of the cabinet and the cabinet body. The lock tab rotates with the lock cylinder 104 to move between a locked position, wherein the lock tab mechanically interferes with the stop, to an unlocked position, wherein the lock tab does not interfere with the stop. In addition, other suitable locking arrangements may be utilized.

II. MECHANICAL ASPECTS OF THE KEY AND LOCK SYSTEM

Figure 3:
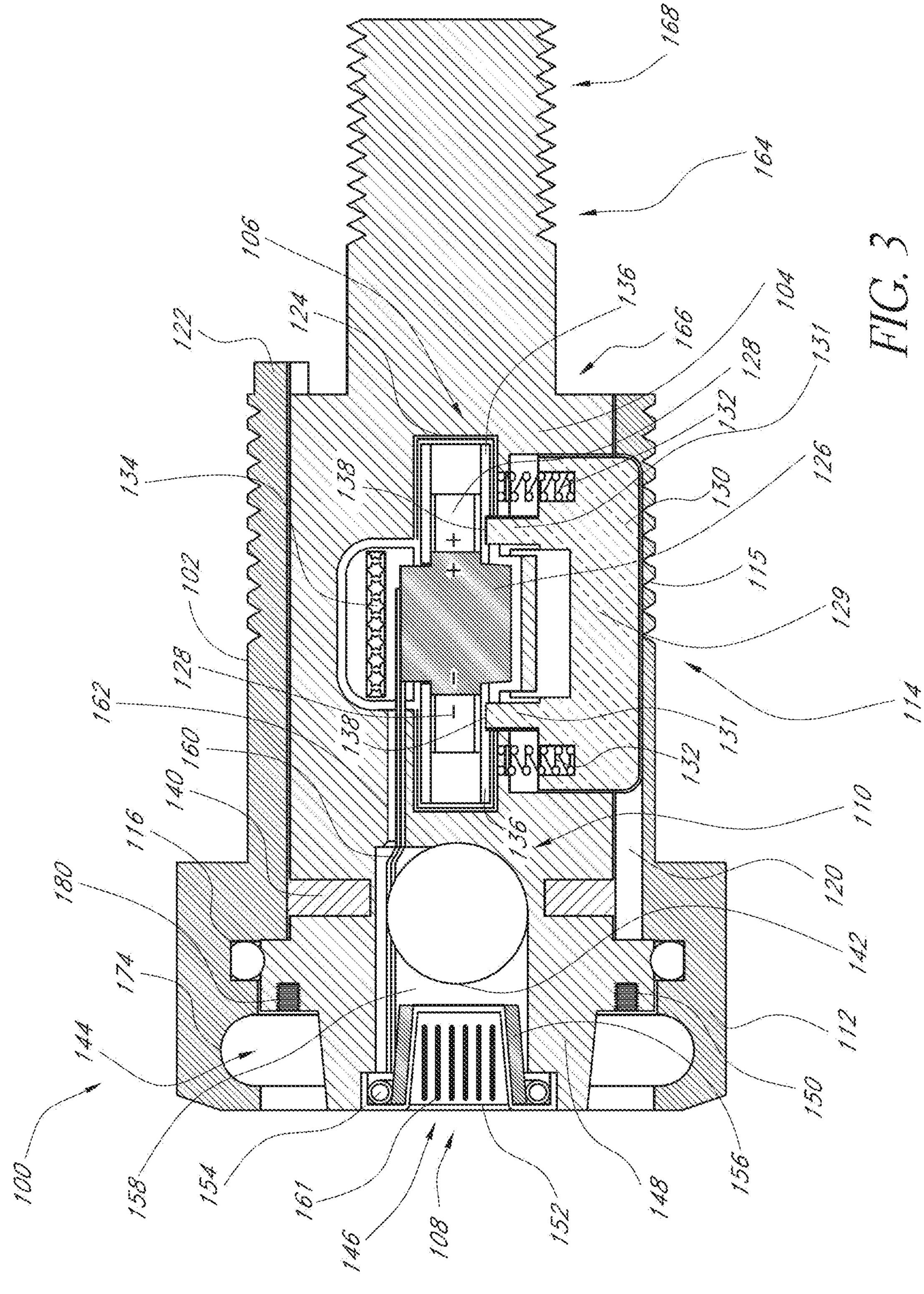
FIG. 3 is a cross-sectional side view of the lock of FIG. 1 in the locked position.
Figure 4:
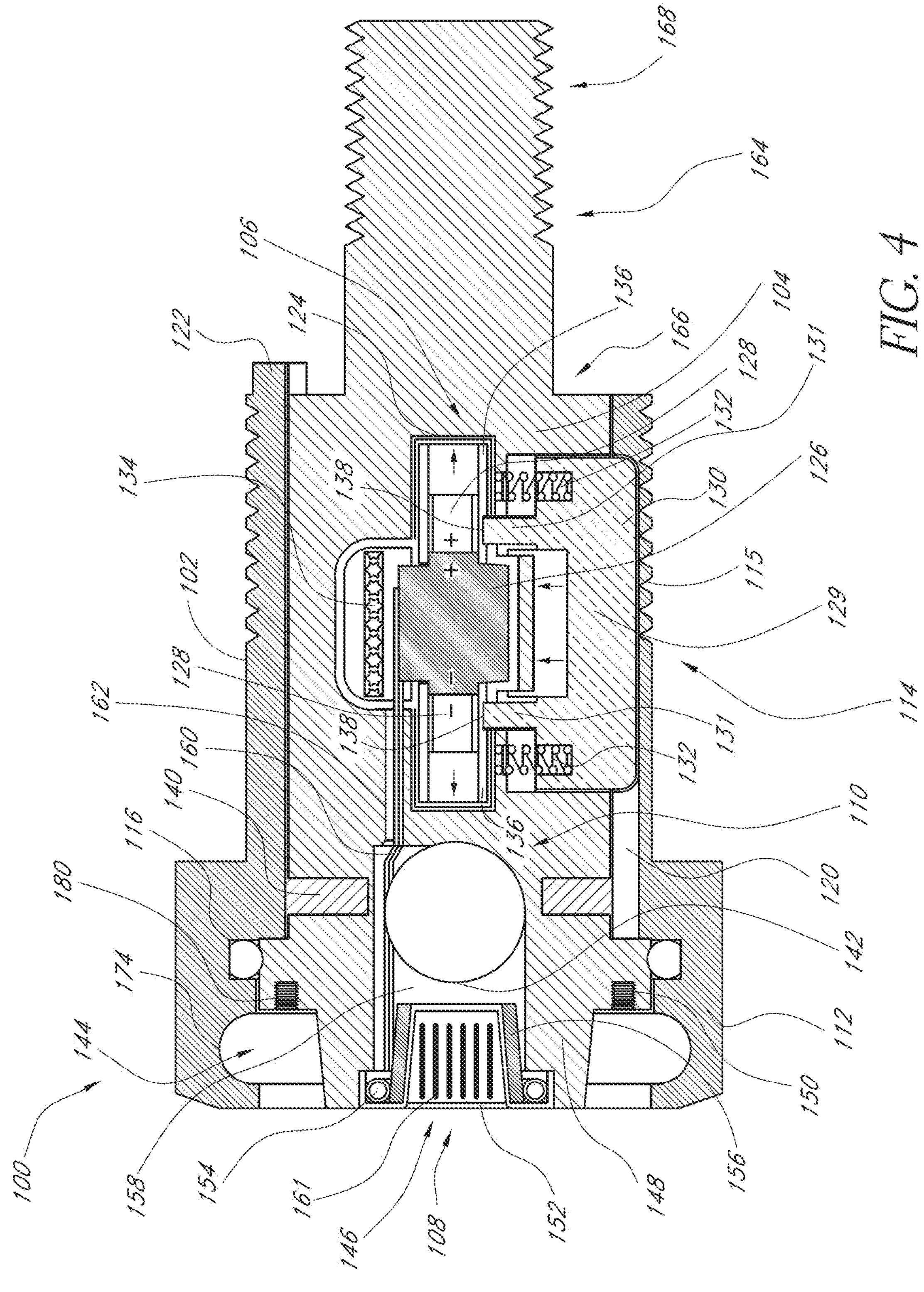
FIG. 4 is a cross-sectional side view of the lock of FIG. 1 in the unlocked position.

FIGS. 3 and 4 illustrate a cross-sectional view of the lock 100 of the electronic lock and key assembly 10 of FIGS. 1 and 2. With additional reference to the FIGS. 3 and 4, the portion of the lock 100 on the left hand side of the FIGURES will be referred to as the front of the lock and the portion on the right hand side of the FIGURES will be referred to as the rear or back of the lock 100. As described above, the lock 100 includes the housing 102 and the cylinder 104. The cylinder 104 can be rotatable within the housing 102 by the key 200 when the lock 100 and the key 200 are properly engaged. The lock 100 further includes a cartridge 106, which includes a mechanism that can selectively permit the cylinder 104 to rotate within the housing 102. The lock 100 further includes a mating portion 108 which can mate with the key 200 and an attack guard portion 110 which can protect the lock from unwanted tampering.

The housing 102 of the lock 100 preferably is a generally cylindrical tube with a head portion 112 and a body portion 114. The diameter of the head portion 112 is larger than the diameter of the body portion 114 such that the head portion 112 forms a flange of the housing 102. The head portion 112 also includes an annular groove 174 or key recess. Axially-extending slots 176 open into the annular groove 174 (FIG. 2). The groove 174 and slots 176 are used in engaging the key 200 with the lock 100 and are described in greater detail below. The head portion 112 can house a seal member, such as an O-ring 116, which is positioned to create a seal between the housing 102 and the cylinder 104. Thus, the lock 100 is suitable for use in wet environments.

The lock housing 102 also includes a body portion 114 which extends rearwardly away from the head portion 112. The rearward end of the body portion further includes a threaded outer surface 115 which can receive a nut (not shown). The nut is used to secure the lock 100 to a cabinet or other storage compartment. The body portion 114 also includes at least one, and preferably a pair of opposed flattened surfaces 113 or “flats” (FIG. 2, only one shown), which are provided to reduce the likelihood of rotation of the housing 102 in a storage container wall or door. Alternatively, other mechanisms may be used to inhibit rotation of the housing 102 other than the flattened surfaces 113.

With continued reference to FIGS. 3 and 4, the body portion 114 further includes an internal groove 120 can secure the lock cylinder 104 from rotation relative to the lock housing 112 when the lock 100 is in a locked position. The groove 120 preferably is open towards an interior passage 121 of the body portion 114, which houses a portion of the lock cylinder 104. The groove 120 extends axially along the body portion 114 and is formed partially through a thickness of the body portion 114 in a radial direction.

The body portion 114 further includes a tab 122 that extends slightly rearward from the rearward end of the body portion 114. The tab 122 acts as a stop to limit the rotation of a lock tab (not shown) secured to the cylinder 104.

The housing 102 can include a break-away feature incorporated into the structure of the housing 102. The head portion 112 is formed with the body portion 114 in such a way that if someone attempted to twist the housing 102 of the lock 100 by grasping the head portion 112, the head portion 112 is capable of breaking free of the body portion 114, preferably at a location near the intersection of the head portion 112 and the body portion 114 of the housing 102. This feature is advantageous in that it increases the difficulty of opening or disabling the lock 100 by grasping the housing 102. That is, if a person were to attempt to grasp the head portion 112 and it were to break away then there would no longer be an easily graspable surface with which to try to rotate the lock 100 mechanically, without use of the key 200, because the head portion 112, which is external to the cabinet, would no longer be coupled to the body portion 114, which is internal to the cabinet. The break-away feature between the head portion 112 and the body portion 114 may be created simply by a structure that concentrates stresses at the head portion 112/body portion 114 junction. Alternatively, the housing 102 may be deliberately weakened at or near the head portion 112/body portion 114 junction, or at any other desirably or suitable location. Other anti-tampering solutions may be employed as well.

With continued reference to FIGS. 3 and 4, as described above, the lock cylinder 104 includes a portion referred to as the cartridge 106. The cartridge 106 includes a solenoid 126 with two adjacent slide bars 128. The slide bars 128 are spaced on opposing sides of the solenoid 126 and can magnetically attract to the solenoid 126 when the lock 100 is in the locked position. The slide bars 128 preferably are constructed with a neodymium-containing material, which may be encapsulated in a stainless steel material for corrosion protection and wear resistance. When the lock 100 is moved to an unlocked position, the solenoid 126 can reverse polarity such that the slide bars 128 are magnetically repelled from the solenoid 126, as is described in greater detail below. Preferably, the slide bars 128 are movable along an axis that is parallel to (which includes coaxial with) a longitudinal axis of the lock 100.

The cartridge 106 is surrounded by a tamper-resistant case 124 that houses a circuit board 134 can receive instructions when the key 200 engages with the lock 100. The circuit board 134 is can recognize the proper protocol used to unlock the lock 100. The circuit board 134 is further can actuate the solenoid 126 to reverse the polarity of the solenoid 126 and repel the slide bars 128 away from the solenoid 126. The details of the circuit board 134 and a method of communication between the key 200 and the lock 100 are discussed in greater detail below. The interior of the case 124 preferably is filled with a filler material, such as an epoxy, to occupy empty space within the case 124 and protect and maintain a desired position of the components within the case 124, such as the circuit board 134 and wires 160.

The lock cartridge 106 further includes two slide tubes 136 which are positioned on opposite sides of the solenoid 126 and are can at least partially encapsulate the slide bars 128 and are further can provide a smooth, sliding surface for the slide bars 128. The slide tubes 136 each include an aperture 138 can receive at least a portion of a bolt 130, or side bar, of the lock 100 when the lock 100 is in an unlocked position.

The bolt 130 is preferably a relatively thin, generally block-shaped structure that is movable between a locked position, in which rotation of the lock cylinder 104 relative to the housing 102 is prohibited, and an unlocked position, in which rotation of the lock cylinder 104 relative to the housing 102 is permitted. Preferably, the bolt 130 moves in a radial direction between the locked position and the unlocked position, with the unlocked position being radially inward of the locked position.

The bolt 130 includes two cylindrical extensions 131, which extend radially inward toward the cartridge 106. When the solenoid 126 is actuated to repel the slide bars 128 such that the apertures 138 are not blocked by the slide bars 128, the extensions 131 of the bolt 130 may enter into the case 124 through the apertures 138 as the bolt 130 moves radially inward.

The bolt 130 is preferably of sufficient strength to rotationally secure the cylinder 104 relative to the housing 102 when the bolt 130 is in the locked position, wherein a portion of the bolt 130 is present within the groove 120. The bolt 130 has a sloped or chamfered lower edge 129, which in the illustrated embodiment is substantially V-shaped. The lower edge 129 can mate with the groove 120, which preferably is of an at least substantially correspondingly shape to the lower edge 129 of the bolt 130. The V-shaped edge 129 of the bolt 130 interacting with the V-shaped groove 120 of the housing 102 urges the bolt 130 in a radially inward direction towards the cartridge 106 in response to rotation of the cylinder 104 relative to the housing 102. That is, the sloped lower edge 129 and groove 120 cooperate to function as a wedge and eliminate the need for a mechanism to positively retract the bolt 130 from the groove 120. Such an arrangement is used in certain embodiments due to its simplicity and reduction in the number of necessary parts. However, other suitable arrangements to lock and unlock the cylinder 104 relative to the housing 102 may also be used.

When the lock 100 is in an unlocked condition and the slide bars 128 are spaced from the solenoid 126, as shown in FIG. 4, the bolt 130 is free to move radially inward (or upward in the orientation of FIG. 4) into the cartridge 106, thus allowing the cylinder 104 to rotate within the housing 102. Preferably, one or more biasing members, such as springs, tend to urge the bolt 130 toward a locked position. In the illustrated arrangement, two springs 132 are provided to produce such a biasing force on the bolt 130.

When the lock 100 is in a locked condition, the bolt 130 is extended radially outward into engagement with the groove 120. The bolt 130 is prevented from inward movement out of engagement with the groove 120 due to interference between the extensions 131 and the slide bars 128. When the lock 100 is in the unlocked position, the slide bars 128 are moved away from the solenoid 126 due to a switching of magnetic polarity of the solenoid 126, which is actuated by the circuit board 134. The bolt 130 is then free to move radially inward towards the center of the cylinder 104 and out of engagement with the groove 120. At this point, the rotation of the cylinder 104 within the housing 102 may cause the bolt 130 to be displaced from engagement with the groove 120 due to the cooperating sloped surfaces of the groove 120 and the lower edge 129 of the bolt 130. The cylinder 104 is then free to be rotated throughout the unlocked rotational range within the housing 102. When the cylinder 104 is rotated back to a locked position, that is, when the lower edge 129 of the bolt 130 is aligned with the groove 120, the bolt 130 is urged radially outward by the springs 132 such that the lower edge 129 is engaged with the groove 120. Once the extensions 131 of the bolt 130 are retracted from the case 124 to a sufficient extent, the slide bars 128 are able to move towards the solenoid 126 to once again establish the locked position of the lock 100.

Although FIG. 3 and FIG. 4 show a housing 102 with only one groove 120, multiple grooves 120 may be provided within the housing 102 in other embodiments. Such a configuration may be advantageous in that multiple bolts 130 may be provided, or if it is desirable to have multiple locked positions using a single bolt 130 interacting with one of several available grooves 120.

With continued reference to FIGS. 3 and 4, the lock 100 further includes an attack guard portion 110 can inhibit access to the cartridge 106 such as by drilling, for example, from the exposed portions of the lock, such as the head portion 112. The illustrated attack guard portion 110 includes a radial array of pins 140 and an attack ball 142, which are located along the longitudinal axis of the lock 100 between the mating portion 108 and the cartridge 106. In the illustrated arrangement, the attack ball 142 is generally centered relative to the longitudinal axis of the lock 100 and is surrounded by the pins 140.

The pins 140 are preferably made from a carbide material, but can be made of any suitable material or combination of materials that are capable of providing a suitable hardness to reduce the likelihood of successful drilling past the pins 140 and attack ball 142. The pins 140 are inserted into the cylinder 104 to a depth that is near the outer extremity of the attack ball 142. A small space may be provided between the outer end of the attack ball 142 and the end of the carbide pin 140 to allow for the passage of the wires 160, which is discussed in greater detail below. The pins 140 are provided so as to add strength and hardness to the outer periphery of the cylinder 104 adjacent to the attack ball 142.

The attack ball 142 is preferably made of a ceramic material but, similar to the carbide pins, can be made of any suitable material that is of sufficient hardness to reduce the likelihood of successful drilling of the lock cylinder 104. The attack ball 142 is preferably generally spherical shape and lies within a pocket on substantially the same axis as the cartridge 106. Preferably, the attack ball 142 is located in front of the cartridge 106 and is aligned along the longitudinal axis of the lock 100 with the pins 140. The attack ball 142 can reduce the likelihood of a drill bit passing through the cylinder and drilling out the cartridge 106. It is preferable that if an attempt is made to drill out the cylinder 104, the attack ball 142 is sufficiently hard as to not allow the drill bit to drill past the ball 142 and into the cartridge 106. The shape of the attack ball 142 is also advantageous in that it will likely deflect a drill bit from drilling into the cartridge 104 by not allowing the tip of the drill bit to locate centrally relative to the lock 100. Because the attack ball 142 is held within a pocket, it advantageously retains functionality even if cracked or broken. Thus, the attack guard portion 110 can substantially reduce the likelihood of success of an attempt to drill out the cartridge 106. In addition, or in the alternative, other suitable arrangements to prevent drilling, or other destructive tampering, of the lock 100 may be used as well.

One advantage of using the pins 140 and the attack ball 142 is that the entire lock cylinder 104 does not have to be made of a hard material. Because the lock cylinder 104 includes many features that are formed in the material by shaping (e.g., casting or forging) or material removal (e.g., machining), it would be very difficult to manufacture a cylinder 104 entirely of a hard material such as ceramic or carbide. By using separate pins 140 and an attack ball 142, which are made of a very hard material that is difficult to drill, the lock cylinder 104 can be easily manufactured of a material such as stainless steel which has properties that allow easier manufacture. Thus a lock cylinder can be made that is both relatively easy to manufacture, but also includes drill resistant properties.

With continued reference to FIGS. 3 and 4, the lock 100 includes a mating portion 108 located near the front portion of the lock 100. The mating portion 108 preferably includes a mechanical mating portion 144 and a data and power mating portion 146. The mechanical mating portion 144 includes a tapered cylindrical extension 148 that extends in a forward direction from the lock cylinder 104 and can be received within a portion of the key 200 when the lock 100 and the key 200 are engaged together. At the base of the extension 148 are two recesses 150 that can mate with two extensions, or protrusions, on the key 200, which are described in greater detail below. The recesses 150 can allow the key 200 to positively engage the cylinder 104 such that torque can be transferred from the key 200 to the cylinder 104 upon rotation of the key 200.

The data and power mating portion 146 includes a mating cup 152, a data coil 154, and a power coil 156. The cup 152 can receive a portion of key 200 when the lock 100 and the key 200 are engaged together. The cup 152 resides at least partially in an axial recess 158 which is located in a front portion of the lock cylinder 104 and further houses the attack ball 142. The cup is at least partially surrounded by the power coil 156, which can inductively receive power from the key 200. The cup 152 preferably includes axial slots 161 that can allow power to transmit through the cup 152.

The data coil 154 is located towards the upper edge of the cup 152 and, preferably, lies just rearward of the forward lip of the cup 152. The data coil 154 is generally of a torus shape and can cooperate with a data coil of the key 200, as is described in greater detail below. Two wires 160 extend from the cup 152, through a passage 162, and into the lock cartridge 106. The wires 160 preferably transmit data and power from the data and power mating portion 146 to the solenoid 126 and the circuit board 134.

The power coil 156 is preferably aligned with a longitudinal axis of the lock 100 so that a longitudinal axis passing through the power coil 156 is substantially parallel (or coaxial) with a longitudinal axis of the lock 100. The data coil 154 is preferably arranged to generally lie in a plane that is orthogonal to a longitudinal axis of the lock. Such an arrangement helps to reduce magnetic interference between the transmission of power between the lock 100 and the key 200 and the transmission of data between the lock 100 and the key 200.

As described above, the lock cylinder 104 can support a lock tab, which interacts with a stop to inhibit opening of a cabinet drawer or door, or prevent relative movement of other structures that are secured by the lock and key system 10. The lock cylinder 104 includes a lock tab portion 164 that can support a lock tab in a rotationally fixed manner relative to the lock cylinder 104. The lock tab portion 164 includes a flatted portion 166 and a threaded portion 168. The flatted portion 166 can receive a lock tab (not shown) which can slide over lock tab portion 164 and mate with the flatted portion 166. One or more flat surfaces, or "flats," on the flatted portion 166 can allow the transmission of torque from the cylinder 104 to the lock tab (not shown). The threaded portion 168 can receive a nut (not shown), which can secure the lock tab (not shown) to the cylinder 104.

Figure 5:
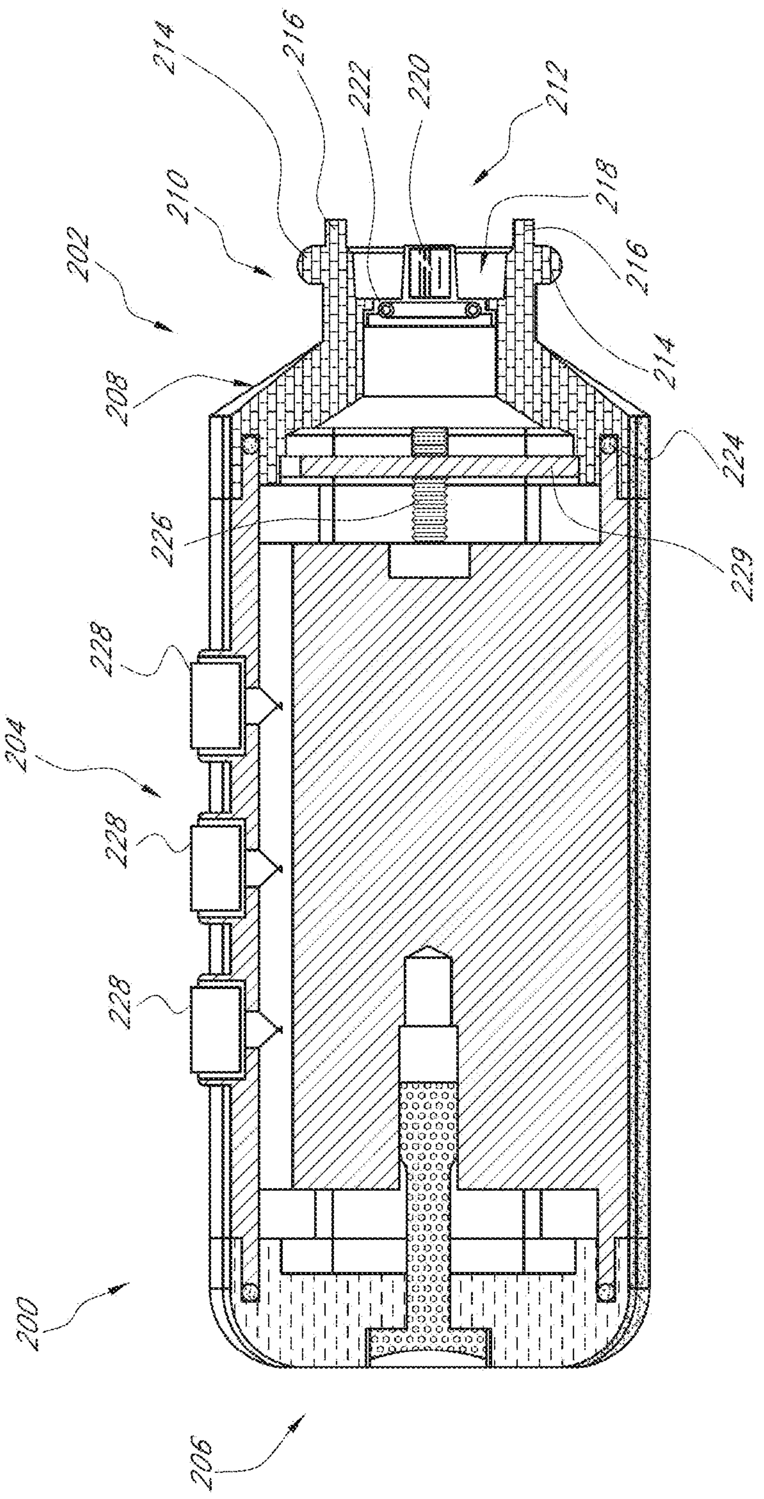
FIG. 5 is a cross-sectional side view of the key of FIG. 1.
Figure 6:
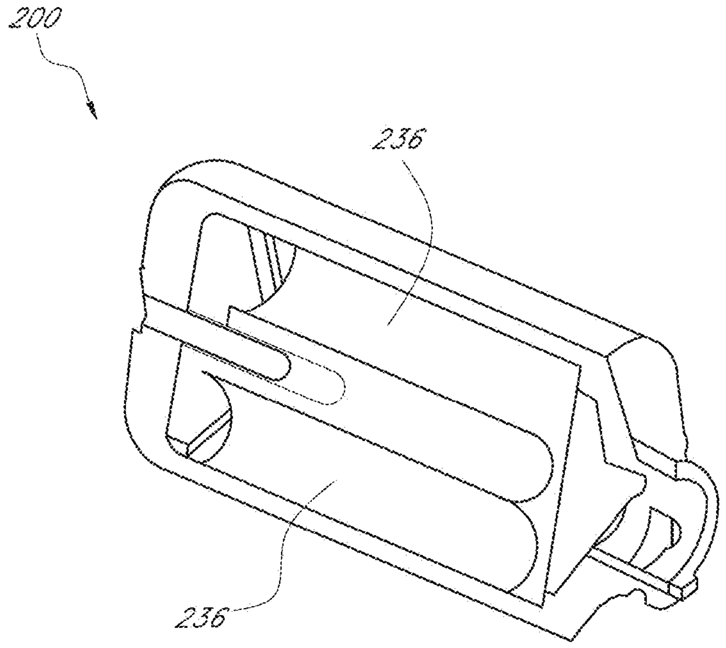
FIG. 6 is a perspective view of the key of FIG. 1 sectioned along a vertical plane extending through a longitudinal axis of the key.
Figure 7:
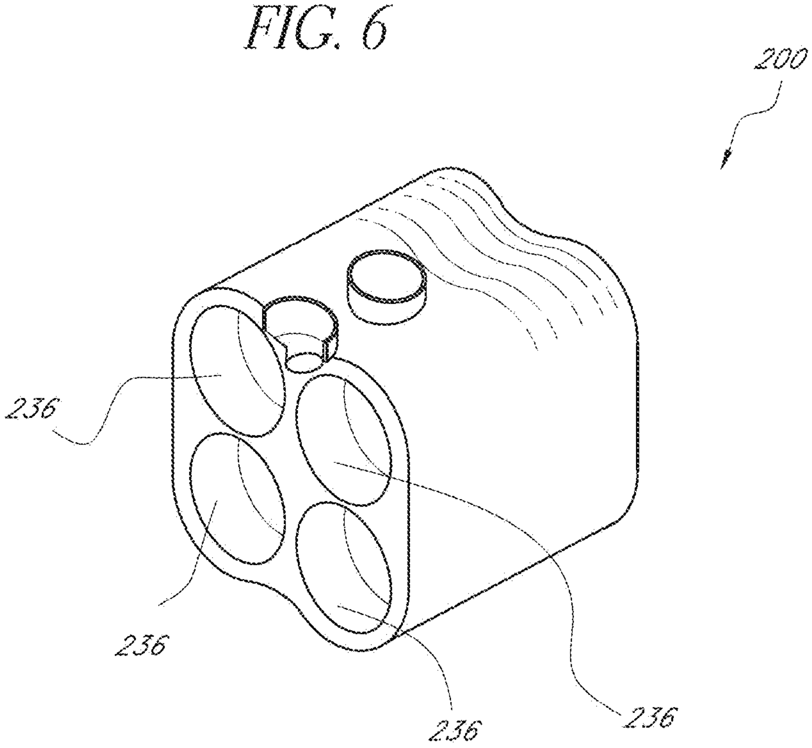
FIG. 7 is a perspective view of the key of FIG. 1 sectioned along a vertical plane extending through an intermediate portion of the key and generally normal to the longitudinal axis.

FIGS. 5-7 illustrate an embodiment of the key 200 that may be used with the lock 100 of the electronic lock and key assembly 10. The key 200 can mate with the lock 100 to permit power and data communication between the key 200 and the lock 100. In the illustrated arrangement, the key 200 can also mechanically engage the lock 100 to move the lock from a locked to an unlocked position or vice versa.

The key 200 includes an elongate main body section 204 that is generally rectangular in cross-sectional shape. The key 200 also includes a nose section 202 of smaller external dimensions than the body section 204. An end section 206 closes and end portion of the body section 204 opposite the nose section 202. The nose section 202 can engage the lock 100 and the body section 204 can house the internal electronics of the key 200 as well as other desirable components. The end section 206 is removable from the body section 204 to permit access to the interior of the body section 204.

With continued reference to FIGS. 5-7, the nose section 202 includes a tapered transition portion 208 which extends between a cylindrical portion 210 of the nose section 202 and the body section 204. The cylindrical portion 210 houses the power and data transfer portion 212 of the key 200, which is discussed in greater detail below.

On the outer surface of the cylindrical portion are two radiused tabs 214 which can rotationally locate the key 200 relative to the lock 100 prior to the key 200 engaging the lock 100. The tabs 214 extend radially outward from the outer surface of the cylindrical portion 210 and, preferably, oppose one another.

The cylindrical portion 210 further includes two generally rectangular extensions 216 that extend axially outward and can engage with the recesses 150 of the lock 100 (FIG. 3) when the key 200 engages the lock 100. The rectangular extensions 216 can couple the nose section 202 of the key 200 to the lock cylinder 104 and to transmit torque from the key 200 to the cylinder 104 when the key 200 is rotated.

The cylindrical portion 210 includes a recess 218 that opens to the front of the key 200. Located within the recess 218 is the power and data transfer portion 212 of the key 200. Preferably, the power and data transfer portion 212 is generally centrally located within the recess 218 and aligned with the longitudinal axis of the key 200. The power and data transfer portion 212 includes a power coil 220 and a data coil 222. The power coil 220 is generally cylindrical in shape with a slight taper along its axis. The power coil 220 is positioned forward of the data coil 222 and, preferably, remains within the recess 218 of the cylindrical portion 210. The power coil 220 can be inductively coupled with the power coil 152 of the lock 100. The data coil 222 is generally toroidal in shape and is located at the base of the recess 218. The data coil 222 can be inductively coupled with the data coil 154 of the lock 100, as is described in greater detail below.

With continued reference to FIGS. 5-7, in the illustrated arrangement, the nose section 202 is a separate component from the body section 204 and is connected to a forward end of the body section 204 of the key 200. The nose section 202 mates with the body section 204 and is sealed by a suitable seal member, such as O-ring 224, which inhibits contaminants from entering the interior of the key 200. The nose section 202 is secured to the body section by two fastening members, such as screws 226 (FIGS. 1 and 5). Similarly, the end section 206 is a separate component from the body section 204 and is coupled to a rearward end of the body section 200. The end section is substantially sealed to the body section 204 by a suitable seal member, such as O-ring 230, which can inhibit contaminants from entering the interior of the key 200. Thus, the key 200 preferably is suitable for use in wet environments. The end section 206 is secured to the body section 204 by a fastening member, such as screw 232, which can retain the end section 206 to the body section 204.

The body section 204 includes three externally-accessible input buttons 228 extending from the body section 204 (upward in the orientation of FIG. 5). The input buttons 228 are in electrical contact with a processing unit 229 of the key 200, which preferably includes a processor and a memory. The input buttons 228 permit data to be entered into the key 200, such as a wake-up or programming code, for example. Certain functional features of the key 200 are described in greater detail below with reference to FIGS. 9-12.

With reference to FIGS. 6 and 7, the key 200 further includes a plurality of axially-extending cavities 236. The illustrated key 200 includes four cavities 236. The axial cavities 236 extend through at least a significant portion of the length of the body section 204 and are preferably circular in cross-sectional shape. The axial cavities 236 can house battery cells (not shown) that provide a source of power within the key 200, which provides power to the lock 100 when the key 200 and the lock 100 are engaged. The cavities 236 are preferably arranged in a side-by-side manner and surround a longitudinal axis of the key 200. The key 200 preferably includes a power source (discussed below) and can be rechargeable. Preferably, the key 200 includes a recharge port (not shown), which can mate with an associated recharge port of a recharger (not shown) when it is desired to recharge the key 200.

Figure 8:
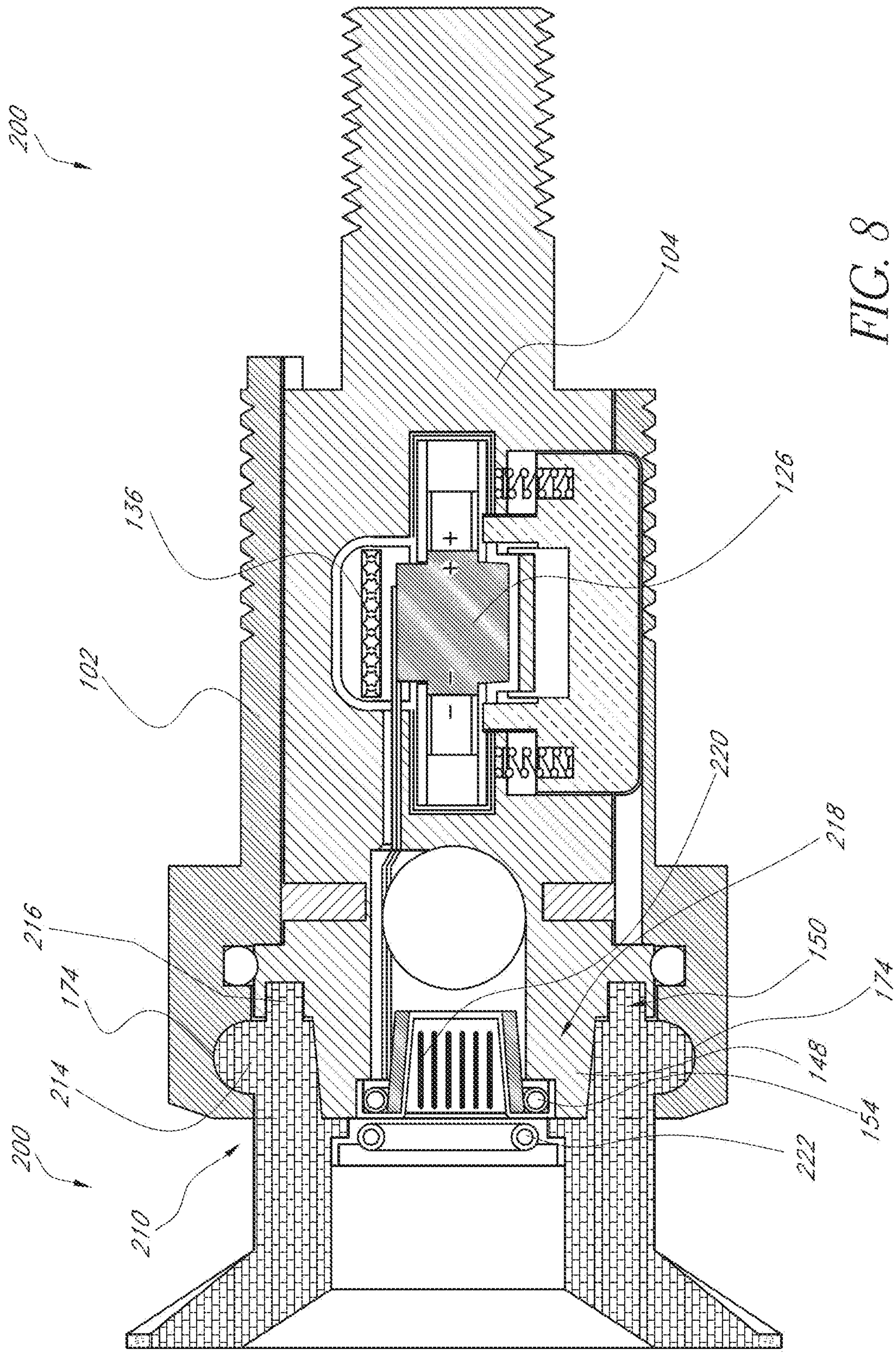
FIG. 8 is a cross-sectional side view of the lock and key assembly of FIG. 1 in a coupled position wherein a male probe of the key is inserted into a female receptacle of the lock.

With reference to FIGS. 2 and 8, the key 200 is shown about to engage the lock 100, and engaging the lock 100, respectively. When the key 200 engages with the lock 100, desirably, certain mechanical operations occur and certain electrical operations occur. When engaging the key 200 with the lock 100, the key 200 is rotationally positioned relative to the lock 100 such that the tabs 214 of the key 200 are aligned with the slots 176 (FIG. 2) of the lock 100. The key 200 is then displaced axially such that the tabs 214 pass through the slots 176 and the cylindrical portion 210 of the key 200 is positioned within the housing 102 of the lock 100. The key 200 is sized and shaped such that the tabs 214 are located within the annular groove 174, which has a shape that closely matches the profile of the tabs 214. In this relative position, the key 200 is able to rotate within the housing 100, so long as the key 200 is a proper match for the lock 100 and the lock is moved to the unlocked position, as is described in greater detail below.

Furthermore, when the key 200 engages the lock 100, the cylindrical extension 148 of the lock 100 is received within the recess 218 of the key. The recess 218 is defined by a tapered surface which closely matches a tapered outer surface of the cylindrical extension 148. The cooperating tapered surfaces facilitate smooth engagement of the lock 100 and key 200, while also ensuring proper alignment between the lock 100 and key 200. Furthermore, the rectangular extensions 216 of the key 200 insert into the recesses 150 of the lock 100 to positively engage the key 200 with the lock 100 so that rotation of the key 200 results in rotation of the lock cylinder 104 within the housing 102.

When the key 200 engages the lock 100, the power coil 220 of the key 200 is aligned for inductive coupling with the power coil 156 of the lock 100. Also, the data coil 222 of the key 200 is aligned for inductive coupling with the data coil 154 of the lock 100. Preferably, the power coil 220 of the key 200 is inserted into the cup portion 152 of the lock 100 and thus the power coil 156 of the lock 100 and the power coil 220 of the key 200 at least partially overlap along the longitudinal axis of the lock 100 and/or key 200. Furthermore, preferably, the data coil 154 of the lock 100 and the data coil 222 of the key 200 come into sufficient alignment for inductive coupling when the key 200 engages the lock 100. That is, in the illustrated arrangement, when the key 200 engages the lock 100, the data coil 222 of the key 200 and the data coil 154 of the lock 100 are positioned adjacent one another and, desirably, are substantially coaxial with one another. Furthermore, a plane which passes through the data coil 222 of the key 200 preferably is substantially parallel to a plane which passes through the data coil 154 of the lock 100. Desirably, the spacing between the data coils 154 and 222 is within a range of about 30-40 mils (or 0.03-0.04 inches). Such an arrangement is beneficial to reduce interference between the power transfer and the data transfer between the lock 100 and key 200, as is described in greater detail below. However, in other arrangements, a greater or lesser amount of spacing may be desirable.

In the illustrated embodiment of the lock and key system 10, when the key 200 engages the lock 100 there are two transfers that occur. The first transfer is a transfer of data and the second transfer is a transfer of power. During engagement of the key 200 and the lock 100, the data coils 222 and 154, in the illustrated embodiments, do not come into physical contact with one another. Similarly, the power coil 200 of the key 200 and power coil 156 of the lock 100, in the illustrated embodiment, do not come into physical contact with one another. The data is preferably transferred between the data coil 222 of the key 200 and the data coil 154 of the lock 100 by induction, as described in connection with FIG. 9 below. The power is also transferred between the power coil 200 of the key 200 and the power coil 156 of the lock 100 preferably once again by induction, as is also described in connection with FIG. 9 below. When engagement between the key 200 and the lock 100 has been made, a data protocol occurs which signals to the circuit board 134 that the proper key 200 has been inserted into the lock 100. Power is transferred from the key 200 to the lock 100 to activate the solenoid 126, which permits the lock 100 to be unlocked by rotation of the key 200.

III. ELECTRICAL ASPECTS OF THE KEY AND LOCK SYSTEM

Figure 9:
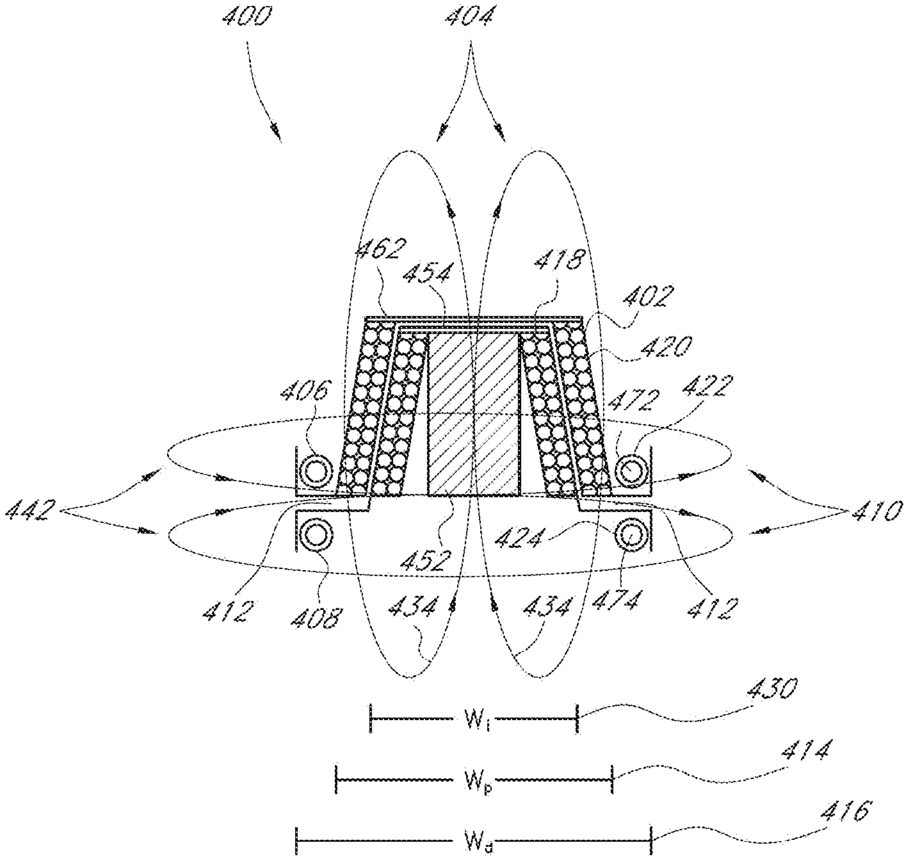
FIG. 9 is a cross-sectional side view diagram of magnetic fields in accordance with certain embodiments.

FIG. 9 depicts an embodiment of a magnetic field diagram 400. In the magnetic field diagram 400, a cross-section view of a power coil 402, interior power coil 418, first data coil 406, and second data coil 408 are depicted in relation to a power magnetic field 404 and a data magnetic field 410 generated by the coils 406 and 408. In the depicted embodiment, the configuration of the power coil 402, interior power coil 418, first data coil 406, and second data coil 408 causes the power magnetic field 404 to be orthogonal or substantially orthogonal to the data magnetic field 410 at certain locations. This orthogonal relationship facilitates data transfer between the data coils 406, 408 with little or no interference from the power magnetic field 404. The coils 402, 406, 408 and 418, as illustrated, correspond with the power and data coils of the lock 100 and key 200 of FIGS. 1-8. In particular, the power coil 402 corresponds with the lock power coil 156, the interior power coil 418 corresponds with the key power coil 220, the data coil 406 corresponds with the lock data coil 154 and the data coil 408 corresponds with the key data coil 222. However, the physical relationships between the coils may be altered in alternative embodiments from the locations shown in FIGS. 1-8; however, preferably the interference reduction or elimination concepts disclosed herein are still employed.

The power coil 402 of certain embodiments is a solenoid. The solenoid includes windings 420 which are loops of wire that are wound tightly into a cylindrical shape. In the depicted embodiment, the power coil 402 includes two sets of windings 420. Two sets of windings 420 in the power coil 402 reduce air gaps between the wires and thereby increase the strength of a magnetic field generated by the power coil 402.

The depicted embodiment of the power coil 402 does not include a magnetic core material, such as an iron core, although in certain embodiments, a magnetic core material may be included in the power coil 402. In other embodiments, while the power coil 402 is depicted as a solenoid, other forms of coils other than solenoids may be used.

The power coil 402 may form a portion of a lock assembly, though not shown, such as any of the lock assemblies described above. Alternatively, the power coil 402 may be connected to a key assembly, such as any of the key assemblies described above. In addition, the power coil 402 may be connected to a docking station (not shown), as described in connection with FIG. 10, below.

The power coil 402 is shown having a width 414 (also denoted as "$W_P$"). The width 414 of the power coil 402 is slightly flared for the entire length of the power coil 402. The overall shape of the power coil 402, including its width 414, determines in part the shape of the magnetic field emanating from the power coil 402. In certain embodiments, a constant or approximately constant width 414 of the power coil 402 does not change the shape of the power magnetic field 404 substantially from the shape illustrated in FIG. 9.

The power coil 402 further includes a casing 462 surrounding the power coil 402. In one embodiment, the casing 462 is a non-conducting material (dielectric). The casing 462 of certain embodiments facilitates the power coil 402 receiving the interior power coil 418 inside the power coil 402. The casing 462 prevents electrical contact between the power coil 402 and the interior power coil 418. Thus, in the embodiment described with reference to FIGS. 1-8, the cup 152 of the lock 100 may be constructed from, or include, an insulation material. Furthermore, other physical structures interposed between adjacent coils may be made from, or include, insulating materials.

In alternative embodiments, the casing 462 is made of a metal, such as steel. The strength of a metal casing 462 such as steel helps prevent tampering with the power coil 402. However, magnetic fields often cannot penetrate more than a few layers of steel and other metals. Therefore, the metal casing 462 of certain embodiments includes one or more slits or other openings (not shown) to allow magnetic fields to pass between the power coil 402 and the interior power coil 418.

The interior power coil 418 mates with the power coil 402 by fitting inside the power coil 402. In certain embodiments, the interior power coil 418 has similar characteristics to the power coil 402. For instance, the interior power coil 418 in the depicted embodiment is a solenoid with two windings 420. In addition, the interior power coil 418 may receive a current and thereby generate a magnetic field. The interior power coil 418 is also covered in a casing material 454, which may be an insulator or metal conductor, to facilitate mating with the power coil 402. Furthermore, the interior power coil 418 also has a width 430 (also denoted "$W_I$") that is less than the width 414 of the power coil 402, thereby allowing the interior power coil 418 to mate with the power coil 402.

In addition to these features, the interior power coil 418 of certain embodiments includes a ferromagnetic core 452, which may be a steel, iron, or other metallic core. The ferromagnetic core 452 increases the strength of the power magnetic field 404, enabling a more efficient power transfer between the interior power coil 418 and the power coil 402. In addition, the ferromagnetic core 452 in certain embodiments enables the frequency of the power signal to be reduced, allowing a processor in communication with the power coil 418 to operate at a lower frequency and thereby decrease the cost of the processor.

The interior power coil 418 may form a portion of a lock assembly, though not shown, such as any of the lock assemblies described above. Alternatively, the interior power coil 418 may be connected to a key assembly, such as any of the key assemblies described above. In addition, the interior power coil 418 may be connected to a docking station (not shown), as described in connection with FIG. 10, below.

A changing current flow through the interior power coil 418 induces a changing magnetic field. This magnetic field, by changing with respect to time, induces a changing current flow through the power coil 402. The changing current flow through the power coil 402 further induces a magnetic field. These two magnetic fields combine to form the power magnetic field 404. In such a state, the power coil 402 and the interior power coil 418 are "inductively coupled," which means that a transfer of energy from one coil to the other occurs through a shared magnetic field, e.g., the power magnetic field 402. Inductive coupling may also occur by sending a changing current flow through the power coil 402, which induces a magnetic field that in turn induces current flow through the interior power coil 418. Consequently, inductive coupling may be initiated by either power coil.

Inductive coupling allows the interior power coil 418 to transfer power to the power coil 402 (and vice versa). An alternating current (AC) signal flowing through the interior power coil 418 is communicated to the power coil 402 through the power magnetic field 404. The power magnetic field 404 generates an identical or substantially identical AC signal in the power coil 402. Consequently, power is transferred between the interior power coil 418 and the power coil 402, even though the coils are not in electrical contact with one another.

In certain embodiments, the interior power coil 418 has fewer windings than the power coil 402. A voltage signal in the interior power coil 418 is therefore amplified in the power coil 402, according to known physical relationships in the art. Likewise, a voltage signal in the power coil 402 is reduced or attenuated in the interior power coil 418. In addition, the power coil 402 may have fewer windings than the interior power coil 418, such that a voltage signal from the interior power coil 418 to the power coil 402 is attenuated, and a voltage signal from the power coil 402 to the interior power coil 418 is amplified.

The power magnetic field 404 is shown in the depicted embodiment as field lines 434; however, the depiction of the power magnetic field 404 with field lines 434 is a model or representation of actual magnetic fields, which in some embodiments are changing with respect to time. Therefore, the power magnetic field 404 in certain embodiments is depicted at a moment in time. Moreover, the depicted model of the power magnetic field 404 includes a small number of field lines 434 for clarity, but in general the power magnetic field 404 fills all or substantially all of the space depicted in FIG. 9.

Portions of the field lines 434 of the power magnetic field 404 on the outside of the power coil 402 are parallel or substantially parallel to the axis of the power coil 402. The parallel nature of these field lines 434 in certain embodiments facilitates minimizing interference between power and data transfer, as is described below.

The first data coil 406 is connected to the power coil 402 by the casing 462. The first data coil 406 has one or more windings 422. In one embodiment, the first data coil 406 is a toroid including tightly-wound windings 422 around a ferromagnetic core 472, such as steel or iron. The ferromagnetic core 472 of certain embodiments increases the strength of a magnetic field generated by the first data coil 406, thereby allowing more efficient transfer of data through the data magnetic field 410. In addition, the ferromagnetic core 472 in certain embodiments enables the frequency of the data signal to be reduced, allowing a processor in communication with the first data coil 406 to operate at a lower frequency and thereby decreasing the cost of the processor.

Though not shown, the first data coil 406 may further include an insulation material surrounding the first data coil 406. Such insulation material may be a non-conducting material (dielectric). In addition, the casing 462 covering the power coil 402 in certain embodiments also at least partially covers the first data coil 406, as shown. The casing 462 at the boundary between the first data coil 406 and the second data coil 408 may also include a slit or other opening to allow magnetic fields to pass between the first and second data coils 406, 408.

The first data coil 406 has a width 416 (also denoted as "$W_d$"). This width 416 is greater than the width 414 of the power coil 402 in some implementations. In alternative embodiments, the width 416 may be equal to or less than the width 414 of the power coil 402.

The second data coil 408 in the depicted embodiment is substantially identical to the first data coil 406. In particular, the second data coil 408 is a toroid including tightly-wound windings 424 around a ferromagnetic core 474, such as steel or iron. The ferromagnetic core 474 of certain embodiments increases the strength of a magnetic field generated by the second data coil 408, thereby allowing more efficient transfer of data through the data magnetic field 410, allowing a processor in communication with the second data coil 408 to operate at a lower frequency and thereby decreasing the cost of the processor.

The second data coil 408 in the depicted embodiment has a width 416 equal to the width 414 of the first data coil 406. In addition, the second data coil 408 may have an insulating layer (not shown) and may be covered by the casing 454, as shown. However, in certain embodiments, the second data coil 408 has different characteristics from the first data coil 406, such as a different number of windings 424 or a different width 416. In addition, first and second data coils 406, 408 having different widths may overlap in various ways.

When a current is transmitted through either the first data coil 406 or the second data coil 408, the first data coil 406 and the second data coil 408 are inductively coupled, in a similar manner to the inductive coupling of the power coil 402 and the interior power coil 418. Data in the form of voltage or current signals may therefore be communicated between the first data coil 406 and the second data coil 408. In certain embodiments, data may be communicated in both directions. That is, either the first or second data coil 406,

408 may initiate communications. In addition, during one communication session, the first and second data coils 406, 408 may alternate transmitting data and receiving data.

Data magnetic field 410 is depicted as including field lines 442, a portion of which are orthogonal or substantially orthogonal to the data coils 406, 408 along their width 416. Like the field lines 434, 436 of the power magnetic field 404, the field lines 442 of the data magnetic field 410 are a model of actual magnetic fields that may be changing in time. The orthogonal nature of these field lines 442 in certain embodiments facilitates minimizing the interference between power and data transfer.

In various embodiments, at least a portion of the data magnetic field 410 is orthogonal to or substantially orthogonal to the power magnetic field 404 at certain areas of orthogonality. These areas of orthogonality include portions of an interface 412 between the first data coil 406 and the second data coil 408. This interface 412 in certain embodiments is an annular or circumferential region between the first data coil 406 and second data coil 408. At this interface, at least a portion of the data magnetic field 410 is substantially parallel to the first data coil 406 and second data coil 408. Because the data magnetic field 410 is substantially parallel to the data coils 406, 408, the data magnetic field 410 is therefore substantially orthogonal to the power magnetic field 404 at portions of the interface 412.

According to known relationships in the physics of magnetic fields, magnetic fields which are orthogonal to each other have very little effect on each other. Thus, the power magnetic field 404 at the interface 412 has very little effect on the data magnetic field 410. Consequently, the data coils 406 and 408 can communicate with each other with minimal interference from the potentially strong power magnetic field 404. In addition, data transmitted between the data coils 406, 408 does not interfere or minimally interferes with the power magnetic field 404. Thus, data may be sent across the data coils 406, 408 simultaneously while power is being sent between the power coil 402 and the interior power coil 418.

Figure 10:
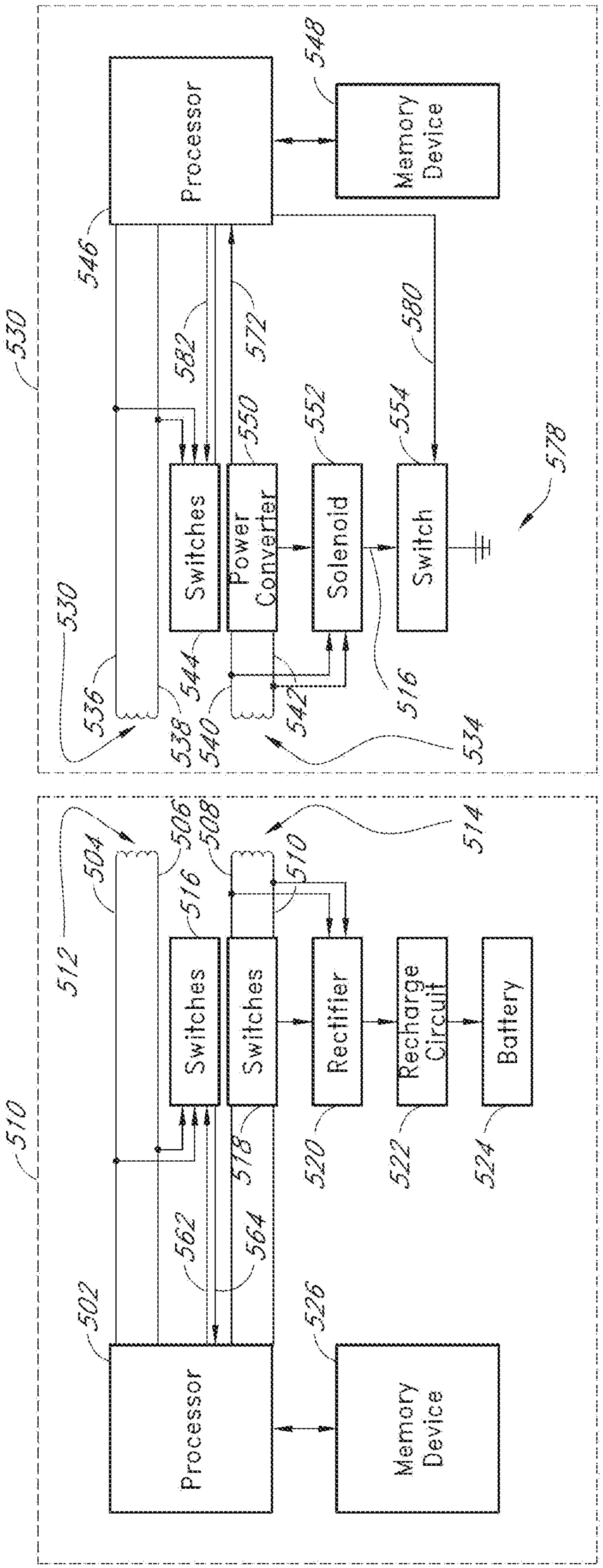
FIG. 10 is an example block diagram of circuit components in accordance with certain embodiments.

FIG. 10 depicts embodiments of a key circuit 510 and a lock circuit 530. In the depicted embodiment, the key circuit 510 is shown in proximity to the lock circuit 530. The relative locations of the key circuit 510 and the lock circuit 530 shows that in certain implementations components of the key circuit 510 interface with components of the lock circuit 530. Moreover, the key circuit 510 may in certain embodiments be contained in a key assembly such as any of the keys described above. Likewise, the lock circuit 530 may be contained in a lock assembly such as any of the locks described above.

The key circuit 510 includes a processor 502. The processor 502 may be a microprocessor, a central processing unit (CPU), a microcontroller, or other type of processor. The processor 502 in certain embodiments implements program code. By implementing program code, the processor 502 sends certain signals to the lock circuit 530 and receives signals from the lock circuit 530. Such signals may include power signals, data signals, and the like.

A memory device 526 is in communication with the processor 502. The memory device 526 in certain embodiments is a flash memory, hard disk storage, an EEPROM, or other form of storage. The memory device 526 in certain embodiments stores program code to be run on the processor 502. In addition, the memory device 526 may store data received from the processor 502.

Data stored on the memory device 526 may include encryption data. In one embodiment, the encryption data includes one or more encryption keys that when communicated to the lock circuit 530 effectuate unlocking a lock. Several different encryption schemes may be used in various embodiments.

Data stored by the memory device 526 may also include audit data. Audit data in some implementations is data received from the lock circuit 530 or generated by the key circuit 510 that identifies past transactions that have occurred between the lock and other keys. For instance, audit data may include ID numbers of keys used to access the lock, including keys which unsuccessfully used the lock. This data allows security personnel to monitor which individuals have attempted to access the lock. The audit data may further include several other types of information.

A data coil 512 is in communication with the processor 502 through conductors 504 and 506. The data coil 512 may be any of the data coils described above. The data coil 512 in certain embodiments receives data from the processor 502. This data may be in the form of a voltage or current signal which changes with respect to time, such that certain changes in the signal represent different symbols or encoded information. Because the signal changes with respect to time, a magnetic field is generated in the data coil 512 which induces a magnetic field in a corresponding data coil 532 in the lock circuit 530. The magnetic field in the data coil 532 further induces a voltage or current signal, which contains the same information or substantially the same information as the voltage or current signal generated in the data coil 512. Thus, the data coil 512 facilitates communication between the key circuit 510 and the lock circuit 530.

In certain embodiments, the data coil 512 receives data in a like manner from the data coil 532 of the lock circuit 530. A voltage or current signal induced in the data coil 512 is sent to the processor 502, which processes the information conveyed in the voltage or current signal. The data coil 512 may also send and receive information to and from a docking station (not shown), which is described more fully below.

One or more switches 516 are in communication with the data coil 512 and with the processor 502. The switches 516 in certain embodiments are transistor switches, relays, or other forms of electronic switches which selectively direct current flow to different parts of the key circuit 510. In the depicted embodiment, switches 516 direct current flow between the data coil 512 and the processor 502. The switches 516 therefore selectively allow the processor 502 to both send and receive data.

A power coil 514 is in communication with the processor 502 via conductors 508 and 510. The power coil 514 in certain embodiments transmits power to the key circuit 530. In certain implementations, the power coil 514 may be any of the power coils described above. In one implementation, the power coil 514 receives an alternating current (AC) signal. This AC signal induces a magnetic field in a corresponding power coil 534 in the lock circuit 530. In one embodiment, the AC signal oscillates at an appropriate frequency to effectuate optimal power transfer between the key circuit 510 and the lock circuit 530. For example, the oscillation may occur at 200 kilohertz. Alternatively, the oscillation may occur at a different frequency which may be chosen so as to minimize interference with other circuit components.

One or more switches 518 are in communication with the power coil 514 and a processor 502. Like the switches 516, the switches 518 may be transistor switches, relays or any other form of electronic switch. The switches 518 in certain embodiments allow power to be transmitted to the power coil 514 from the processor 502. In such embodiments, the switches 518 are closed, allowing current to transfer from the processor 502 to the power coil 514. The switches 518 may be opened when the power coil 514 is receiving power such as from a docking station. When the switches 518 are open, power received from the power coil 514 in certain embodiments cannot be transmitted to the processor 502. The switches 518 therefore protect the processor 502 from receiving harmful current signals while simultaneously allowing the processor 502 to transmit power to the power coil 514.

A rectifier circuit 520 is in communication with the power coil 514 via conductors 508 and 510. The rectifier circuit 520 in certain embodiments includes one or more diodes. The diodes may form a bridge rectifier or other form of rectifier. The diodes of the rectifier circuit 520 rectify an incoming signal from the power coil 514. Rectification in certain embodiments includes transforming an alternating current signal into a direct current signal by converting the AC signal into one of constant polarity. Rectification may further include smoothing the signal, for example, by using one or more capacitors, and thereby creating a direct current signal that can power circuit components.

A recharge circuit 522 is in communication with the rectifier 520. The recharge circuit 522 in certain embodiments recharges a battery 524 when the key circuit 510 is in communication with a docking station (not shown). The battery 524 may be a lithium iron battery, a nickel cadmium battery or other form of rechargeable battery. The battery may also be an alkaline or other non-rechargeable battery. In addition, the battery 524 may include multiple batteries. In one embodiment, the battery 524 receives power from the recharge circuit 522 in order to recharge the battery. In addition, the battery 524 sends power to the processor 502, to the memory device 526, and to other components in the key circuit 530.

In some implementations, the key circuit 510 is capable of communicating with a docking station (not shown) connected to an AC power supply, such as a wall outlet. The docking station in one embodiment has a power coil and a data coil, similar to a power coil 534 and data coil 532 of the lock circuit 530 described below. The docking station receives the data coil 512 and the power coil 514 such that the key circuit 510 can communicate with the docking station. In one embodiment, the power coil 514 receives power from the docking station and transfers this power to the rectifier 520 and recharge circuit 522, effectuating recharge of the battery 524.

In addition, the data coil 512 may receive data from a corresponding data coil in the docking station. Such information might include, for example, program code to be stored on the memory device 526, program code to be run on the processor 502, data to be stored in the memory device 526 including encryption data, data regarding locking codes and the like, as well as ID data, tracking data, and the like. In addition, the docking station may transmit data, codes, or the like to the key circuit 510 which enable the key to be used for a limited time, such as a couple of hours or days. The data coil 512 may also transmit data to the docking station via a corresponding data coil. Such data might also include audit information, tracking information, and the like.

The docking station may also be connected to a computer. Programs can be run on the computer which facilitate the docking station communicating with the key circuit 510. Consequently, the key circuit 510 may be recharged and reprogrammed by the docking station of certain embodiments.

Turning to the lock circuit 530, the lock circuit 530 includes a processor 546. Like the processor 502 of the key circuit 510, the processor 546 may be a microprocessor, a central processing unit (CPU), or any other type of processor. The processor 546 in certain embodiments implements program code. By implementing program code, the processor 546 may send certain signals to the key circuit 510 and receive signals from the key circuit 510. Such signals may include power signals, data signals, and the like.

A memory device 548 is in communication with the processor 546. The memory device 548 in certain embodiments is a flash memory, hard disk storage, an EEPROM, or other form of storage. The memory device 548 in certain embodiments stores program code to be run on the processor 546. In addition, the memory device 548 may store data received from the processor 546.

Data stored on the memory device 548 may include encryption data. In one embodiment, the encryption data includes one or more encryption keys. When an identical encryption key is received from a key circuit 510 in certain embodiments, the lock circuit 530 unlocks a lock. The memory device 548 may also include audit data. This data allows security personnel to monitor which individuals have attempted to access the lock.

A data coil 532 is in communication with the processor 546 through conductors 536 and 538. The data coil 532 may be any of the data coils described above. The data coil 532 in certain embodiments receives data from the processor 546 and transmits the data to the key circuit 510. In other embodiments, the data coil 532 receives data from the key circuit 510 via magnetic fields generated by the data coil 512.

One or more switches 544 are in communication with the data coil 532 and with the processor 546. The switches 544 in certain embodiments are transistor switches, relays, or other forms of electronic switches which selectively direct current flow to different parts of the key circuit 530. In the depicted embodiment, switches 544 may be used to direct current flow between the data coil 532 and the processor 546. Like the switches 516 in the key circuit 510, the switches 544 selectively allow the processor 502 to both send and receive data.

A power converter 550 is in communication with the processor 546 and with the power coil 534. The power converter 550 in one embodiment includes a rectifier circuit such as the rectifier circuit 528 described above. The power converter 550 may further include a low drop-out regulator (described in connection with FIG. 11, below). In addition, the power converter may include other circuit components common to power regulation.

In one embodiment, the power converter 550 receives an oscillating power signal from the power coil 534. The power converter 550 includes a rectifier circuit, similar to the rectifier circuit 520 described above, which converts the oscillating signal into two components, namely an AC component signal and a direct current (DC) component signal. In one embodiment, the AC component signal is provided to a solenoid 552 through conductor 574, and the DC component signal is provided to the processor 546 through conductor 572. Consequently, the power converter 550 enables the lock circuit 530 to run on both AC and DC power.

The solenoid 552 receives the AC component signal from the power converter 550. The solenoid 552 in one embodiment is a coil containing one or more windings. The solenoid 552, upon receiving current from the power converter 550, generates a magnetic field to actuate an unlocking mechanism in a lock, in a manner similar to that which is described above.

A switch 554 is in communication with the solenoid 552 through a conductor 576. The switch 554 is also in communication with the processor 546 through a conductor 580. In addition, the switch 554 is in communication with ground 578. The switch 554 enables or disables the solenoid 552 from receiving current, thereby causing the solenoid 552 to lock or unlock. In one embodiment, the processor 546 sends a signal through the conductor 580 to the switch 554 that closes the switch 554 and thereby creates a conduction path from the solenoid 552 to ground 578. With the switch closed 554, the solenoid 552 is able to receive current from the power converter 550 and thereby effectuate unlocking. At other times, the processor 546 will not send a signal 580 to the switch 554 and thereby cause the switch to be open, preventing current from flowing through the solenoid 552 and thereby locking the lock. Alternatively, the processor 546 can send a signal over the signal line 580 to the switch 554 which will cause the switch to remain open.

While not shown, in certain embodiments the lock circuit 530 includes a battery in addition to, or in place of, the battery 524 in the key circuit 500. In such instances, the lock circuit 530 may provide power to the key circuit 510. This power may recharge the battery 524. Alternatively, if the key circuit 510 does not have a battery 524, power transmitted from the battery in the lock circuit 530 may power the key circuit 510.

Figures 1, 11A:
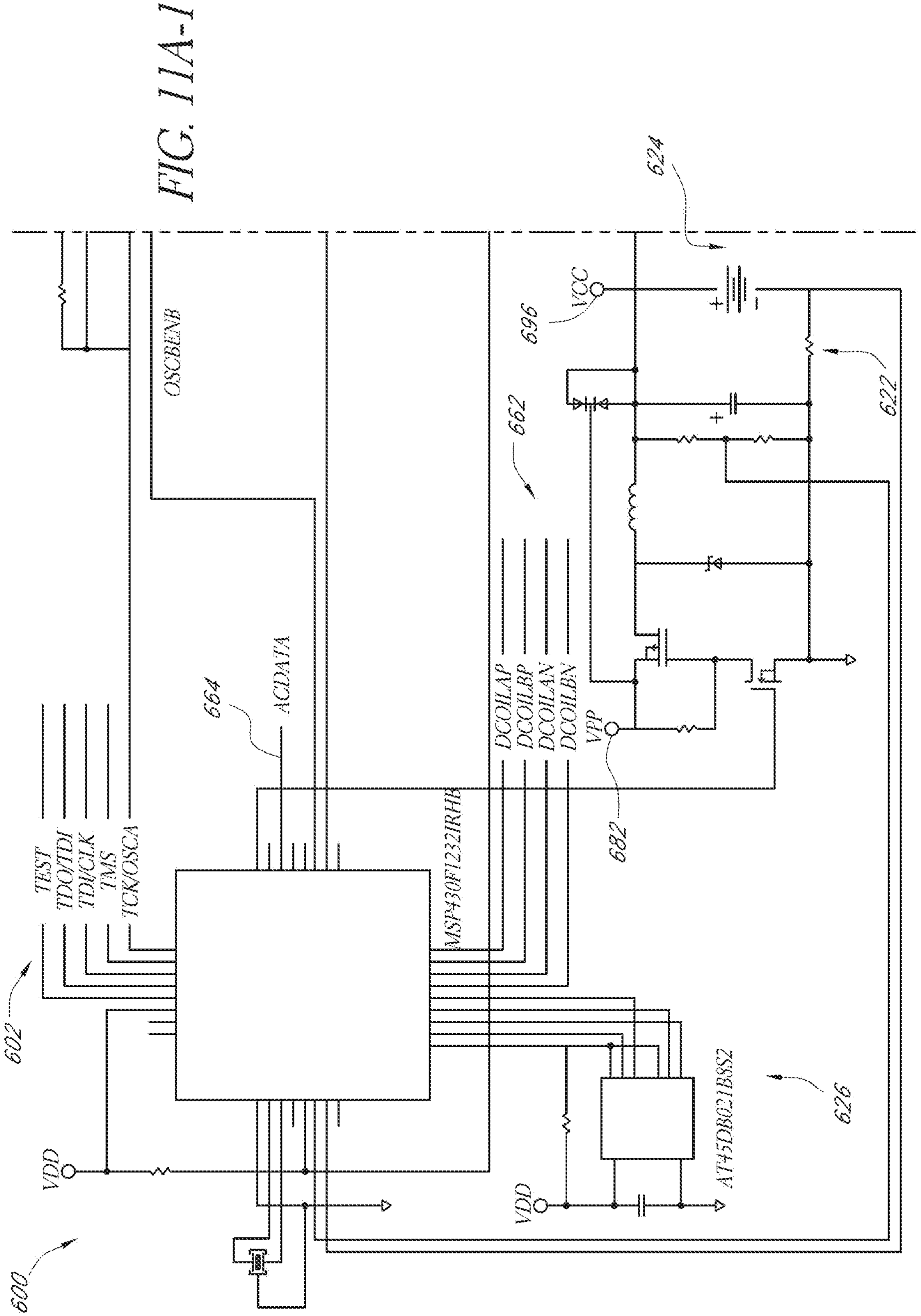
Figures 2, 11A:
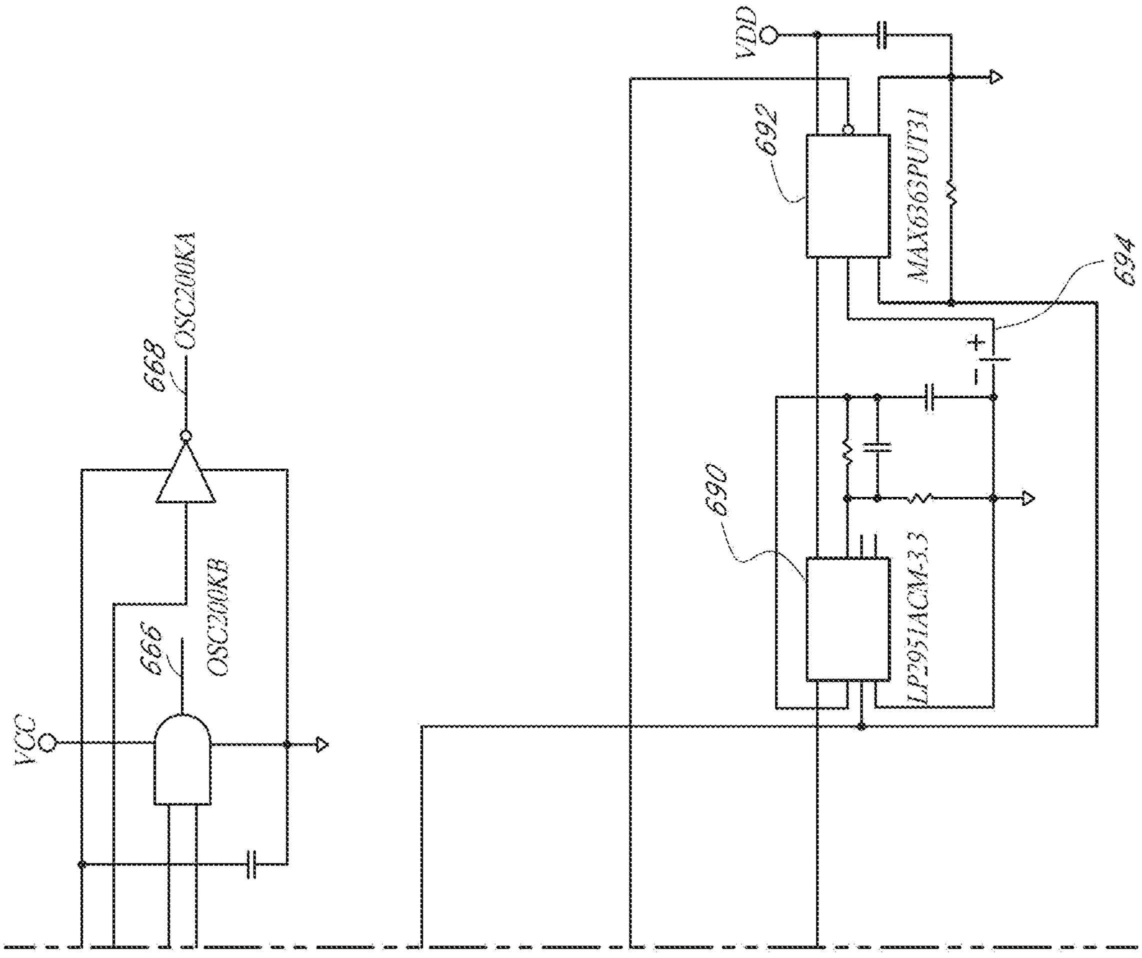
Figures 1, 11B:
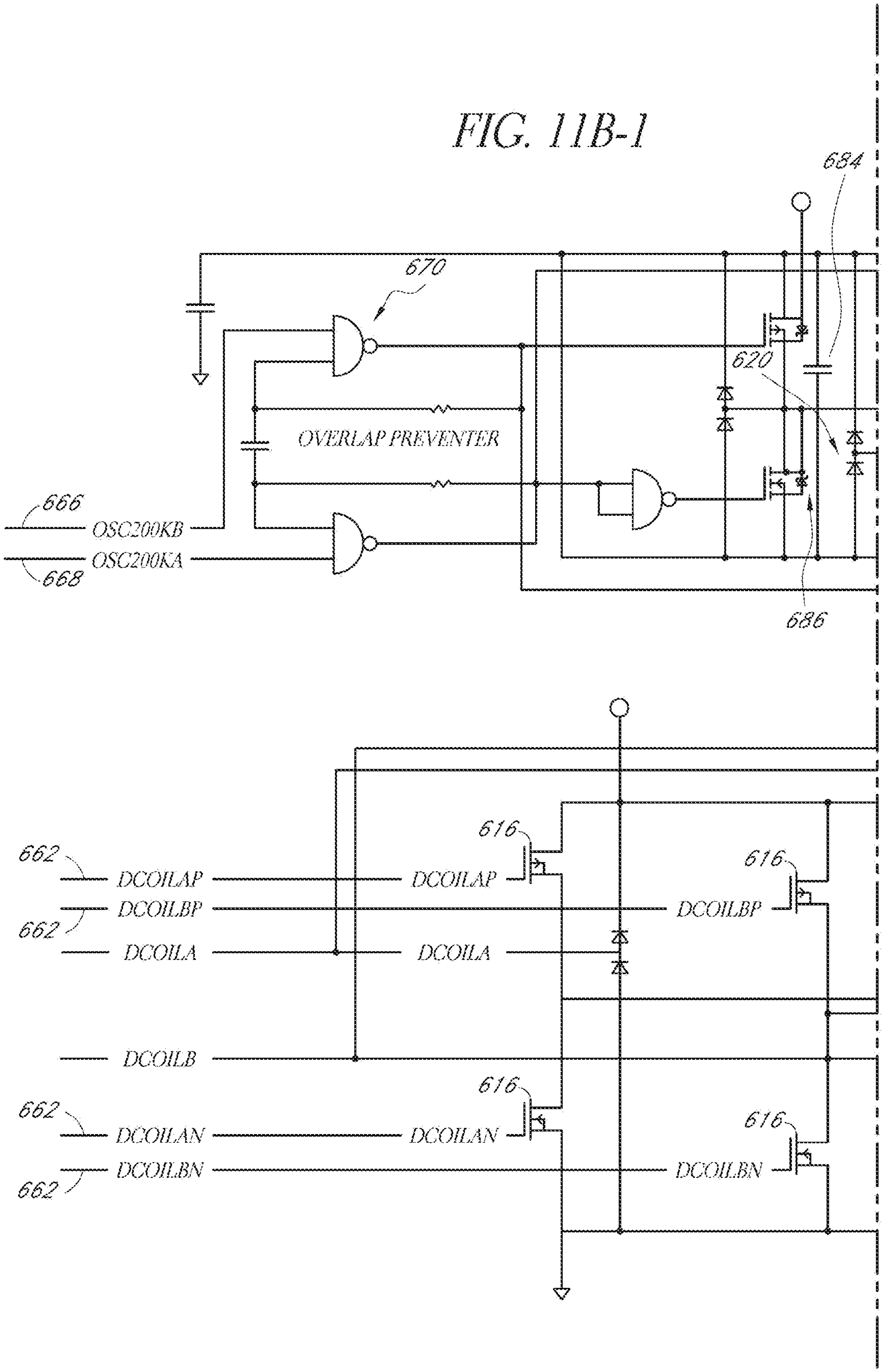
Figures 2, 11B:
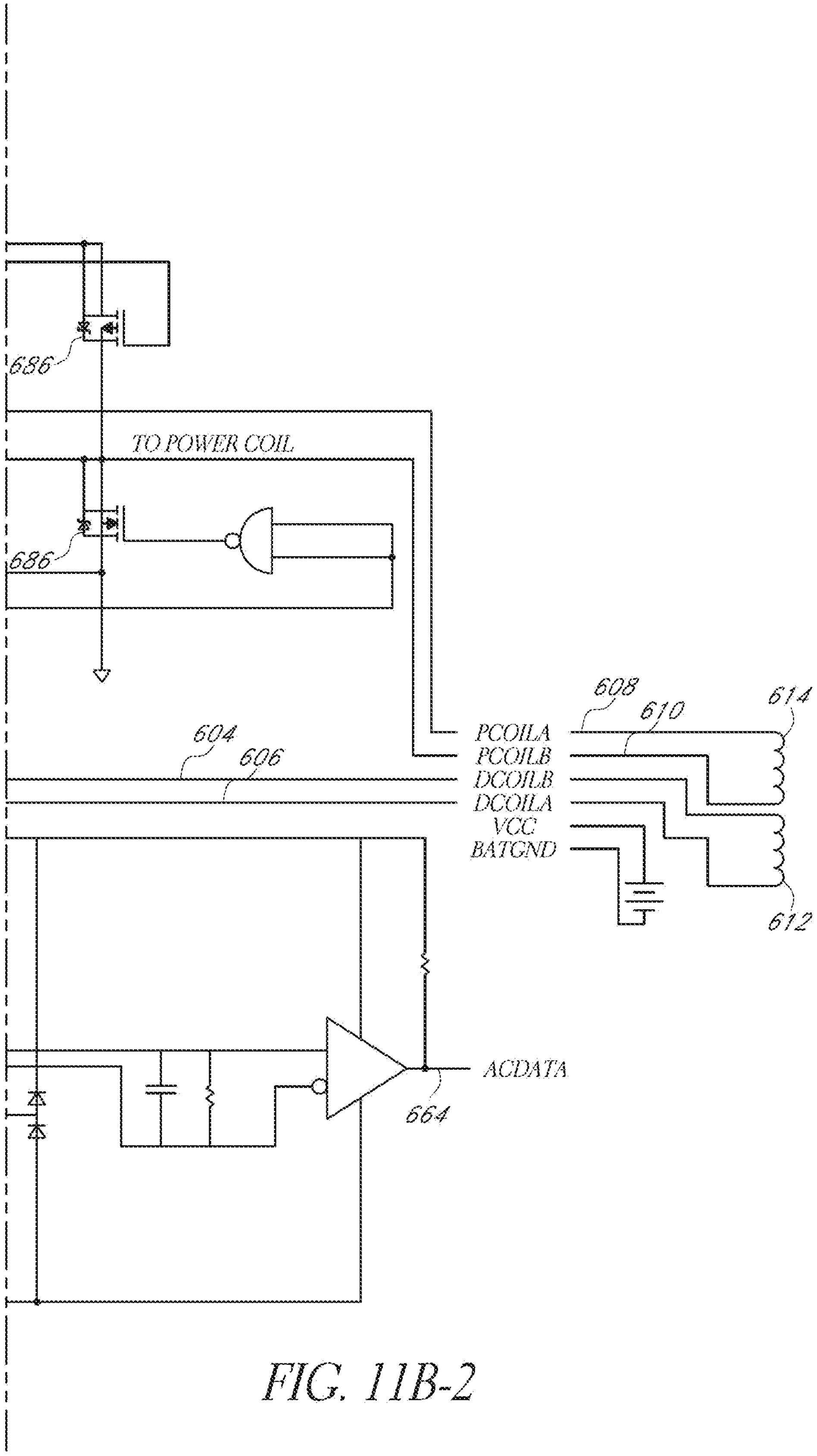

FIGS. 11A-1-11A-2 ("FIG. 11A") and 11B-1-11B-2 ("FIG. 11B") depict one specific implementation of a key circuit, referred to by the reference numeral 600, which is substantially similar in structure and function to the key circuit 510 described above. FIGS. 11A and 11B depict separate portions of the key circuit 600, but these separate portions together constitute one key circuit 600. Certain components of the key circuit 600 are therefore duplicated on each FIGURE to more clearly show the relationship between the portion of the key circuit 600 depicted in FIG. 11A with the portion of the key circuit 600 depicted in FIG. 11B. Although the implementation shown in FIGS. 11A and 11B is depicted, other suitable implementations may also be used, which may include features alternative or additional to those described above.

A processor 602 in the key circuit 600 is in communication with a memory device 626, similar to the processor 502 and the memory device 526 of the key circuit 510. In the depicted embodiment, the processor 602 is a microcontroller and the memory device 626 is a flash memory device. While the processor 602 and the memory device 626 are shown on both FIGS. 11A and 11B, in the depicted embodiment only one processor 602 and one memory device 626 are employed in the key circuit 600. However, in other embodiments, multiple processors 602 and memory devices 626 may be used.

A data coil 612, shown in FIG. 11B, is in communication with the processor 602 through conductors 604 and 606. The data coil 612 in the depicted embodiment is a coil or solenoid which has a value of inductance (a measure of changing magnetic energy for a given value of current). In one embodiment, the inductance of the data coil 612 is 100 pH (micro-Henries). In certain embodiments, the data coil 612 sends data to and receives data from a lock circuit 700 (shown in FIG. 12).

Transistors 616 are depicted as switches in FIG. 11B. Similar to the switches 516, the transistors 616 selectively direct current flow between the data coil 612 and the processor 602. Control signals sent on conductors 662 from the processor 602 selectively allow current to flow through the transistors 616. When the transistors 616 are activated by control signals from the processor 602, and when the processor 602 is sending signals to the data coil 612, the data coil 612 transmits the data. Alternatively, when the data coil 612 is receiving data, the transistors 616 in conjunction with other circuit components direct the data to the processor 602 through the ACDATA line 664. Consequently, the key circuit 600 can both send and receive data on the data coil 612.

Various encoding schemes may be used to transmit and receive data. For example, a Manchester encoding scheme may be used, where each bit of data is represented by at least one voltage transition. Alternatively, a pulse-width modulation scheme may be employed, where a signal's duty cycle is modified to represent bits of data. Using different encoding schemes may allow the key circuit 600 to contain fewer components. For example, when a pulse-width modulation scheme is used, such as in FIGS. 13A and 13B below, fewer transistors 616 may be employed. By employing fewer components, the key circuit 600 of certain embodiments may be reduced in size, allowing a corresponding key assembly to be reduced in size. In addition, using a relatively simple modulation scheme such as Manchester encoding or pulse-width modulation reduces the need for filters (e.g., low-pass filters), thereby further reducing the number of components in the key circuit 600.

A power coil 614 is in communication with the processor 604 through conductors 608 and 610 (see FIG. 11B). In one embodiment, the inductance of the power coil 612 is 10 pH (micro-Henries). Like the power coil 514 of FIG. 10, the power coil 614 in certain embodiments transmits power to the lock circuit 700 described in connection with FIG. 12, below.

In the depicted embodiment, the processor 602 generates two oscillating signals which are provided to the power coil 614. In the depicted embodiment, the oscillating power signals oscillate at 200 kHz (kilohertz). The relative high frequency of the power signal in certain embodiments facilitates improved rectification of the power signal and therefore a more efficient power transfer. In alternative embodiments other frequencies may be chosen without departing from the scope of the inventions described herein.

In one embodiment, the power signals sent over power coil 614 oscillate at a higher frequency than the data signals sent over the data coil 612. When the power signals oscillate at a higher frequency than the data signals, interference between power and data signals is further minimized, e.g., the signal-to-noise ratio (SNR) is improved. In one embodiment, significant SNR improvements occur when the power signal frequency is greater than 10 times the data signal frequency.

Diodes 620 are in communication with the power coil 614 through conductors 608 and 610. The diodes 620 in the depicted embodiment form a rectifier circuit, similar to the rectifier circuit 520 of FIG. 10. The depicted configuration of the diodes 620 constitutes a bridge rectifier, or full wave rectifier. The bridge rectifier receives power from the power coil 614 when, for example, the key circuit 600 is in communication with a docking station. In such instances, the diodes 620 of the bridge rectifier in conjunction with a capacitor 684 convert an incoming AC signal into a DC signal. This DC signal is denoted by voltage Vpp 682 in the depicted embodiment.

The voltage Vpp 682 is provided to a recharge circuit 622 (see FIG. 11A). The recharge circuit 622 recharges a battery 624 using Vpp 682. The battery 624 outputs a voltage Vcc

696, which is sent to various components of the key circuit 600 including to a voltage regulator 690. The voltage regulator 690 provides a constant voltage to a supervisory circuit 692, which is in communication with a backup battery 694. If the battery 624 fails, in certain embodiments, the supervisory circuit 692 provides power to the circuit through the backup battery 694. Consequently, data stored in the memory device 626 is protected from loss by the supervisory circuit 692 and by the backup battery 694.

Figures 1, 12:
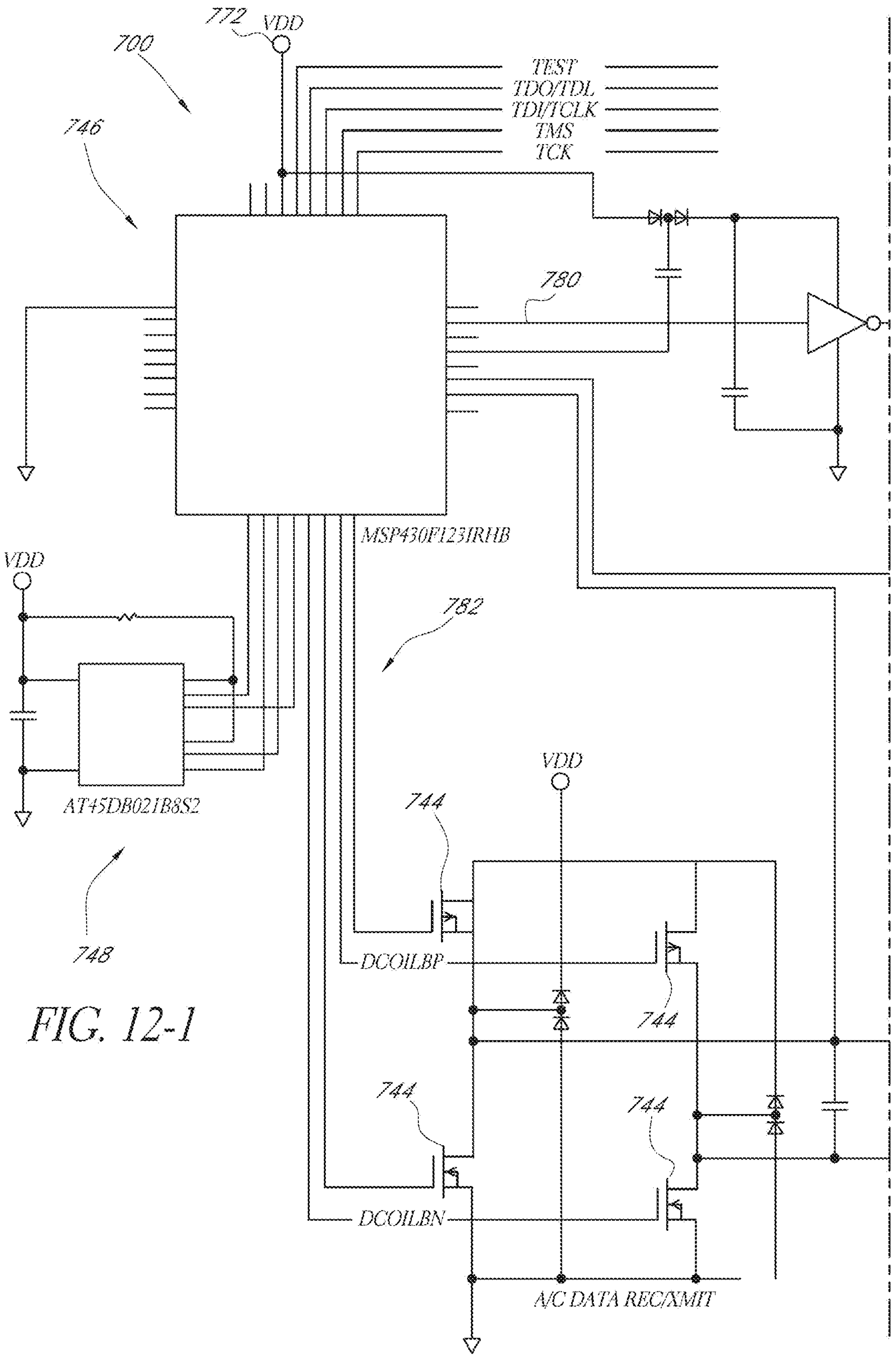
Figures 2, 12:
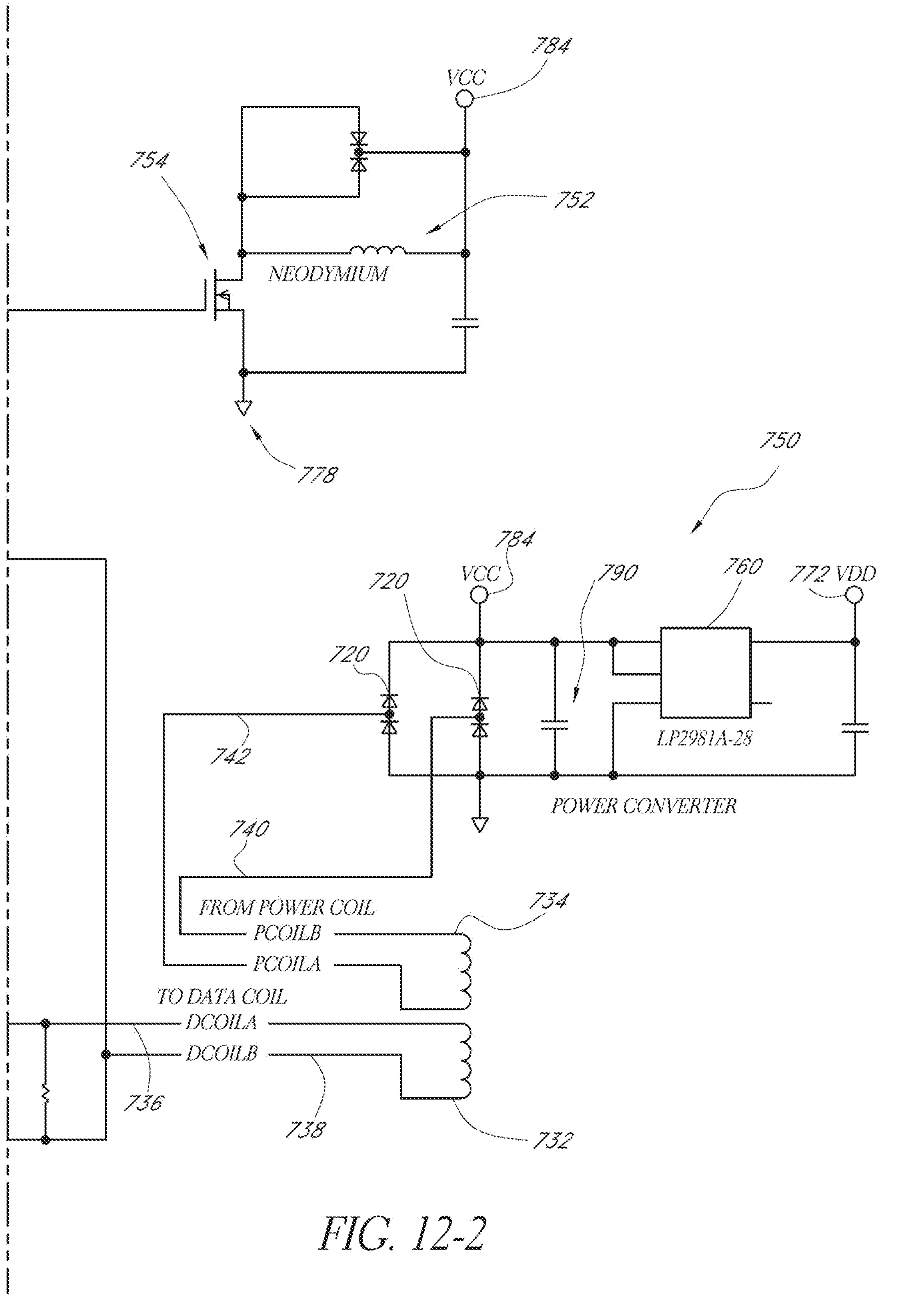

FIGS. 12-1 and 12-2 ("FIG. 12") depict a specific implementation of a lock circuit, generally referred to by the reference numeral 700, which is substantially similar in structure and function to the lock circuit 530 described above. The lock circuit 700 includes a processor 746. The processor 746, like the processor 602, is a microcontroller. The processor 746 communicates with a memory device 748, which in the depicted embodiment is a flash memory. Although the specific implementation of the lock circuit 700 illustrated in FIG. 12 is one implementation of the lock circuit 530, other suitable implementations may also be used, which may include alternative or additional features to those described above.

In the lock circuit 700, a data coil 732 is in communication with the processor 746 through conductors 736 and 738. The data coil 732 in the depicted embodiment is a coil or solenoid which has a value of inductance. In one embodiment, the inductance of the data coil 732 is 100 μH (microHenries). The data coil 732 receives data from and sends data to the data coil 612 of the key circuit 600.

In one embodiment, data provided by the key circuit 600 and received by the data coil 732 provides a clock signal to the processor 746, enabling the processor 746 to be synchronized or substantially synchronized with the processor 602 of the key circuit 600. The clock signal may be provided, for example, when a Manchester encoding scheme is used to transmit the data. In certain embodiments, this external clock signal removes the need for a crystal oscillator in the lock circuit 700, thereby reducing the number of components and therefore the size of the lock circuit 700.

Transistors 744 are depicted as switches. Similar to the switches 544, the transistors 744 selectively direct current flow between the data coil 732 and the processor 746. Control signals sent on conductor 782 from the processor 746 control the transistors 744, selectively allowing current to flow through the transistors 744.

A power coil 734 is in communication with the processor 746 through conductors 740 and 742. In one embodiment, the inductance of the power coil 734 is 10 pH (microHenries). Like the power coil 532 of FIG. 10, the power coil 734 in certain embodiments receives power from the key circuit 600. In the depicted embodiment, the power coil 734 provides an AC voltage signal to power conversion circuit 750.

Power conversion circuit 750 includes diodes 720, a capacitor 790, and a low-dropout regulator 760. The diodes 720 of the power conversion circuit 750 form a rectifier circuit. The depicted configuration of the diodes 720 constitutes a bridge rectifier, or full wave rectifier. When the diodes 720 receive an AC voltage signal from the power coil 734, the diodes 720 of the bridge rectifier full-wave rectify the AC voltage signal. This full-wave rectified signal in certain embodiments still contains a changing voltage signal with respect to time, but the voltage signal has a single polarity (e.g., the entire voltage signal is positive). This full-wave rectified signal is provided as voltage Vcc 784 to a solenoid 752.

The capacitor 790 converts the full-wave rectified signal into DC form and provides the DC signal to the low-dropout regulator 760. The low-dropout regulator 760 stabilizes the signal to a voltage Vdd 772, which is provided to various components in the lock circuit 700, including the processor 746. Consequently, the power conversion circuit 750 provides a changing or AC voltage Vcc 784 to the solenoid 752 and a DC voltage Vdd 772 to various circuit components.

The solenoid 752 receives the voltage Vcc 784 from the power converter 750. The solenoid 752 in one embodiment is a coil containing one or more windings. The solenoid 752, upon receiving the voltage Vcc 784 from the power converter 550, generates a magnetic field to actuate an unlocking mechanism in a lock, in a manner similar to that which is described above.

A transistor 754 is in communication with the solenoid 752. The transistor 754 is also in communication with the processor 746 through a conductor 780. In addition, the transistor 754 is in communication with ground 778. In certain embodiments, the transistor 754 acts as a switch to enable or disable the solenoid 752 from receiving current, thereby causing the solenoid 752 to lock or unlock the locking device. In one embodiment, the processor 746 sends a signal through the conductor 780 to the transistor 754 that sends current through the transistor 754 and thereby creates a conduction path from the solenoid 752 to ground 778. With the transistor 754 in this state, the solenoid 752 is able to receive current from the voltage Vcc 784 and thereby effectuate unlocking. However, at other times, the processor 746 will not send a signal 780 to the transistor 754, such as when the processor 746 did not receive a correct unlocking code. In such case, the processor 746 causes the transistor 754 to remain open, thereby preventing current from flowing through the solenoid.

Figures 1, 13A:
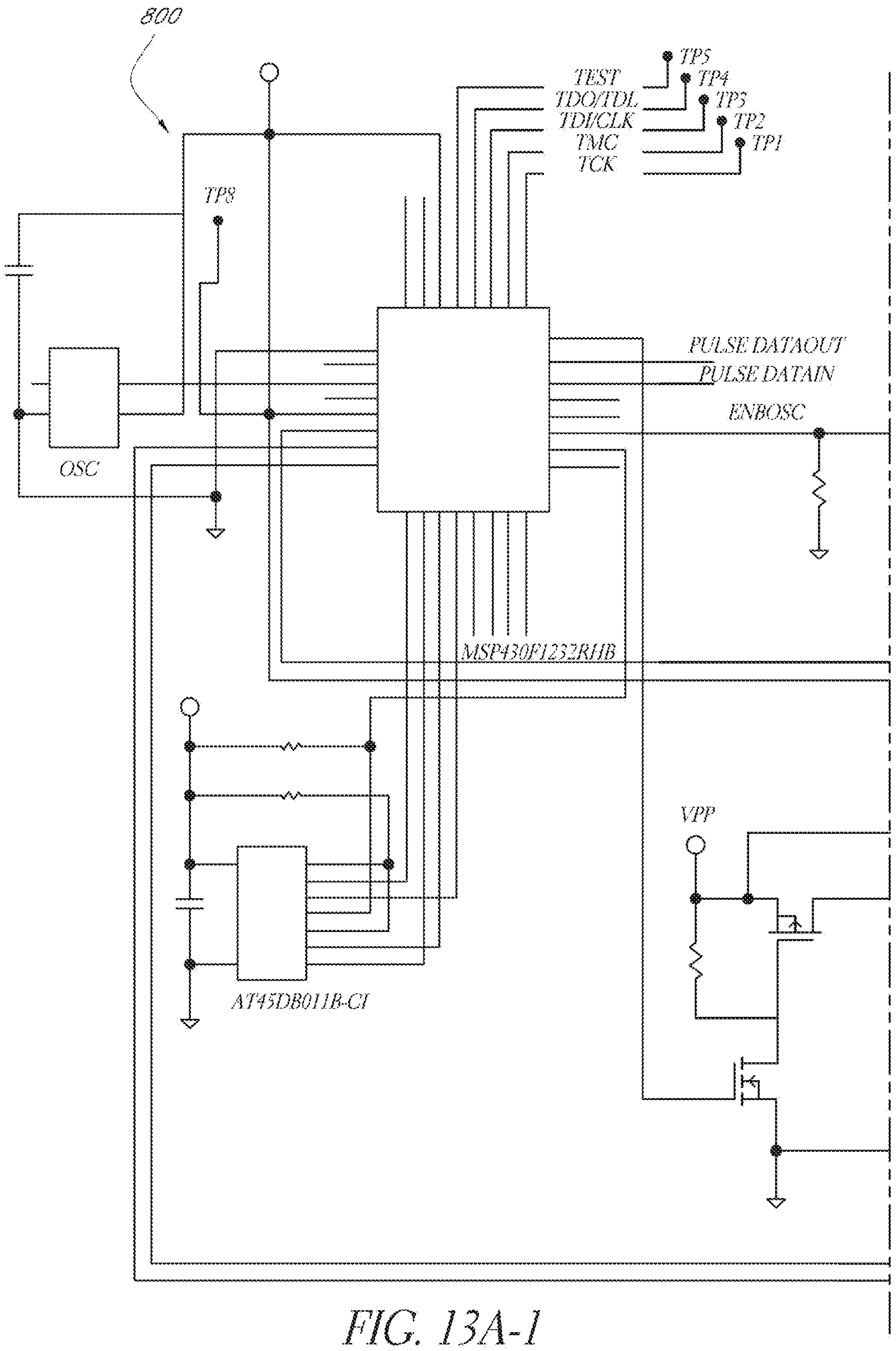
Figures 2, 13A:
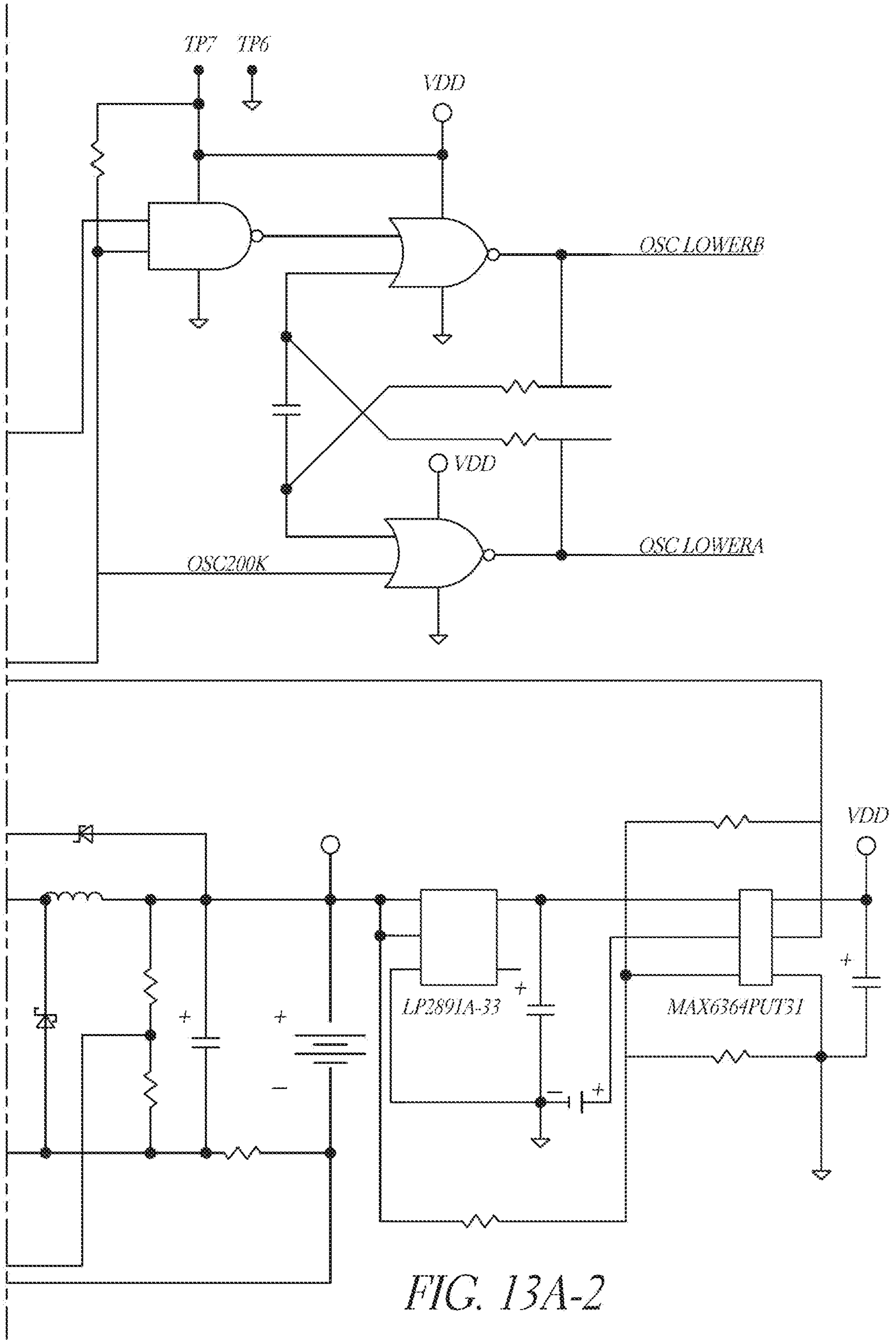
Figures 1, 13B:
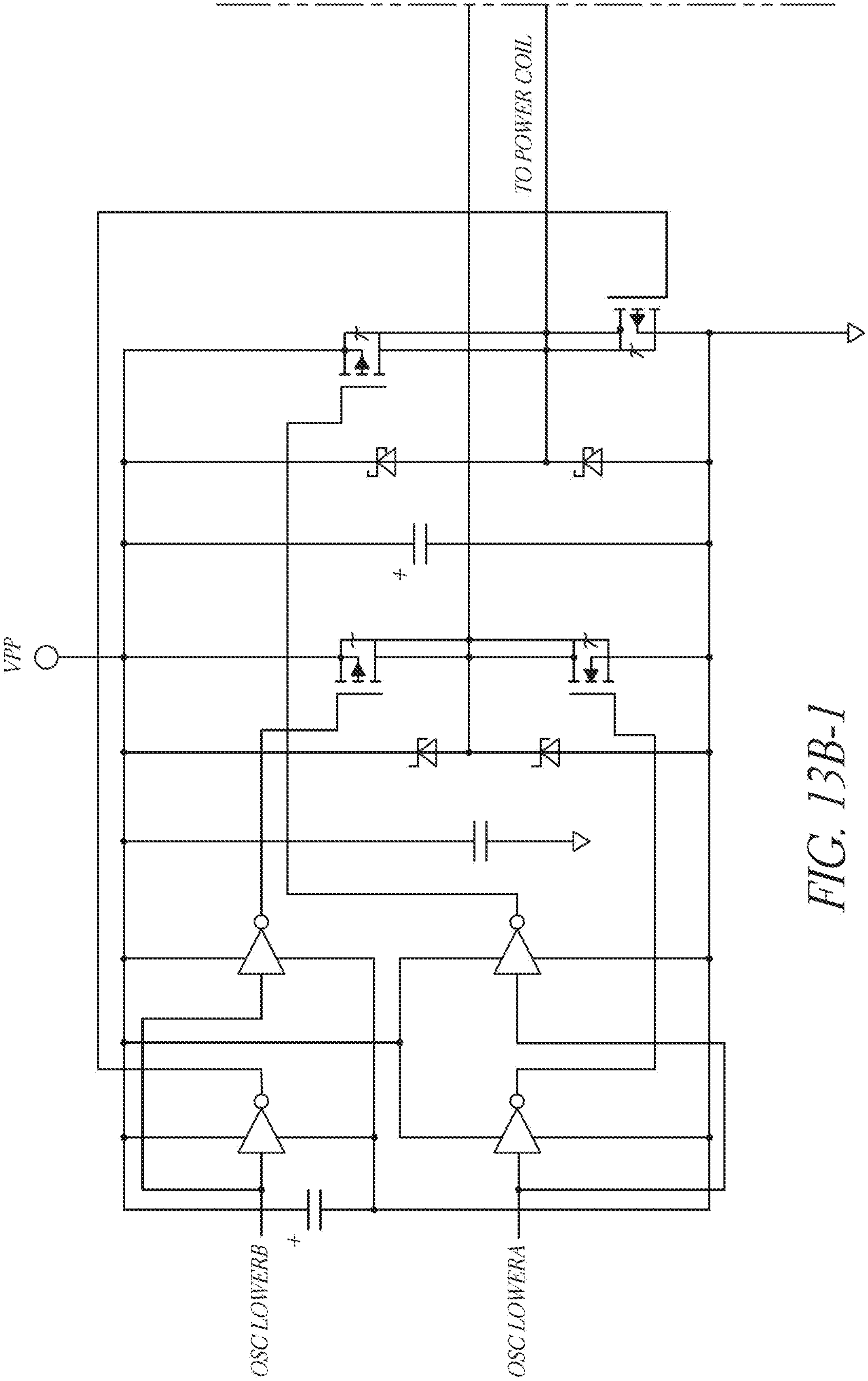
Figures 2, 13B:
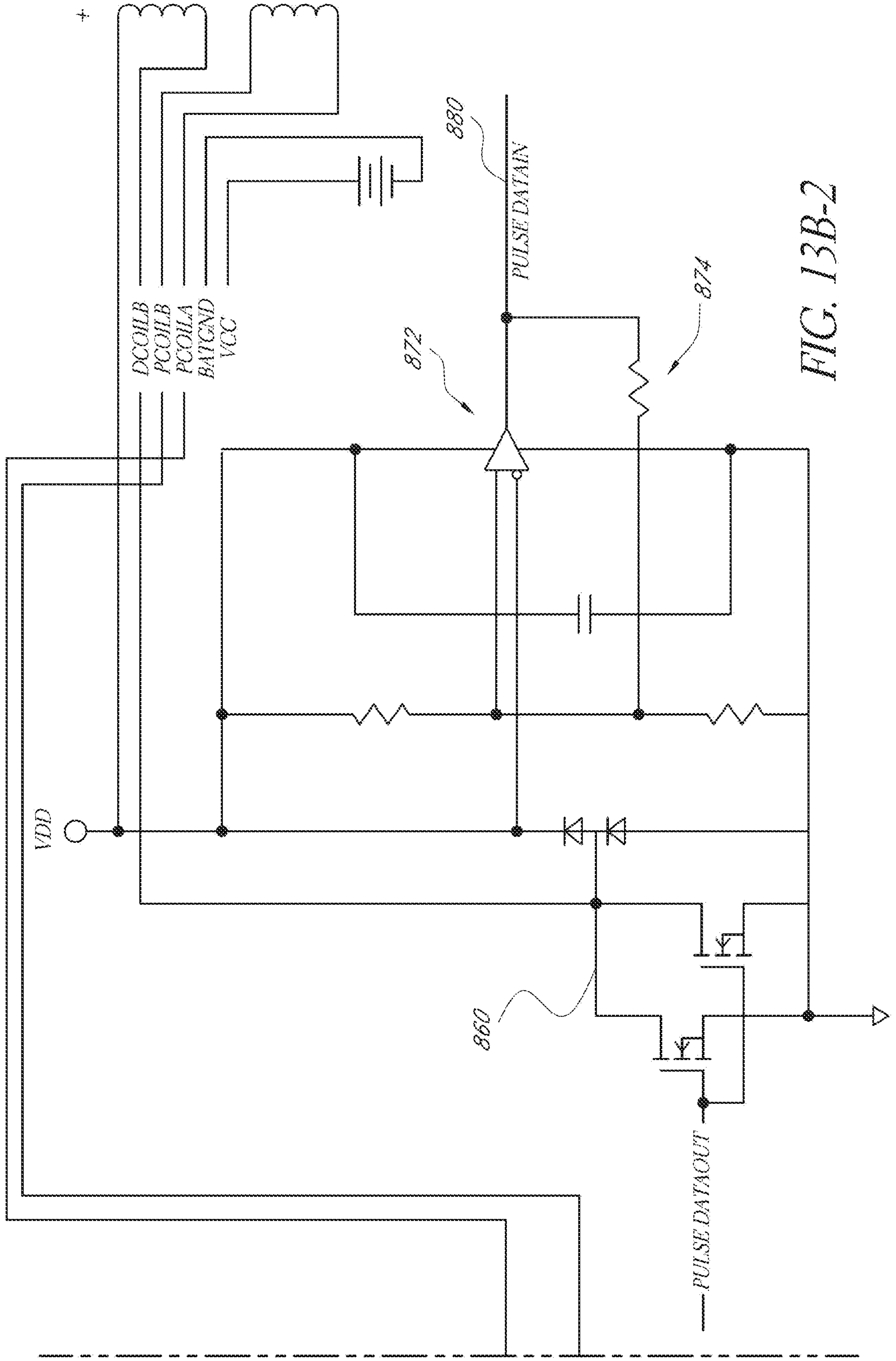

FIGS. 13A-1-13A-2 ("FIG. 13A") and 13B-1-13B-2 ("FIG. 13B") depict another specific implementation of a key circuit, referred to by the reference numeral 800, which is substantially similar in structure and function to the key circuit 600 described in FIGS. 11A and 11B above. In certain embodiments, certain elements of the key circuit 600, such as circuit components 860, 872, and 874 (shown in FIG. 13B), may also be employed in a corresponding lock circuit (not shown).

In the depicted embodiment, circuit components 860, 872, and 874 in conjunction with a processor provide circuitry for a pulse-modulation data-encoding scheme. During transmission of data from the key circuit 800, transistor switches 860 are selectively switched on and off to pulse a data signal to a data coil. When the key circuit 800 is receiving data, the comparator 872 receives the data voltage signal from the data coil.

The comparator 872 is used to convert the data voltage signal into a two-bit digital signal which is sent to a processor via data input line 880. In addition, the comparator 872 (or an operational amplifier used as a comparator) may be used to amplify the voltage signal to a level appropriate for a processor to manipulate.

A feedback resistor 874 provides positive feedback to the comparator 872, such that the comparator 872 attenuates small voltage signals and amplifies large voltage signals. By attenuating and amplifying small and large voltage signals respectively, the comparator 872 and feedback resistor 874 reduce the oscillatory effects of noise on the comparator 872. Thus, wrong-bit detection errors are reduced. In alternative embodiments, a Schmitt trigger integrated circuit may be employed in place of the comparator 872 and the resistor 874.

IV. HOLDING COIL EMBODIMENTS

The cartridge 106 described above includes, in certain embodiments, a single solenoid 122 used for movement of the slide bars 128 (see, e.g., FIG. 4). Excitation of the solenoid 122 can create magnetic fields that cause the slide bars 128 to move away from the extensions 131 of the bolt 130, allowing the lock to be actuated. However, in some implementations, exciting the solenoid 122 with enough energy to move the slide bars 128 can consume a substantial amount of current.

Keeping the slide bars 128 spaced from the solenoid 122 may also expend current. As the slide bars 128 move farther from the solenoid 122, the magnetic field loses intensity because the field strength of a magnet can decrease proportionally to $1/r^3$, where r is the distance from the face of the magnet. As a result, the farther the slide bars 128 are from the solenoid 122, the more current may be expended to keep the slide bars 128 spaced from the solenoid 122.

Conversely, the smaller r is, the stronger the magnetic field strength can be. Thus, in certain embodiments, one or more holding coils may be provided to assist the solenoid 122 with moving and/or holding the slide bars 128 (see FIGS. 14 through 16). The one or more holding coils may be positioned to reduce r from at least one face of a slide bar. Advantageously, in certain implementations, the one or more holding coils can therefore reduce the current used to move and/or hold the slide bar or bars by an order of magnitude or more. In one implementation, for example, the current usage is 1/15th or less of the current used by the solenoid 122 described above. Current savings provided by the one or more holding coils can enable use of a smaller power supply, among other benefits (see, e.g., FIG. 19A).

Figure 14B:
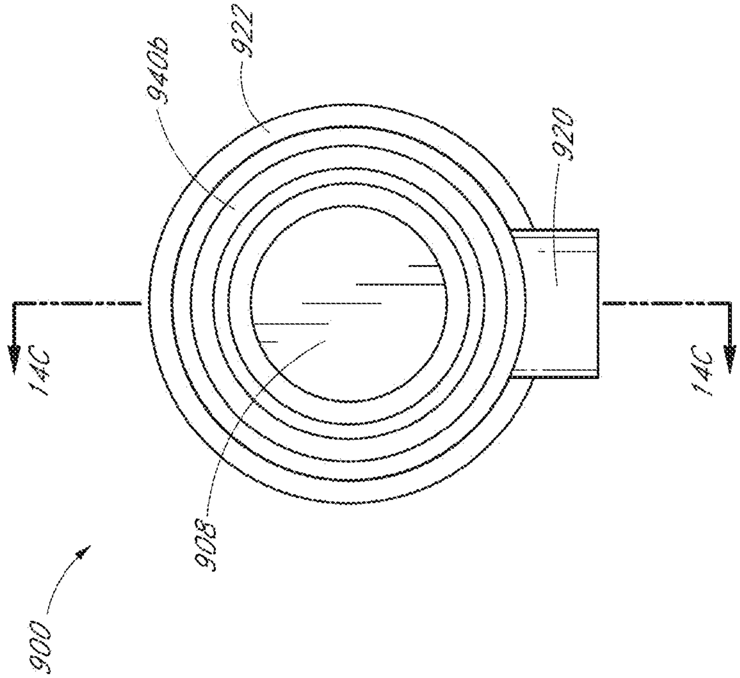
FIG. 14B illustrates a front sectional view of an embodiment of the coil assembly of FIG. 14A.
Figure 14A:
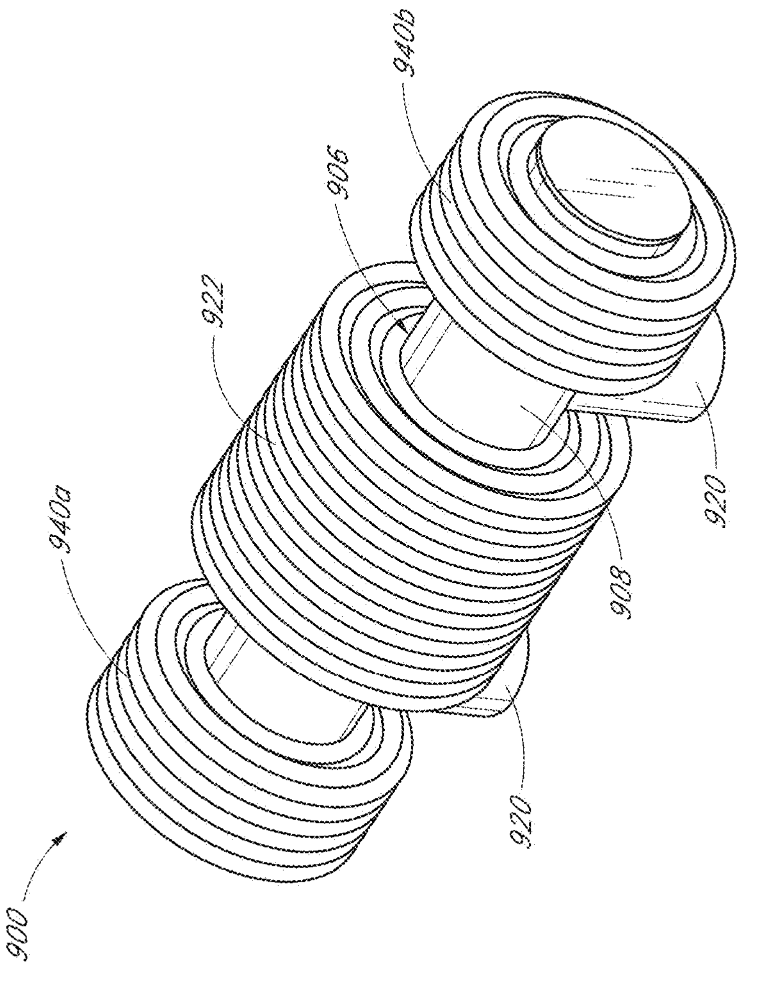
FIG. 14A illustrates a side perspective view of an embodiment of a coil assembly.
Figure 14C:
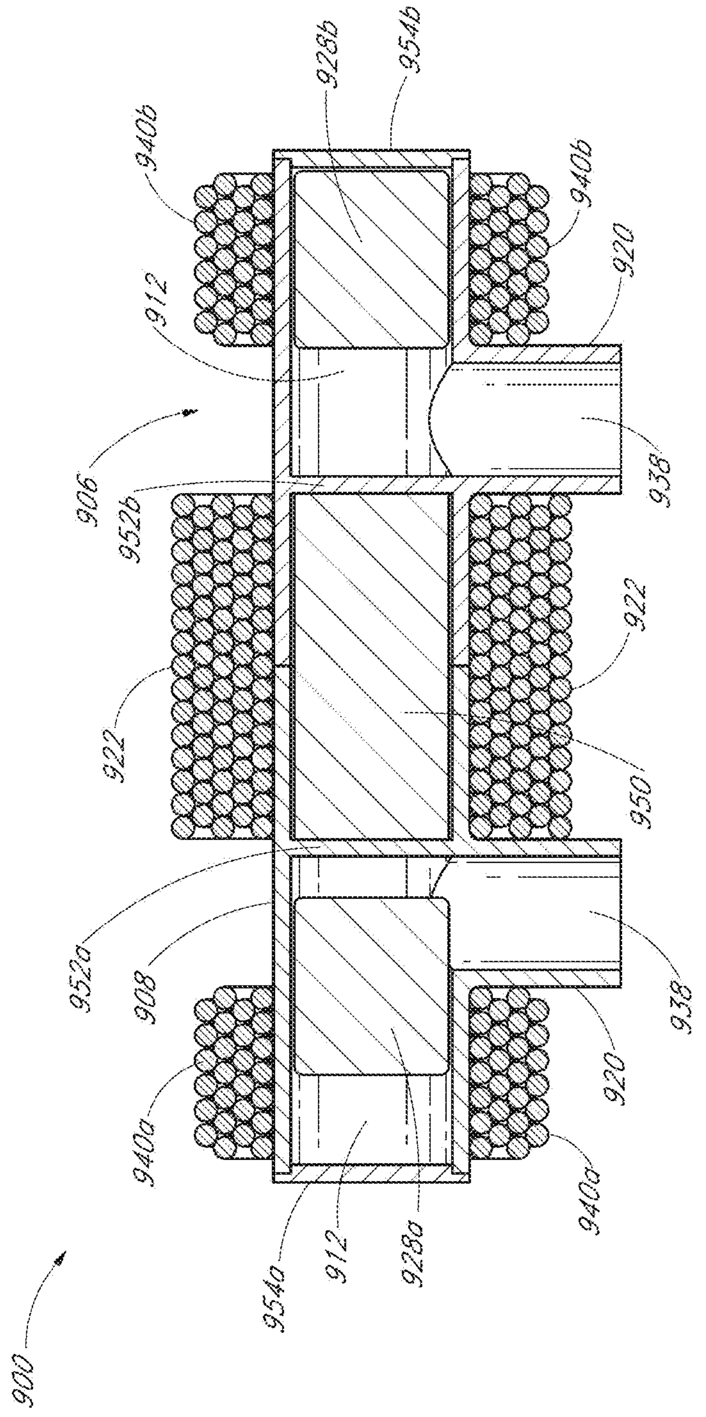
FIG. 14C illustrates a cross-sectional side view of an embodiment of the coil assembly of FIG. 14B.

Turning to FIGS. 14A through 14C, several views of embodiments of a coil assembly 900 having holding coils are shown. In particular, FIG. 14A illustrates a side perspective view of the coil assembly 900, FIG. 14B illustrates a front view of the coil assembly 900, and FIG. 14C illustrates a cross-sectional side view of the coil assembly 900 taken along the line 14C-14C in FIG. 14B.

The coil assembly 900 may be used in conjunction with some or all of the lock assemblies described above. For example, the coil assembly 900 can be used in the lock 100 described above in place of one or more of the cartridge 106, solenoid 126, and slide bars 128, among possibly other things. Alternatively, the coil assembly 900 may be used in a different lock assembly. One embodiment of a lock assembly that could use the coil assembly 900 is described below with respect to FIG. 21.

Referring specifically to FIG. 14A, the coil assembly 900 includes a cartridge 906, which may include some or all of the features of the cartridge 106 described above. Likewise, the coil assembly 900 includes a primary coil 922 positioned around the cartridge 906. The primary coil 922 may include some or all of the features of the solenoid 126 described above. The coil assembly 900 also includes two holding coils 940*a*, 940*b* for assisting with moving and/or holding slide bars 928*a*, 928*b* (FIG. 14C).

Each of the coils 922, 940*a*, 940*b* includes one or more windings of wire wrapped around the cartridge 906. The holding coils 940*a*, 940*b* are spaced from the primary coil 922 in the depicted embodiment. Other configurations than shown may be used, such as wires wrapped partially around the cartridge 906. Also not shown, but which may be included, are connections to a circuit for controlling the coils 922, 940*a*, 940*b*. An example circuit for controlling the coils 922, 940*a*, 940*b* is described below with respect to FIG. 17. In addition, some or all of the circuitry described above with respect to FIGS. 10 through 13 may be used or adapted to control the coils 922, 940*a*, 940*b*.

The cartridge 906 includes a body portion 908 and extension receiving portions 920. The body portion 908 preferably is cylindrical or substantially cylindrical. The extension receiving portions 920 protrude from the body portion 908 and are likewise preferably cylindrical or substantially cylindrical. Non-cylindrical configurations of the body and extension receiving portions 908, 920 may be used in other embodiments. The extension receiving portions 920 may be used to receive extensions of a locking mechanism (see, e.g., FIGS. 4 and 14-16). For example, the extensions of a locking mechanism may slide along one or more surfaces 938 of the extensions 920 or otherwise extend into and/or pass through the extensions 920 (FIG. 14C).

Referring to FIG. 14C, the body portion 908 in the depicted embodiment houses a core 950 and slide bars 928*a*, 928*b*. The core 950 may be made of a soft metal material, such as iron, for example but without limitation. The core 950 is disposed within the body 908 of the cartridge such that the core 950 is also positioned within the primary coil 922. As such, the core 950 may serve to increase the inductance of the primary coil 922 when the primary coil 922 is energized 922. Some implementations may not include the core 950. In the illustrated configuration, the core 950 is substantially axially coextensive with the primary coil 922. Other configurations may be possible.

In an implementation, the primary coil may have an inductance of about 15 pH without the core 950. Addition of the iron core 950 may increase this inductance by orders of magnitude, such as 500 times or more. The inductance of the holding coils 940*a*, 940*b* may be, in one implementation, about 8 to 10 μH. However, the inductance values provided here are mere examples. The inductance characteristics of the various coils 922, 940*a*,940*b* may vary widely depending on, among other things, the size of the coils 922,940*a*, 940*b*.

The slide bars 928*a*, 928*b* may include a magnetic material, such as neodymium, powdered metal, steel, iron, an alloy, combinations of the same, or the like. In an embodiment, the slide bars 928*a*, 928*b* include all the features of the slide bars 128 described above. The slide bars 928*a*, 928*b* may move slidably along or within some or all inner surfaces 912*a*, 912*b* of the body portion 908, respectively. For example, the slide bars 928*a*, 928*b* may slide away from the core 950 in response to excitation of the primary coil 922 and/or excitation of the holding coils 940*a*, 940*b*. The slide bars 928*a*, 928*b* may come to rest against outer walls 954*a*, 954*b* of the body portion 908. Likewise, the slide bars 928*a*, 928*b* may slide toward the core 950 in response to reduced or no excitation of the primary coil 922 and/or holding coils 940*a*, 940*b*. The slide bars 928*a*, 928*b* may come to rest against inner walls 952*a*, 952*b* on each side of the core 950, which greatly reduces the likelihood of the slide bars 928*a*, 928*b* actually touching the core 950. However, the walls 952*a*, 952*b* and 954*a*, 954*b* might not be provided in other embodiments. In some embodiments, the walls 952*a*, 952*b* and 954*a*, 954*b* are solid. In some embodiments one or more of the walls 952*a*, 952*b* and 954*a*, 954*b* may comprise openings or apertures or the like.

In the depicted embodiment, the slide bars 928*a*, 928*b* are each about the same length as the length of the holding coils 940*a*, 940*b*. In certain embodiments, this common length between the slide bars 928*a*, 928*b* and the holding coils 940*a*, 940*b* may result in the holding coils having a desired holding strength. If the lengths of the holding coils 940*a*,

940*b* and the slide bars 928*a*, 928*b* do not match, more current might be used by the holding coils 940*a*, 940*b* to assist with moving and/or holding the slide bars 928*a*, 928*b*. However, other configurations of the slide bars 928*a*, 928*b* and holding coils 940*a*, 940*b* may be used, including configurations where the lengths are different.

Moreover, many variations of the coil assembly 900 may be used in other implementations. For instance, there may be one extension receiving portion 920 and one holding coil 940*a*, 940*b*. Also, more than two holding coils 940*a*, 940*b* and/or extension receiving portions 920 may be provided.

Figure 15A:
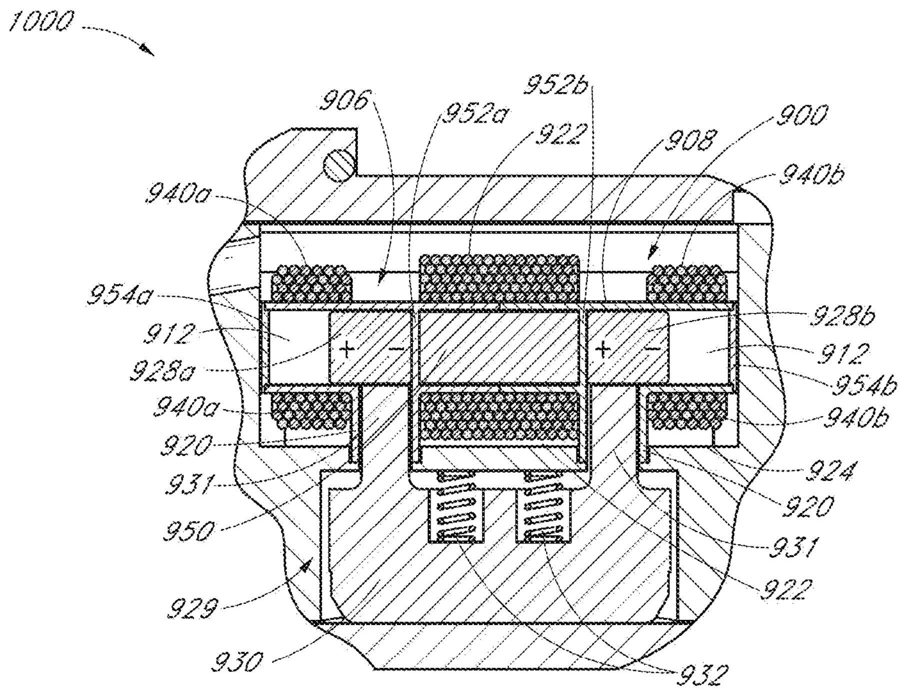
FIGS. 15A through 15C illustrate cross-sectional side views of an embodiment of a lock assembly containing the coil assembly of FIG. 14.
Figure 15B:
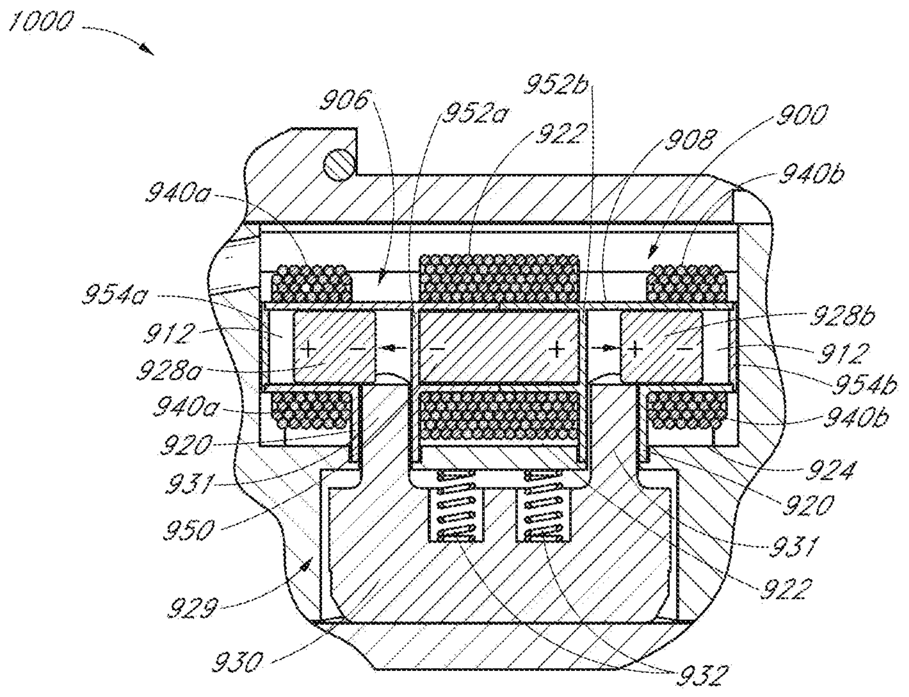
Figure 15C:
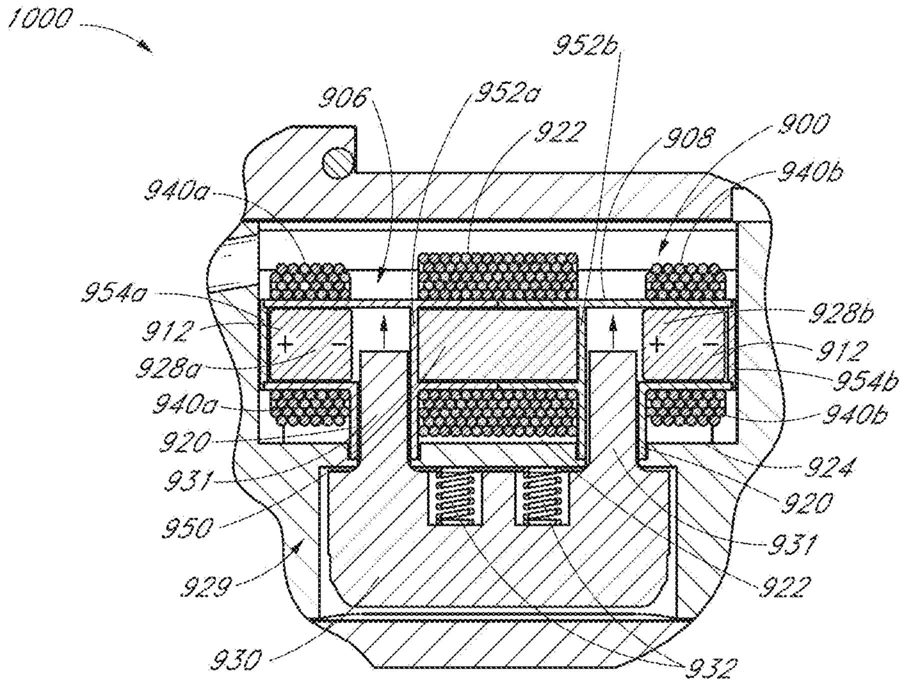

FIGS. 15A through 15C illustrate the coil assembly 900 in the context of a lock assembly 1000. FIG. 15A depicts a locked position of the lock assembly 1000, FIG. 15B depicts an unlocking position of the lock assembly 1000, and FIG. 15C depicts an unlocked position of the lock assembly 1000. Each of FIGS. 15A, B, and C is also a cutaway view of a portion of a lock, such as the lock of FIG. 21 below.

The lock assembly 1000 includes a case 924 that houses the coil assembly 900. The lock assembly 1000 also includes a locking mechanism 929, which includes a bolt 930, extensions 931 from the bolt 930, and springs 932. The bolt 930 may function in the same or similar manner as the bolt 130 described above. For example, the bolt 930 may have a chamfered lower edge (not shown) that mates with a groove of the lock (see, e.g., FIG. 3). Springs 932 tend to urge the bolt 930 into a locked position.

In the locked position shown in FIG. 15A, the slide bars 928*a*, 928*b* are attracted to the core 950 and therefore rest against the inner walls 952*a*, 952*b*. In the depicted embodiment, the core 950 is not magnetized or may be slightly magnetized. Example polarizations (e.g., "+" and "−") are depicted on the slide bars 928*a*, 928*b*. These polarizations may be reversed in other embodiments. In the unlocking position depicted in FIG. 15B, the primary coil 922 has been energized, causing a magnetic field to magnetize the core 950. Thus, example polarizations are illustrated on the core 950. These polarizations can cause the slide bars 928*a*, 928*b* to move away from the core 950.

Each holding coil 940*a*, 940*b* may be energized in certain embodiments when a corresponding slide bar 928*a*, 928*b* has passed within at least half of the axial length of the holding coil 940*a*, 940*b*. In an embodiment, the holding coils 940*a*, 940*b* are energized this way because the polarization (not shown) of each holding coil 940*a*, 940*b* can have the same orientation as the polarization of the corresponding slide bar 928*a*, 928*b*. Consequently, if the holding coils 940*a*, 940*b* were to energize before the slide bars 928*a*, 928*b* passed at least halfway within the holding coils 940*a*, 940*b*, the holding coils 940*a*, 940*b* might repel the slide bars 928*a*, 928*b* toward the core at 950.

In certain embodiments, a timer is used as a proxy to determine when the slide bars 928*a*, 928*b* have passed at least halfway through the holding coils 940*a*, 940*b*. The timer may be implemented in hardware and/or software (see FIG. 17). The amount of time used by the timer to determine whether to energize the holding coils 940*a*, 940*b* may be determined experimentally. In one embodiment, the timer is configured such that the holding coils 940*a*, 940*b* are activated when slightly more than 50% of the slide bars 928*a*, 928*b* have passed through the holding coils 940*a*, 940*b*. In another implementation, the timer is configured such that the holding coils 940*a*, 940*b* are activated when about 60% or more of the slide bars 928*a*, 928*b* have passed through the holding coils 940*a*, 940*b*. Alternatively, each holding coil 940*a*, 940*b* may be activated when 100% or substantially 100% of the corresponding slide bar 928*a*, 928*b* has passed through the holding coil 940*a*, 940*b*. For example, the holding coils 940*a*, 940*b* may be activated in response to the slide bars 928*a*, 928*b* contacting the outer walls 954*a*, 954*b*. The values described herein are mere examples, and others may be used in other implementations.

Once the holding coils 940*a*, 940*b* have energized, the magnetic field generated by the holding coils 940*a*, 940*b* can assist the slide bars 928*a*, 928*b* with moving away from the core 950 if the slide bars 928*a*, 928*b* have not been moved a sufficient distance toward the outer walls 954*a*, 954*b* to allow passage of the corresponding extensions 931. Additionally, the holding coils 940*a*, 940*b* can hold the slide bars 928*a*, 928*b* in a resting or substantially resting position, as shown in FIG. 15C. In this position, the slide bars 928*a*, 928*b* are no longer blocking the extensions 931 of the bolt 930, thereby allowing actuation of the locking mechanism 929. For example, movement of the extensions 931 into the body 908 of the cartridge 906 is now possible due to the movement of the slide bars 928*a*, 928*b*.

The primary coil 922 may be deactivated in response to the holding coils 940*a*, 940*b* being energized. For example, a control circuit (see FIG. 17) may stop the flow of current through the primary coil 922 at the same time as the holding coils 940*a*, 940*b* are energized or slightly thereafter. The control circuit might also deenergize the primary coil 922 in response to a portion of or the entire slide bars 928*a*, 928*b* passing through the holding coils 940*a*, 940*b*. The holding coils 940*a*, 940*b* may be energized for enough time to allow a user to actuate the locking mechanism 929. After a predefined time of, for example, two or three seconds, the holding coils 940*a*, 940*b* may be deenergized to conserve power. Many other configurations may also be used.

In certain embodiments, the distance r from the slide bars 928*a*, 928*b* and the energized primary coil 922 is reduced. In other words, because the holding coils 940*a*, 940*b* may assist with moving and/or holding the slide bars 928*a*, 928*b*, the primary coil 922 does not need to push the slide bars 928*a*, 928*b* as great of a distance "r" in certain embodiments. Current may therefore be reduced by using the holding coils 940*a*, 940*b*.

Figure 16A:
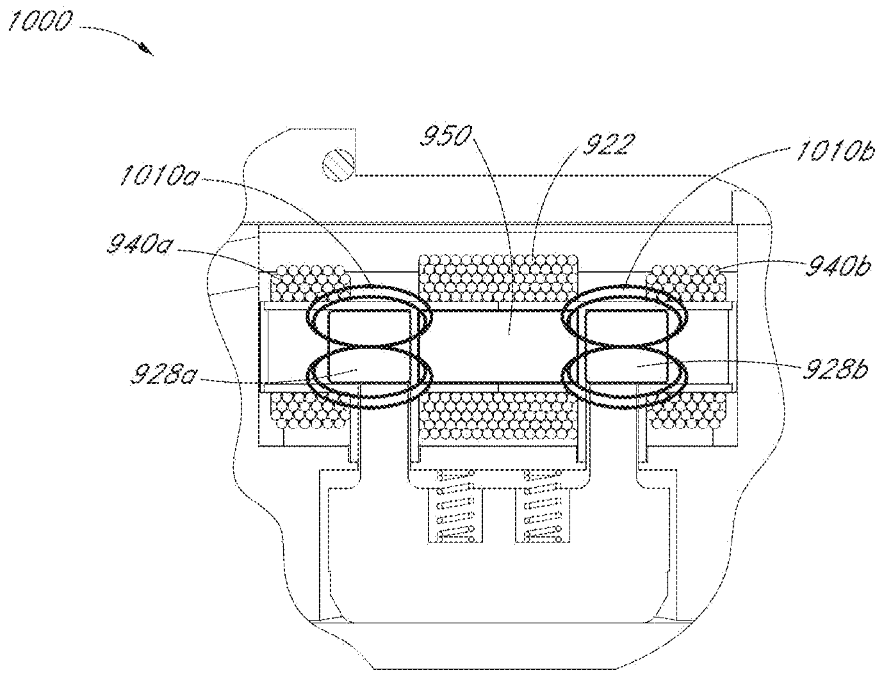
FIGS. 16A through 16C illustrate embodiments of magnetic fields in the context of the lock assembly of FIGS. 15A through 15C.
Figure 16B:
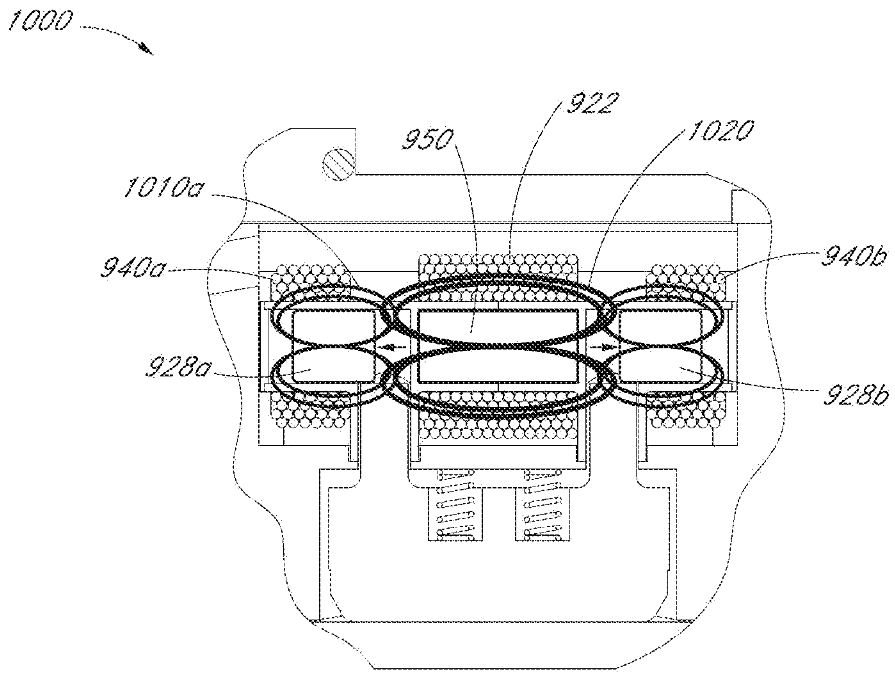
Figure 16C:
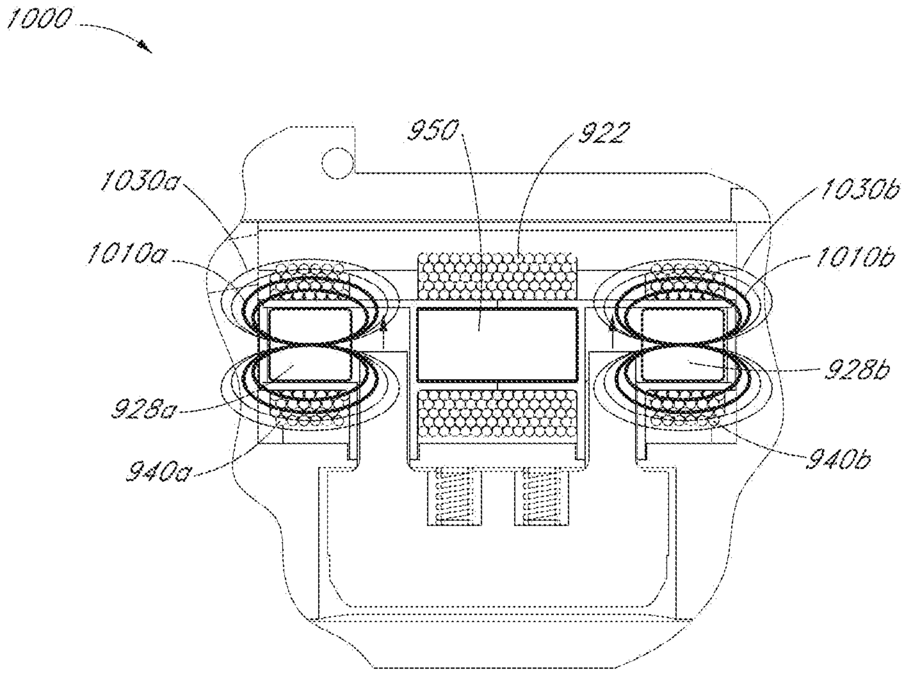

To further illustrate example operation of the primary coil 922 and holding coils 940*a*, 940*b*, FIGS. 16A through 16C illustrate example models of magnetic fields in the context of the lock assembly of FIGS. 15A through 15C. FIG. 16A depicts the locked position of the lock assembly 1000, FIG. 16B depicts the unlocking position of the lock assembly 1000, and FIG. 16C depicts the unlocked position of the lock assembly 1000. Hatch marks have been removed to more clearly depict the magnetic fields.

The magnetic fields include slide bar fields 1010*a*, 1010*b*, a primary coil field 1020, and holding coil fields 1030*a*, 1030*b*. In the locked position of FIG. 16A, the slide bar fields 1010*a*, 1010*b* of the slide bars 928*a*, 928*b* attract the slide bars 928*a*, 928*b* to the core 950. The unlocking position of FIG. 16B shows that in response to the primary coil 922 being energized, the primary coil field 1020 is produced, which repels the slide bars 928*a*, 928*b* toward the holding coils 940*a*, 940*b*. FIG. 16C illustrates the slide bars 928*a*, 928*b* having passed within the holding coils 940*a*, 940*b*. In this unlocked position, the holding coil fields 1030*a*, 1030*b* are energized for a time. The primary coil field 1020 is deactivated but may alternatively be reduced in the unlocked position.

Although the holding coil fields 1030*a*, 1030*b* are shown when the slide bars 928*a*, 928*b* have passed within the holding coils 940*a*, 940*b*, the holding coil fields 1030*a*, 1030*b* may also be present when the slide bars 928*a*, 928*b* are moving toward the holding coils 928*a*, 928*b*.

Figure 17:
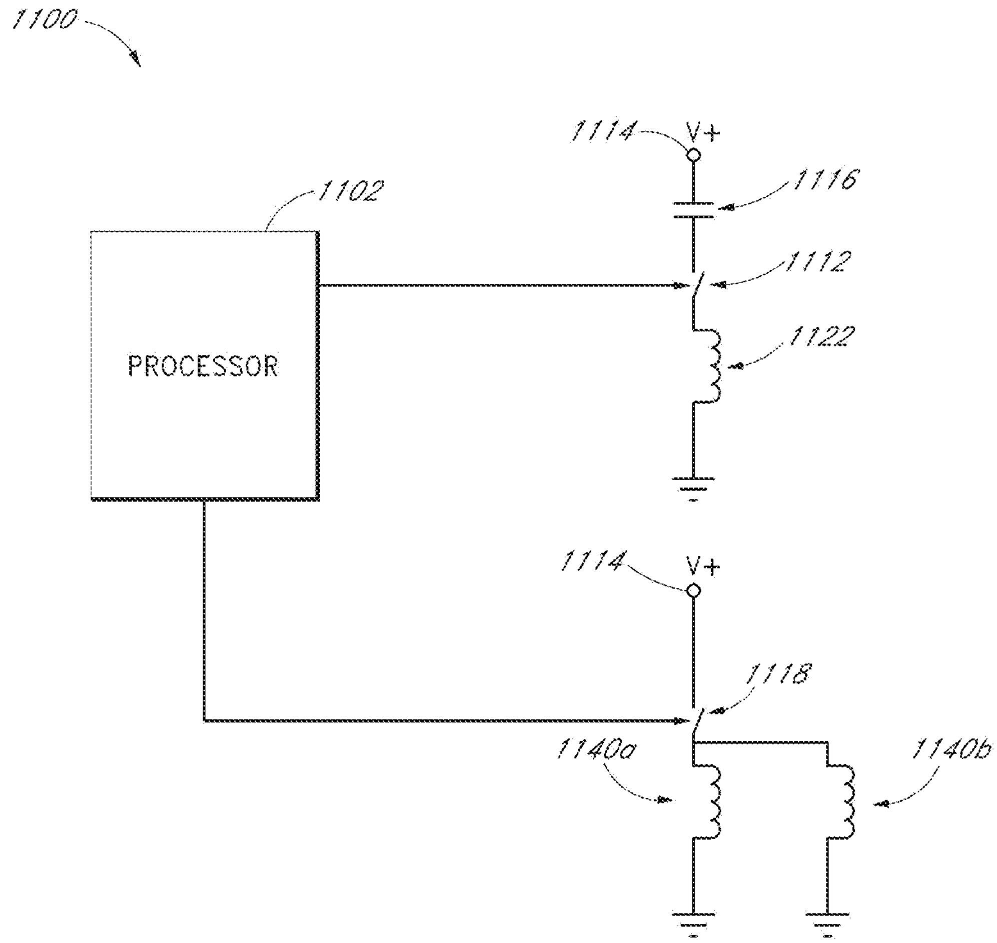
FIG. 17 illustrates an embodiment of a control circuit for actuating the coil assembly of FIGS. 14 through 16.

FIG. 17 illustrates an embodiment of a control circuit 1100 for actuating the coil assembly of FIGS. 14 through 16. The control circuit 1100 may be included, for example, in the circuit board 134 or the like (see FIG. 3). In certain embodiments, the control circuit 1100 may be used in conjunction with the circuits described above with respect to FIGS. 10 through 13.

The control circuit 1100 includes a primary coil 1122 and holding coils 1140*a*, 1140*b*. The primary coil 1122 is in communication with a switch 1112. Likewise, the holding coils 1140*a*, 1140*b* are in communication with a switch 1118. A second switch may be provided in some implementations so that each holding coil is in communication with a separate switch. The switches 1112, 1118 may include transistors, such as MOSFETs or the like. A processor 1102 controls both the switch 1112 and the switch 1118. The processor 1102 may be, for example, the same processor as the processor 502 described above.

The processor 1102 may include software and/or firmware for controlling the switches 1112, 1118. For instance, the processor 1102 may include a timer and associated logic for determining a sequence and/or duration for actuating the switches 1112, 1118. The processor 1102 may selectively actuate the switches 1112, 1118 in response to instructions received from an electronic key, such as the key of FIG. 5 or FIG. 19A. Alternatively, a separate hardware timer may be provided.

In response to the switch 1112 being actuated, power from a capacitor 1116 may be provided to the primary coil 1122. The capacitor 1112 is used in some embodiments to provide a rapid burst of current. The capacitor 1116 is charged by a power supply 1114, which may receive power from the power coils described above. A tantalum capacitor 1116 may be used for its high charge to size ratio, although other types of capacitors may also be used. The primary coil 1122 may instead be powered directly by the power supply 1114 in some implementations.

The capacitor 1116 may energize the primary coil 1122 for a relatively short period of time, such as a few milliseconds or the like. As the primary coil 1122 is energized, the slide bars 928*a*, 928*b* may be repelled and move toward the holding coils, as described above. As the energy of the capacitor 1116 dissipates, or when the processor 1102 opens the switch 1122, the magnetic field generated by the primary coil 1122 may also dissipate. In response, the processor 1102 may actuate the switch 1118, causing power from the power supply 1114 (or from another capacitor) to actuate the holding coils 1140*a*, 1140*b*. After a predetermined period of time, such as two or three seconds, the processor 1102 may open the switch 1118 and deactivate the holding coils 1140*a*, 1140*b*.

In an embodiment, a capacitance value of the capacitor 1116 is selected such that the capacitor 1116 dissipates its energy in a sufficient amount of time for the primary coil 1122 to be energized. Thus, a separate timer may not be used to control the primary coil 1122.

In alternative embodiments, the processor 1102 may perform other sequences. For instance, the processor 1102 may close the switch 1118 before closing the switch 1112. Or, the processor 1102 might close both the switches 1112, 1118 at the same time, among other possible sequences.

Figure 18:
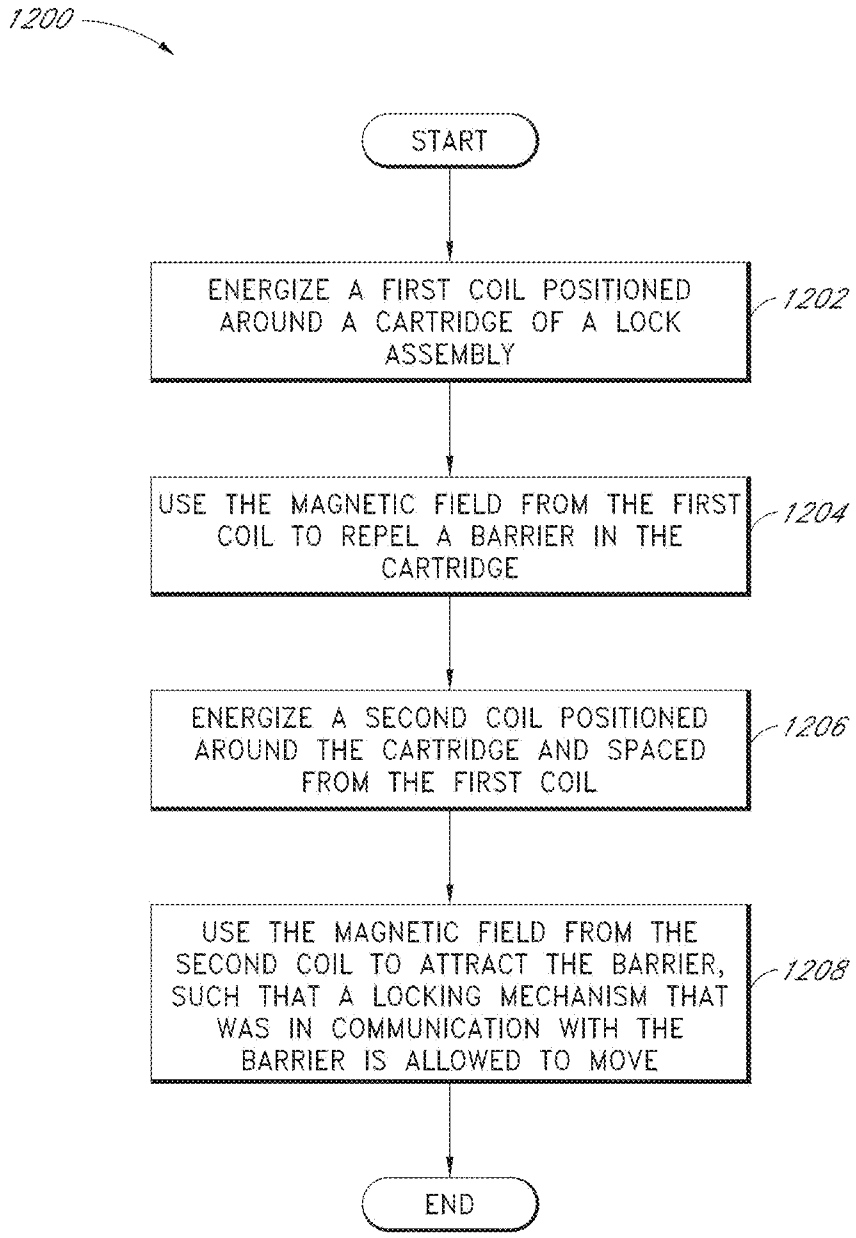
FIG. 18 illustrates an embodiment of a process for actuating the coil assembly of FIGS. 14 through 16.

FIG. 18 illustrates an embodiment of a process 1200 for actuating the coil assembly of FIGS. 14 through 16. The process 1200 may be implemented by the control circuit 1100 described above. The process 1200 may be used to unlock a multi-coil lock assembly. In an embodiment, the process 1200 is performed in response to the control circuit 1100 receiving unlocking instructions from an electronic key.

At block 1202, a first coil positioned around a cartridge of a lock assembly is energized. The first coil may be the primary coil 922, 1122 described above. The first coil may be energized, for example, by the processor 1102 causing power from a power supply and/or capacitor to be provided to the first coil. The energizing of the first coil may generate a magnetic field.

The magnetic field from the first coil may be used at block 1204 to repel a barrier in the cartridge. The barrier can be one or more slide bars, such as the slide bars 928*a*, 928*b* described above. When magnetically attracted to a core of the cartridge (e.g., the core 950), the barrier can act to block the locking mechanism 929 from moving into the cartridge, thereby maintaining a locked position of the lock assembly.

At block 1206, a second coil positioned around the cartridge and spaced from the first coil is energized. This block 1206 may be performed by the processor 1102 causing power from a power supply and/or capacitor to be provided to the second coil. The second coil may be one of the holding coils 940*a*, 940*b* described above. Energizing of the second coil may cause a magnetic field to be generated in the second coil. The magnetic field from the second coil may be used at block 1208 to attract the barrier, such that the locking mechanism 929 that was in communication with the barrier is now allowed to move.

The process 1200 has been described in the context of a single holding coil. However, the process 1200 may also be implemented with lock assemblies that include multiple holding coils, such as two holding coils.

V. SHEAR PIN EMBODIMENTS

In some cases, an individual might attempt to break open the locks described above by applying a torque to a key when the key is mated with a lock. To reduce the chance of the lock breaking open, one or more shear pins may be provided in the key and/or in the lock. Upon application of sufficient torque, the one or more shear pins can break, allowing the key to turn freely within the lock. As a result, the shear pins can prevent or reduce the chance of the locking mechanism breaking open. In addition, the one or more shear pins may be easily replaceable.

Figure 19A:
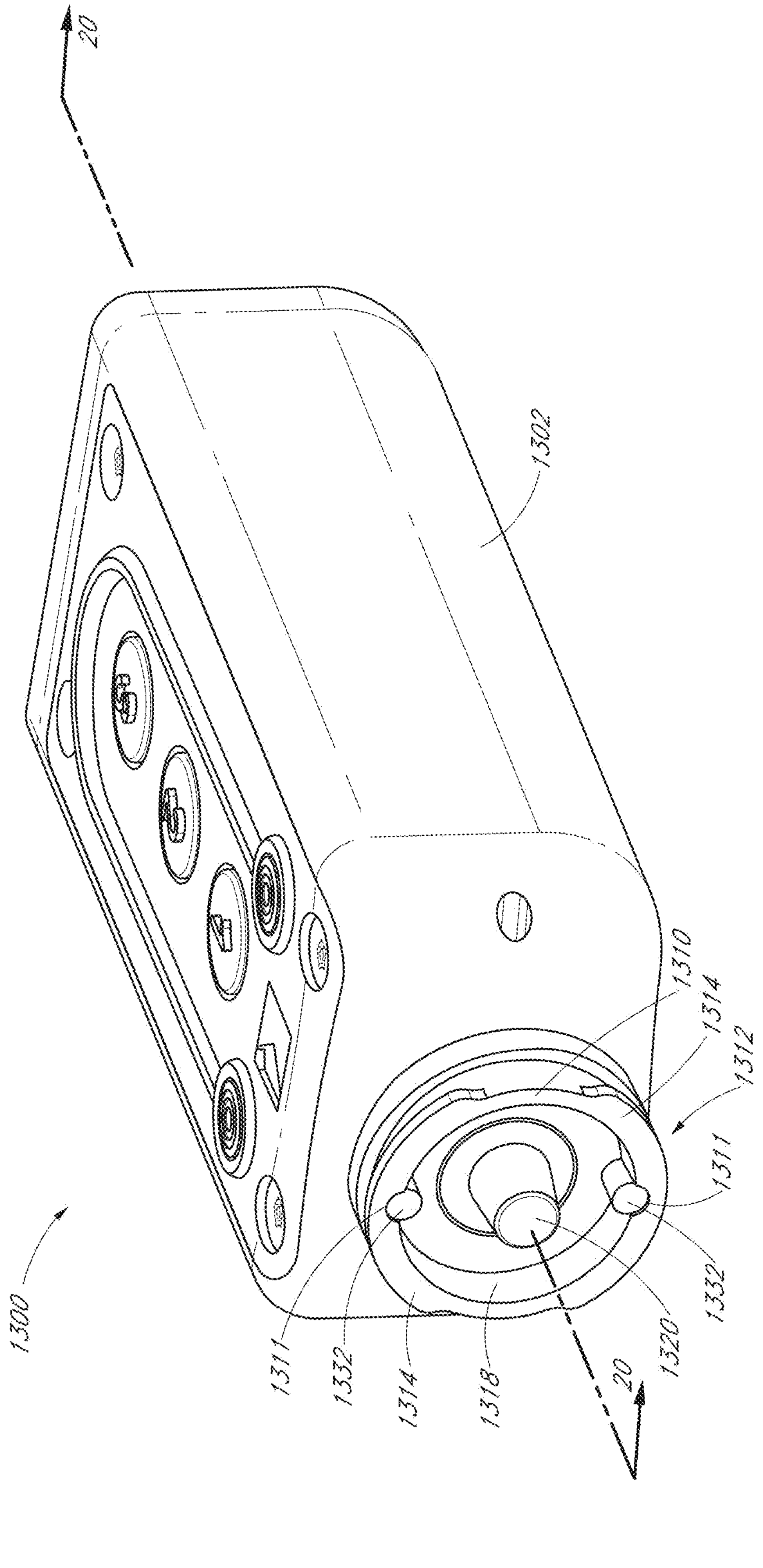
FIG. 19A illustrates an isometric perspective view of an embodiment of a key having shear pins.

FIG. 19A illustrates an isometric perspective view of an embodiment of a key 1300 having shear pins 1332. The key 1300 may include some or all of the features of the keys described above. The key 1300 includes an elongate main body portion 1302 that is generally rectangular in cross-sectional shape. The illustrated key 200 also includes a mating portion 1312 of smaller external dimensions than the body portion 1302.

The body portion 1302 can house the internal electronics of the key 1300 as well as other components. Advantageously, in certain embodiments, the body portion 1302 of the key 1300 is smaller than the body portion of the key 200 described above. This reduction in size may be made possible at least in part by using fewer batteries in the key 1300. Fewer batteries may be used, in certain embodiments, because the holding coils described above may reduce current usage by the lock and/or key.

The mating portion 1312 can engage a lock described below with respect to FIG. 19B. The mating portion 1312 includes a cylindrical portion 1310 that houses a power coil 1320 and data coil (not shown). On the outer surface of the cylindrical portion are two tabs 1314 which can rotationally engage the key 1300 relative to the lock (see FIG. 19B). These tabs 1314 extend radially outward from the outer surface of the cylindrical portion 1310 and oppose one another.

The cylindrical portion 1310 includes a recess 1318 that opens to the front of the key 1300. Located within the recess 1318 is the power coil 1320 and data coil (not shown) described above. In addition, two shear pins 1332 are located within the recess. Each shear pin 1332 is embedded partially in a wall 1311 of the cylindrical portion 1310. The shear pins 1332 are generally cylindrical in shape. Other configurations may be possible. The shear pins 1332 are located opposite each other in the cylindrical portion 1310. Although two shear pins 1332 are shown, fewer or more shear pins may be provided in alternative embodiments.

The shear pins 1332 may assist with mating the key 1300 to a lock. FIG. 19B depicts an embodiment of such a lock 1400. The lock 1400 may include some or all of the features of the locks described above. The lock 1400 advantageously allows the shear pins 1332 of the key 1300 to mate with the lock 1400 in certain embodiments, such that attempted breaking of the lock 1400 via sufficient torque can result in breaking of the shear pins 1332. When the shear pins 1332 break, the key 1300 may rotate freely in the lock 1400 and thereby be unable to actuate the locking mechanism.

The lock 1400 includes a body portion 1404 and a mating portion 1408. The body portion 1404 may at least partly house one of the coil assemblies described above. The diameter of the mating portion 1408 is larger than the diameter of the body portion 1404.

The mating portion 1408 includes a cylinder 1446 and a raised cylindrical portion 1460 disposed within the cylinder 1446. An annular groove 1448 or key recess is formed between the cylinder 1446 and the raised cylindrical portion 1460. The annular groove 1448 is capable of receiving the tabs 1314 of the key 1300. A cup 1452 is disposed within the raised cylindrical portion 1460, which is capable of receiving the power coil 1320 of the key 1300. The raised cylindrical portion 1460 also includes shear pin slots 1462, which can receive the shear pins 1332 of the key 1300. The shear pin slots 1462 are concave in the depicted embodiment to facilitate placement of the shear pins 1332 and removal of broken shear pins. The number of shear pin slots 1462 may correspond to the number of shear pins 1332 on the key. In some embodiments, more slots may be provided than shear pins. The shear pin slots 1462 may be enclosed, rather than concave, in some embodiments.

In certain implementations, the key 1300 may mate with the lock 1400 by placement of the tabs 1314 in the annular groove 1442, by placement of the power coil 1320 in the cup 1452, and by placement of the shear pins 1332 in the shear pin slots 1462. The key 1300 may provide data to the lock 1400, allowing a locking mechanism of the lock 1400 to be actuated. The key 1300 may then be turned by an operator of the key. As the shear pins 1332 grip against the walls of the shear pin slots 1462, the shear pins 1332 may turn the raised cylindrical portion 1460, causing the locking mechanism to actuate. The tabs 1314 of the key 1300 may slide under tabs 1470 of the lock 1400. Locking may proceed, for example, by turning the key 1300 in a reverse motion.

If, however, the key 1300 does not provide suitable data to the lock 1400 (e.g., because the operator of the key 1300 does not have a suitable combination), the locking mechanism of the lock 1400 does not actuate. If the operator of the key 1300 attempts to turn the key with enough force to break the locking mechanism, the shear pins 1332 may shear instead. With the shear pins 1332 broken, turning of the key 1300 may no longer be able to turn the raised cylindrical portion 1460, thereby preventing actuating of the locking mechanism.

Figure 20:
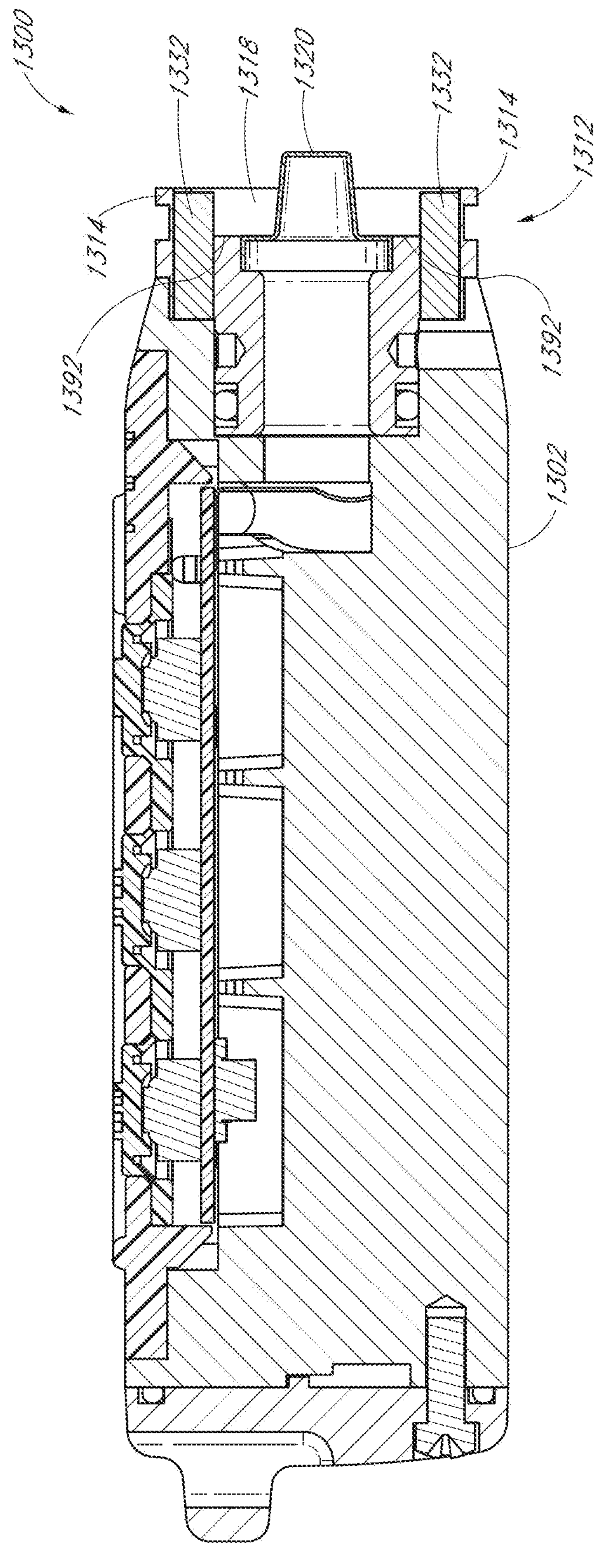
FIG. 20 illustrates a side cross-section view of an embodiment of the key of FIG. 19A.

Further detail of the shear pins 1332 is shown in FIG. 20, which is a cross-sectional view of the key 1300 along the section lines shown in FIG. 19A. In FIG. 20, the shear pins 1332 are depicted extending past a surface 1392 at the bottom of the recess 1318. More than half of each shear pin 1332 extends below the surface 1392. The amount that the shear pins 1332 extend past the surface 1392 may vary in some embodiments. The shear pins 1332 may, for instance, not extend below the surface 1392 at all.

Figure 19B:
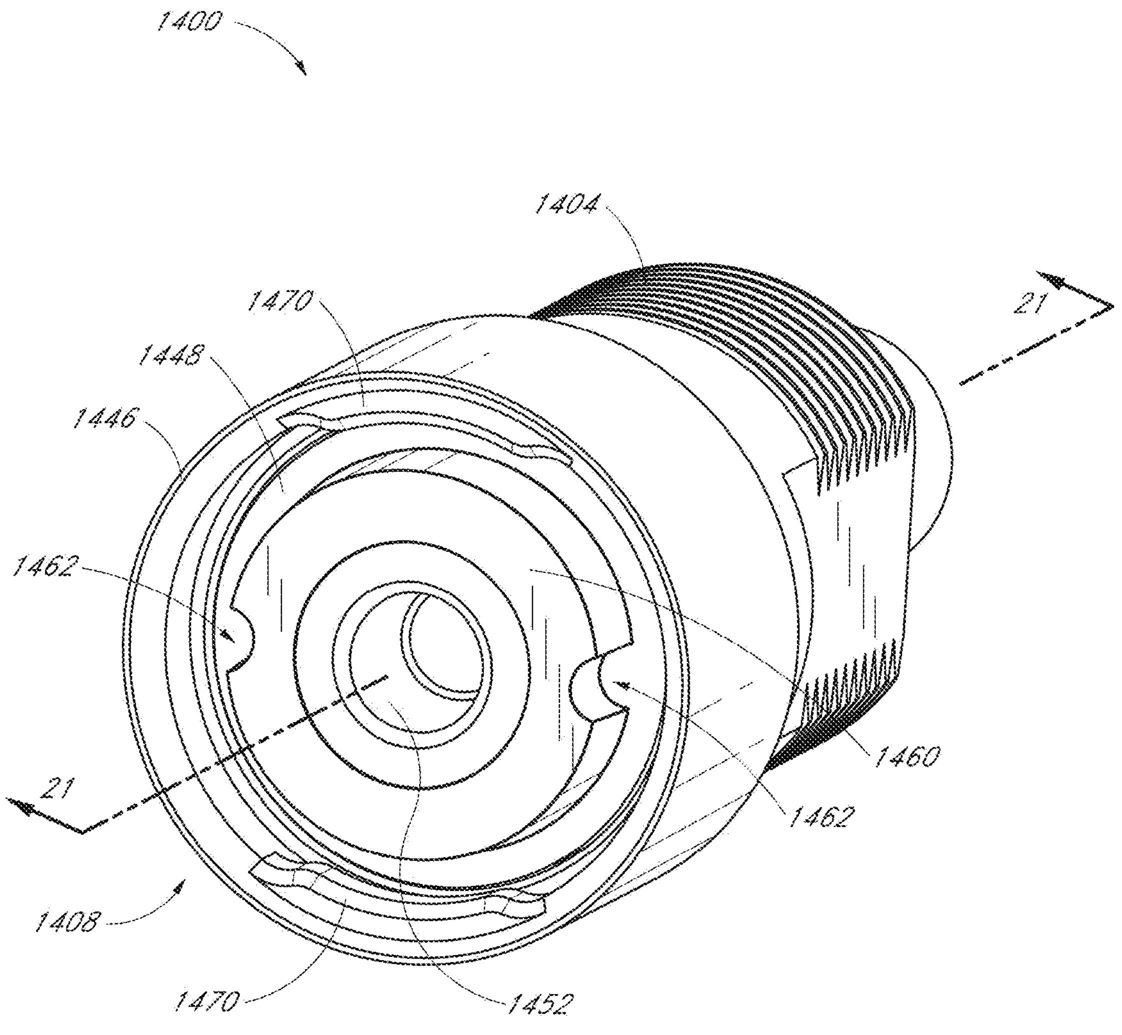
FIG. 19B illustrates an isometric perspective view of an embodiment of a lock having shear pin receptacles.
Figure 21:
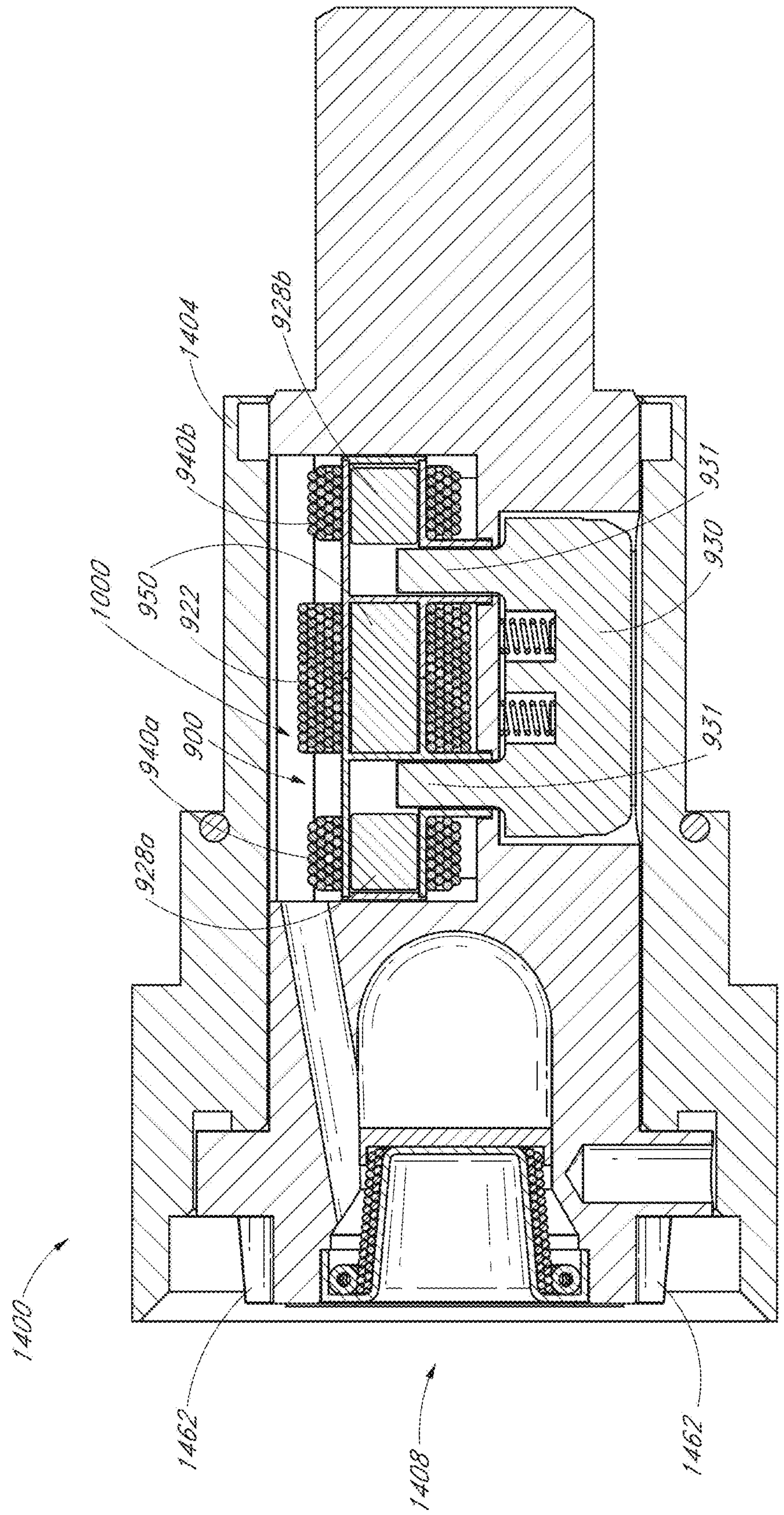
FIG. 21 illustrates a side cross-section view of an embodiment of the lock of FIG. 19B.

FIG. 21 illustrates a side cross-section view of an embodiment of the lock 1400, taken along the line 21-21 in FIG. 19B. The raised cylindrical portion 1460 of FIG. 19B has been rotated 90 degrees for clarity, so as to show the shear pin slots 1462.

The body portion 1404 of the lock 1400 is shown to the right of the FIGURE, and the mating portion 1408 is to the left. The lock assembly 1000, including the coil assembly 900, is included in the body portion of the lock 1400. In the depicted embodiment, the coil assembly 900 is not axially aligned with the axis of the lock 1400, unlike the lock 100 described above. Rather, the coil assembly 900 is offset from the axis. This non-axial alignment may allow a larger bolt 930 to be included in the lock 1400. In other embodiments, the coil assembly 900 may be axially aligned with the lock 1400.

V. CAPACITIVE DATA TRANSFER EMBODIMENTS

Figure 22:
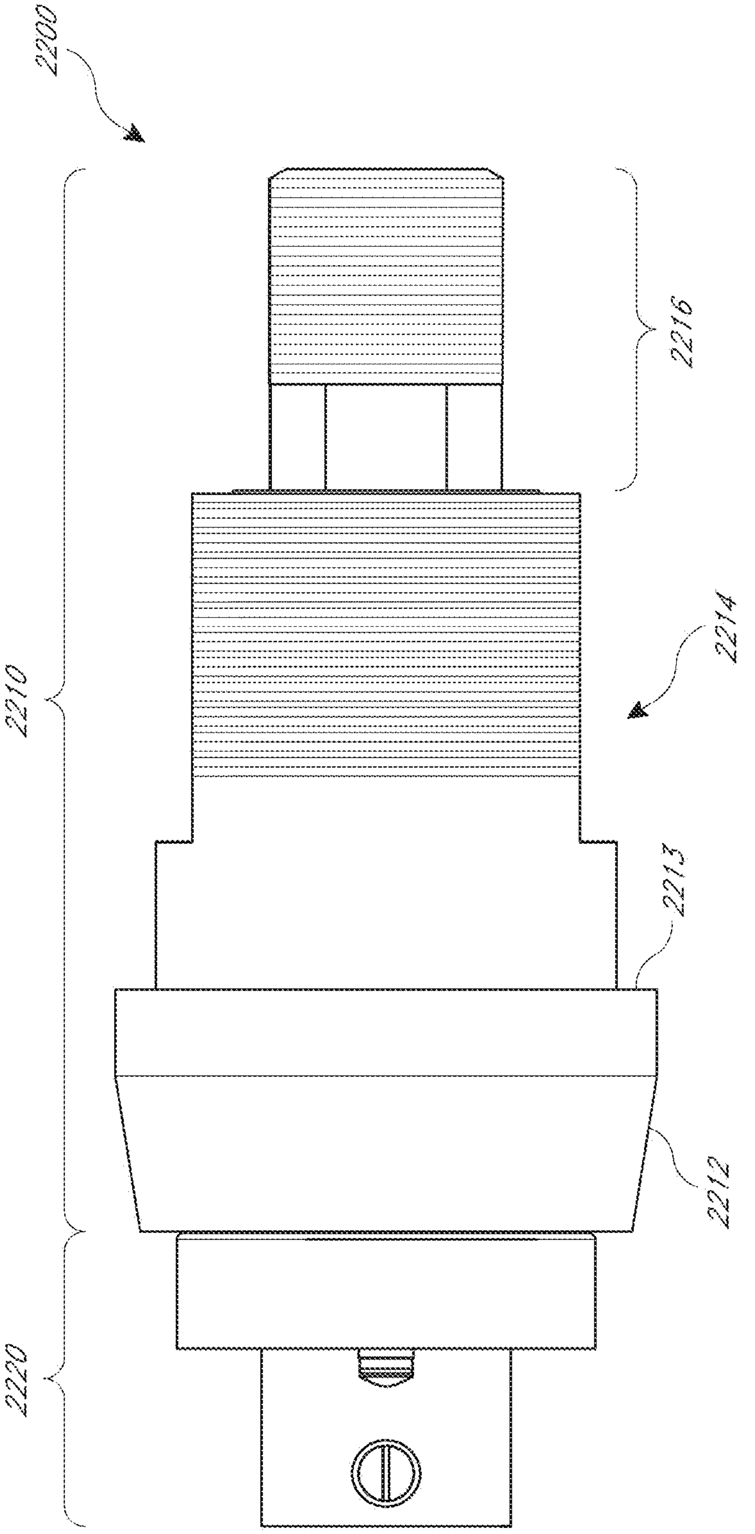
FIG. 22 is a side view of an embodiment of an electronic lock and key assembly.

FIG. 22 is a side view of an embodiment of an electronic lock and key assembly, generally referred to herein by the reference number 2200. The electronic lock and key assembly 2200 includes a lock portion 2210 and a key head portion 2200, which may be mated together, as shown, in certain embodiments. Similarly to embodiments disclosed above, the key may be configured to be selectively moved between a locked position and an unlocked position. The lock and key assembly 2200 may be used with, or adapted for use with, any practical or suitable locking application, such as for locking cabinet doors or drawers. The lock 2210 may be a cam lock or other lock design. The key head portion 2220 and lock 2210 may have any of the features described above with respect to FIGS. 1 through 22, with some modifications as will be described in detail herein. For example, the key head portion 2220 may be part of any of the key assemblies described above.

The illustrated electronic lock and key assembly 2200 can use electronic circuitry coupled to the key head 2220 and/or lock 2210 portions to authenticate the key and to actuate internal mechanisms of the lock 2210. When the key portion 2220 engages the lock portion 2210, data transfer and/or power transfer may be enabled between the lock 2210 and key head 2220 portions. The lock 2210, or a cylinder portion thereof may then advantageously be actuated by the key head 2220 to move from a locked position to an unlocked position and permit access to a space or location secured by the lock 2210. In certain embodiments, as described above, the direction of power transfer is primarily from the key head portion 2220 to the lock portion 2210. However, in certain configurations, the direction of power transfer may be reversed or may occur in both directions.

The lock 2210 may be advantageously installed in a cabinet, or other such storage compartment, and can selectively secure a drawer or door of the cabinet relative to a body of the cabinet. As shown, in certain embodiments, the lock 2210 includes a head portion 2212 and a body portion 2214. While the body portion 2214 is configured to be secured within a door or drawer structure, the head portion, when the lock is installed, may be disposed externally to the door or drawer structure. Therefore, in certain embodiments, when installed or mounted to a container, the head portion 2212, or a portion thereof, may be physically accessible when the cabinet is closed. Alternatively, some or all of the head portion 2212 may be positioned internal to the door or drawer, such that the lock 2210 is flush or approximately flush with the door or drawer.

The FIGURE shows an outer housing of the lock 2210, wherein a rotatable cylinder is at least partially contained within the outer housing. A tenon portion 2216 of the cylinder may extend beyond the housing in a similar manner to embodiments disclosed above, and may be configured for insertion into a corresponding mortise portion of a door or drawer structure having similar dimensions.

Figure 23:
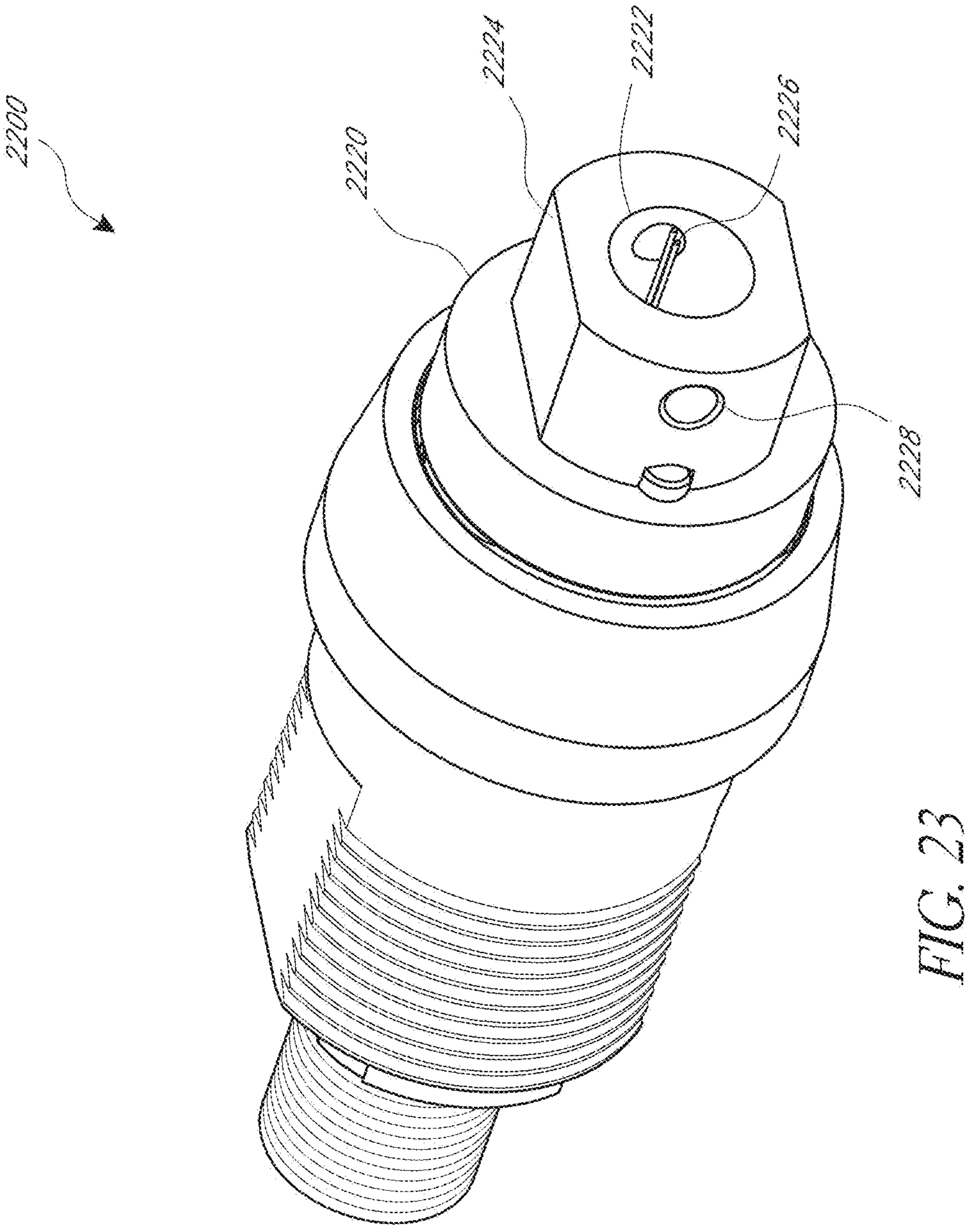
FIG. 23 is a perspective view of an embodiment of an electronic lock and key assembly.

FIG. 23 is a perspective view of an embodiment of the electronic lock and key assembly 2200 shown in FIG. 22. In certain embodiments, the key head portion 2220 may be configured to be secured to a key body portion (not shown), wherein the body portion has circuitry and/or user input functionality associated therewith. The key portion 2220 may be secured to the body portion using any suitable mechanism, such as holes 2228 configured to receive corresponding mating portions of the key body. In certain embodiments, the key portion 2220 and key body portion are integral or connected together. The figure provides back and side views of the key portion 2220. As shown, the key head 2220 may include one or more flattened surfaces 2224, which are provided to further secure the key portion 2220 with respect to an attached body portion.

The key head portion 2220 may include one or more electrical components. For example, the key head 2220 may include one or more wire windings used for inductive power and/or data transfer. Wire leads 2226 from such windings may lead to circuitry or a power source housed outside of the key head portion 2220. For example, the wires 2226 may be electrically coupled to an integrated circuit housed in a connected key body portion (not shown; see, e.g., FIG. 19A). Such key body portion may be generally rectangular in cross-sectional shape.

Figure 24:
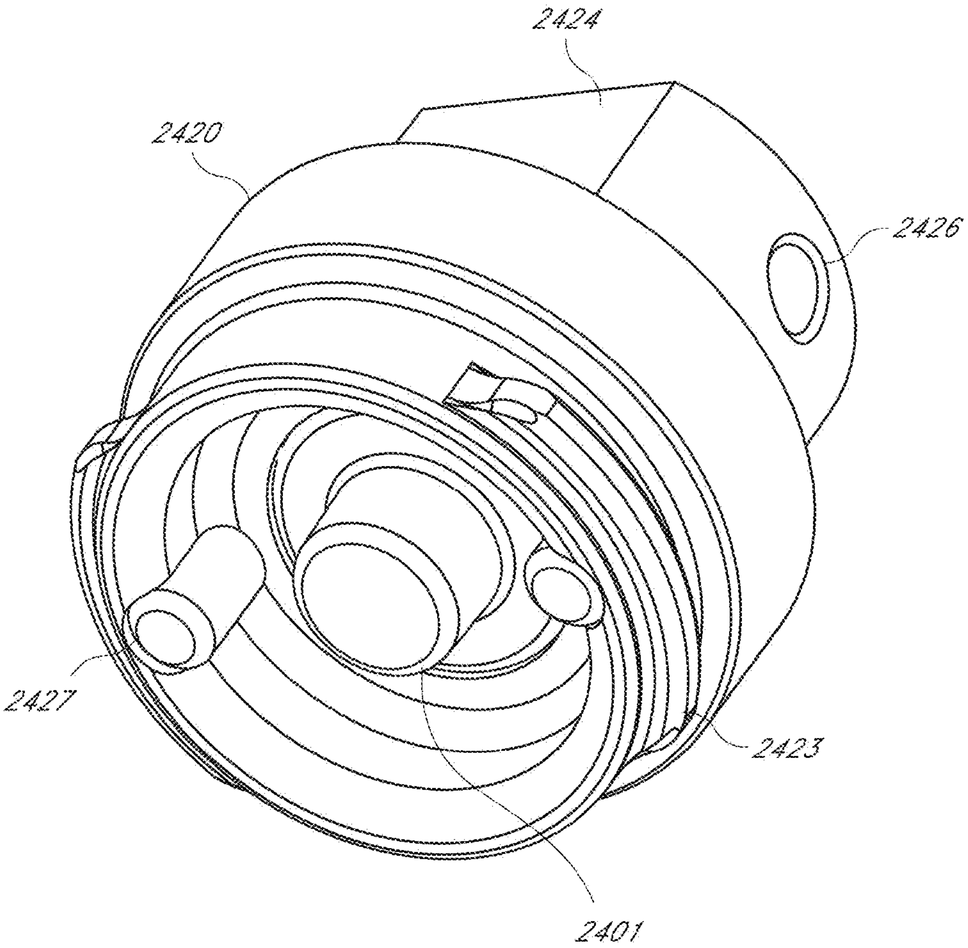
FIG. 24 illustrates a perspective view of an embodiment of a key head assembly.

FIG. 24 illustrates a perspective front view of an embodiment of a key head portion 2420. For example, the key head 2420 may correspond to the key head 2220 illustrated above in FIGS. 22 and 23. The key head 2420 may include one or more mating structures 2423, as well as one or more shear pins 2427, as described above with respect to FIG. 19A. For example, the mating structures 2423 may be tabs that extend radially outward from a longitudinal axis of the key, and may oppose one another on opposite sides of the key head 2420. The mating structures 2423 can engage corresponding mating structure in a lock assembly. The key head 2420 includes a nose assembly 2401 configured to house a power coil and/or data capacitor plate (not shown), wherein the portion 2401 is configured to act as a male mating connector for coupling with a corresponding female connector of a lock. In certain embodiments, one or more of the power coil and capacitor plate is covered by a material that passes electromagnetic radiation, such as a dielectric or a conductor with one or more openings (as described elsewhere herein).

Figure 25:
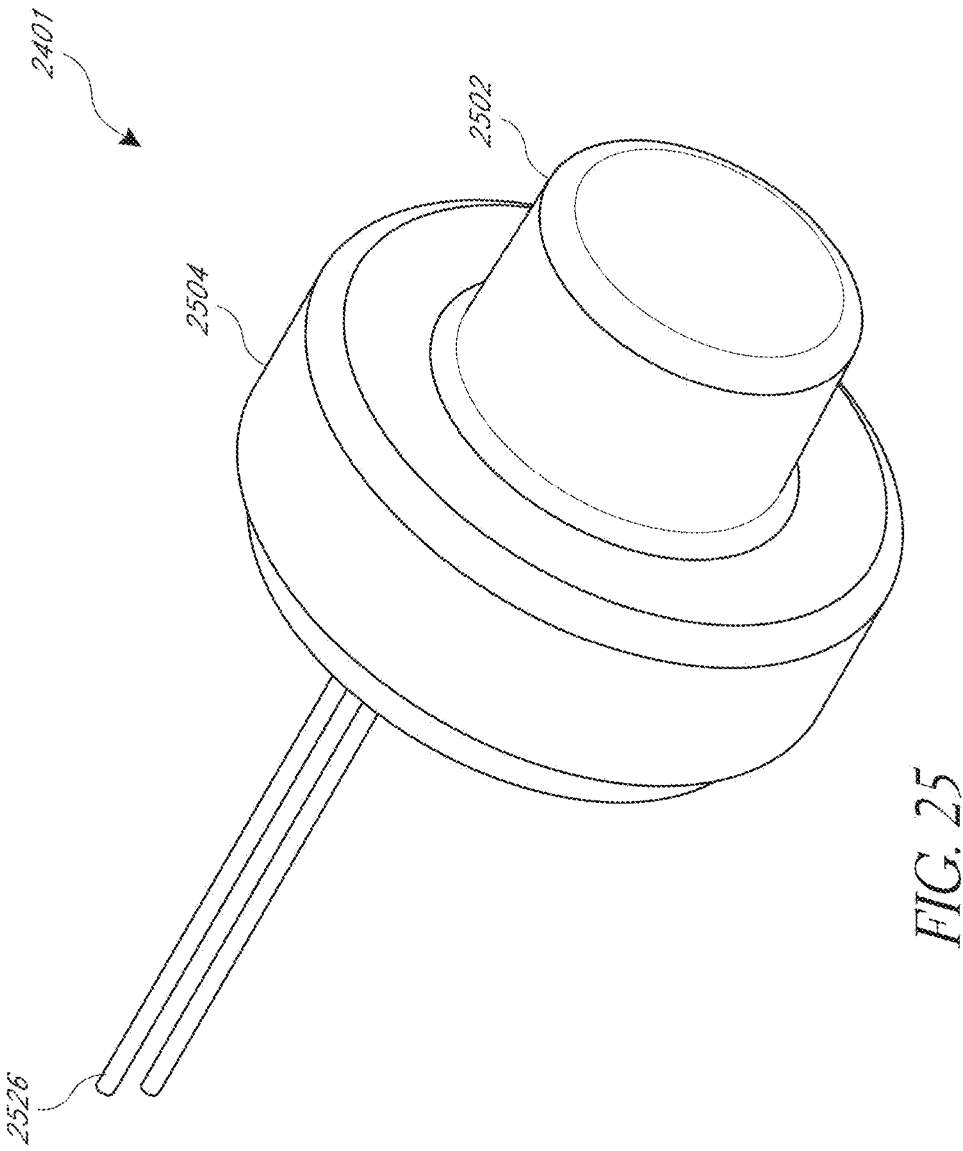
FIG. 25 illustrates a front perspective view of an embodiment of a key nose assembly.

FIG. 25 illustrates a front perspective view of an embodiment of a key nose assembly 2401, as shown as a component of the key head 2420 of FIG. 24. The nose assembly 2401 has wire leads 2526 extending therefrom, which correspond to opposite ends of an inductive wire winding (not shown). The winding may be at least partially contained within a generally cylindrically-shaped male connector housing portion 2502. The nose assembly 2401 may further include a second housing portion 2504 that is also generally cylindrically-shaped and concentric with the male connector portion 2502. The second housing portion 2504 may house a capacitive plate, as discussed in greater detail below.

Figure 26:
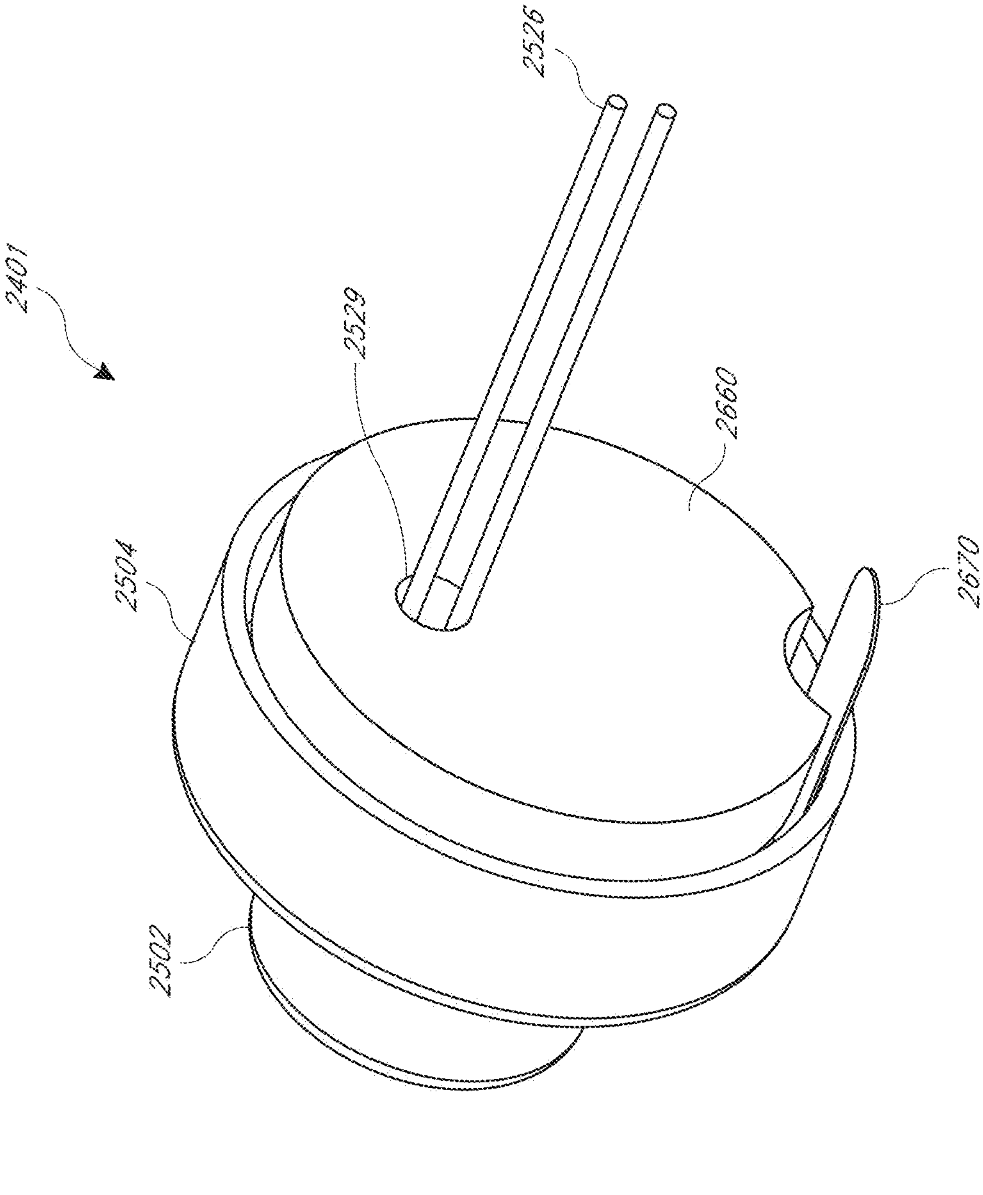
FIG. 26 illustrates a back perspective view of an embodiment of a key nose assembly.

FIG. 26 illustrates a back perspective view of an embodiment of the key nose assembly 2401. The assembly includes a magnetic core 2560, such as a ferrite or other ferromagnetic material. The core 2560 may help concentrate magnetic field lines generated by an inductive winding disposed in the male connector portion 2502 for inductive power transfer to an electronic lock assembly. The core 2660 may serve to increase inductance and improve coupling between the winding and a corresponding winding in a lock assembly. In certain embodiments, wire leads 2526 from the winding project through an aperture 2529 in the magnetic core 2660. Alternatively, wire leads may be passed around the core 2260, or otherwise directed to key circuitry (not shown). Furthermore, the coil may be at least partially surrounded by one or more layers of mu-metal configured to encapsulate magnetic field lines in order to prevent or reduce permeation thereof into other components of the key, such as a brass housing of the key head. The mu-metal may serve to reduce inductive heating from the coil.

Figure 27:
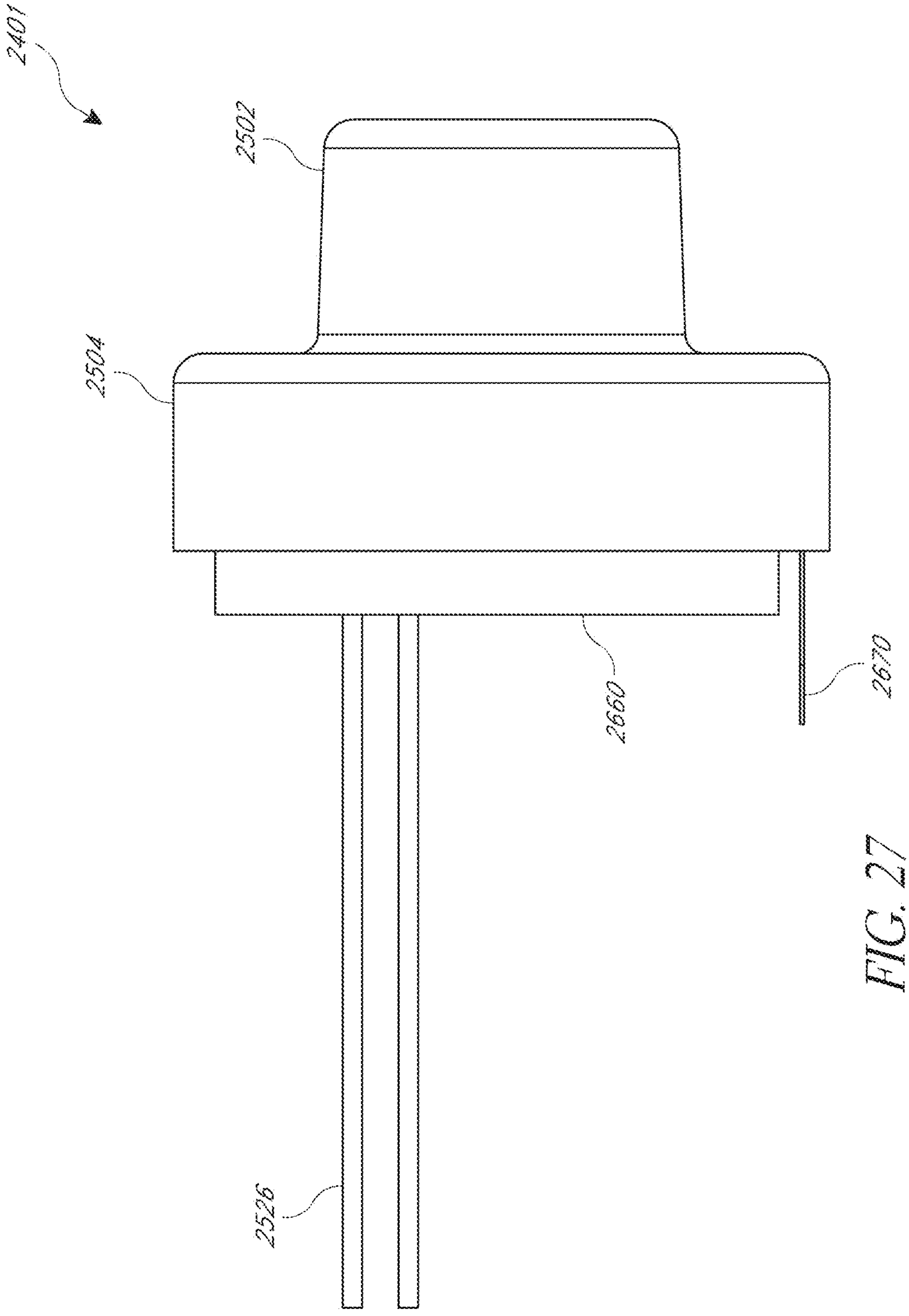
FIG. 27 illustrates a side view of an embodiment of a key nose assembly.

The nose assembly 2401 may further include an electrically conductive tab 2670, or wire, which provides an electrical connection to a capacitive plate, or partial capacitor, disposed within the housing 2504. In certain embodiments, the tab 2670 is soldered or otherwise electrically connected to a wire or lead of the key circuit (not shown). FIG. 27 illustrates a side view of an embodiment of the key nose assembly 2401. Certain of the components described with respect to FIG. 26 are shown and identified using like reference numbers.

Figure 28:
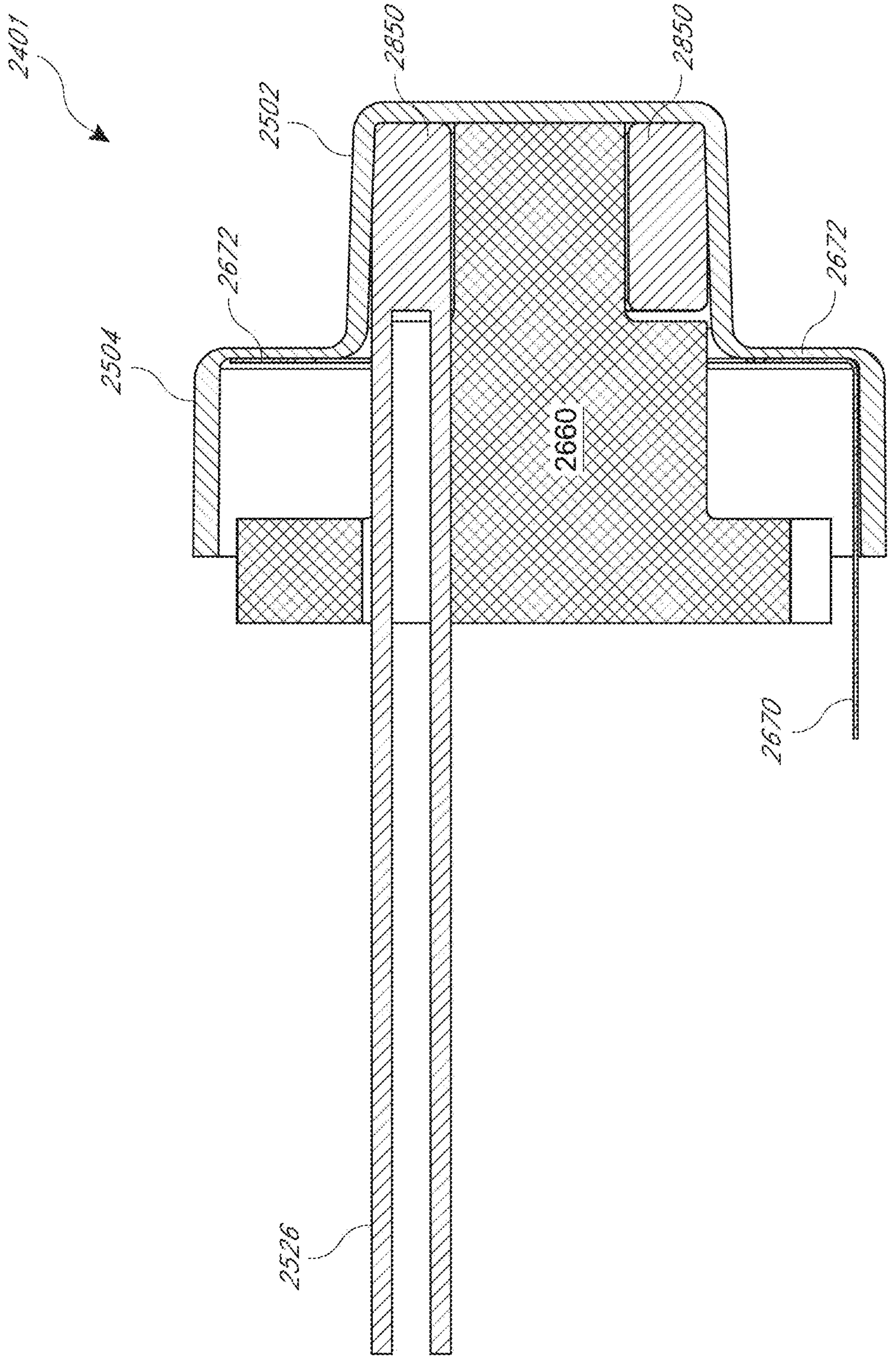
FIG. 28 illustrates a cross-sectional view of an embodiment of a key nose assembly.

FIG. 28 illustrates a cross-sectional side view of an embodiment of the key nose assembly 2401. In certain embodiments, the magnetic core 2660 occupies space within the assembly 2401 extending from a back face of the assembly to the end of the male connector region. Such a configuration may be advantageous in order to better direct the magnetic field lines caused by the winding 2850 by providing ferromagnetic material inside the winding 2850, thereby causing the magnetic field lines to run along a longitudinal axis of the key assembly at the center of the winding. The core 2660 may also serve to improve coupling between the key coil and a lock coil, and help increase inductance. As is visible in the FIGURE, the tab connector 2670 may be integrated with a disc-like capacitive plate 2672. In certain embodiments, the capacitive plate has an opening therein such that the magnetic core 2260 may extend therethrough. In certain embodiments, the capacitive plate 2672 forms a partial capacitor, wherein, when combined with a corresponding capacitive plate of a lock assembly, the plate 2672 and corresponding lock assembly plate are configured to be capacitively coupled. Therefore, in certain embodiments, the partial capacitor, alone, may not provide capacitive communication functionality for data transfer, as described herein. Furthermore, the capacitive plate may provide capacitive data transfer capabilities when coupled with another plate, such as the plate of the lock assembly. The housing portions 2504 and 2502 form the front and side outer housing of the assembly 2401, and may include a single integrated piece or separate pieces.

Figure 29B:
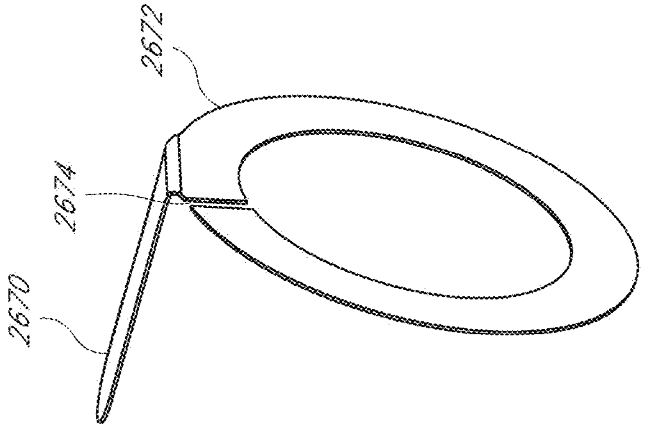
FIG. 29B illustrates a perspective view of a capacitor in accordance with one or more embodiments of the present disclosure.
Figure 29A:
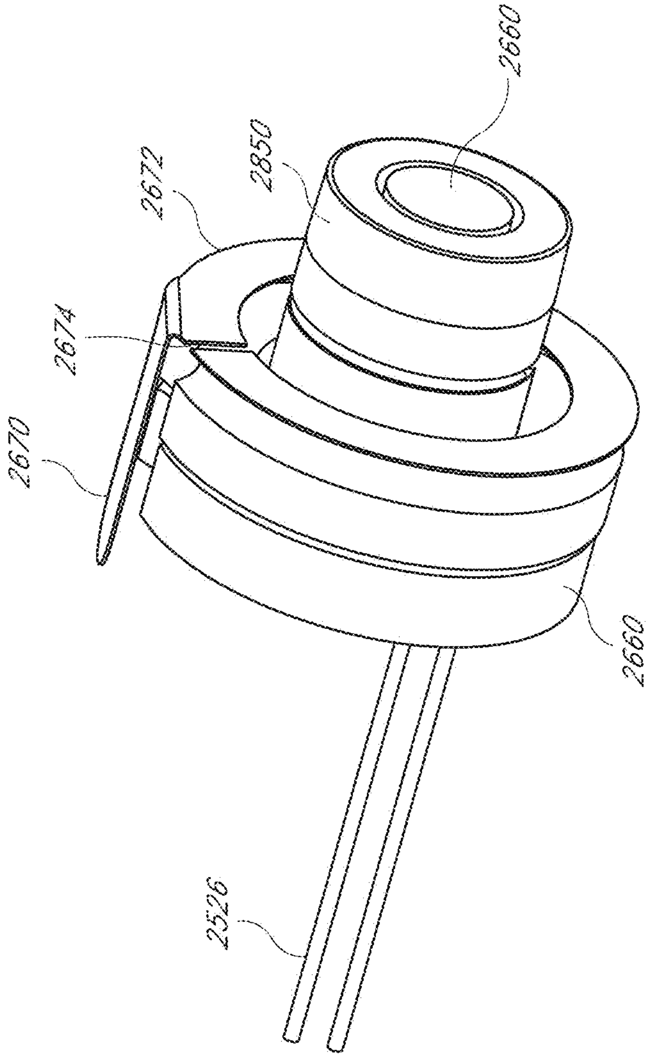
FIG. 29A illustrates a perspective view of internal components of an embodiment of a key nose assembly.

FIG. 29 illustrates a perspective view of example internal components of an embodiment of the key nose assembly 2401. This FIGURE provides a view of the capacitive plate 2672 referred to above. In certain embodiments, the capacitive plate 2674 is a flat, annulus, or donut-shaped plate having a slit 2674, or break, therein. The slit 2674 may be desirable to avoid generation of a current short (e.g., eddy current) in the plate 2672 when a charge is applied to the plate via the tab connector 2670. Therefore, the slit 2674 may serve to reduce or prevent power loss. The FIGURE schematically shows wire windings 2850 wrapping around a portion of the magnetic core 2260.

The realizable amount of coupling capacitance may be limited by the available area of the plate 2672 in some embodiments. Therefore, it may be desirable to increase or maximize the surface area of the plate 2672, in view of physical constraints that the housing or other components of the key head may impose. Furthermore, in the case where the area of the plate 2672 is small, it may be desirable to drive the capacitor with a substantially high voltage source, such as a source having peak or root-mean square (RMS) voltage levels greater than, for example, 10V or more. In certain embodiments, the capacitor is driven by a voltage source having a peak or RMS value of about 60V or more. The capacitive plate 2672 may have a diameter large enough to accommodate being disposed around the power coil 2850, while being compact enough to fit within a key head structure. For example, the capacitive plate 2672, or a cutout thereof may have a diameter of about 6 mm to about 8 mm, such as about 7 mm. In certain embodiments, the capacitive plate has a diameter of about 5 mm to about 9 mm, or about 4 mm to about 11 mm, or larger or smaller diameters. In an embodiment, an annulus-shaped capacitive plate includes a metal ring having an outer diameter of about 7 mm, wherein an inner cutout portion of the ring has a diameter of about 5 mm and the ring has a radial thickness of about 1 mm.

Figure 30:
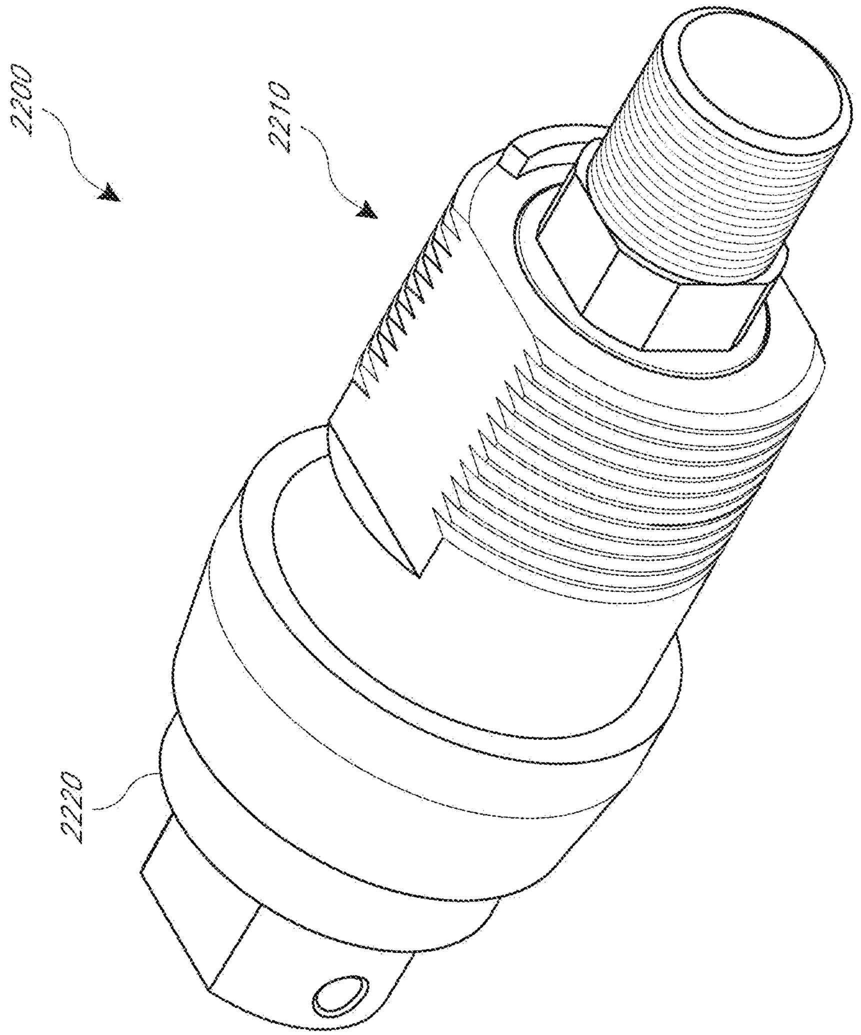
FIG. 30 is a perspective view of an embodiment of an electronic lock and key assembly.

FIG. 30 is a perspective view of an embodiment of the electronic lock and key assembly 2200 shown in FIG. 22. The figure provides an illustration of back and side views of the lock and key assembly 2200. The lock assembly 2210 may include one or more flattened surfaces or other structures configured to provide anti-rotational properties for the lock with respect to a door or drawer structure into which the lock 2210 is installed or mounted. The lock portion 2210 may include one or more electrical components. For example, the lock 2210 may include one or more inductive wire windings and/or capacitive plates used for power and/or data transfer between the lock component 2210 and the key head component 2220. The capacitive plate in the lock may have the same or similar functionality and configuration of the capacitive plate in the key.

Figure 31:
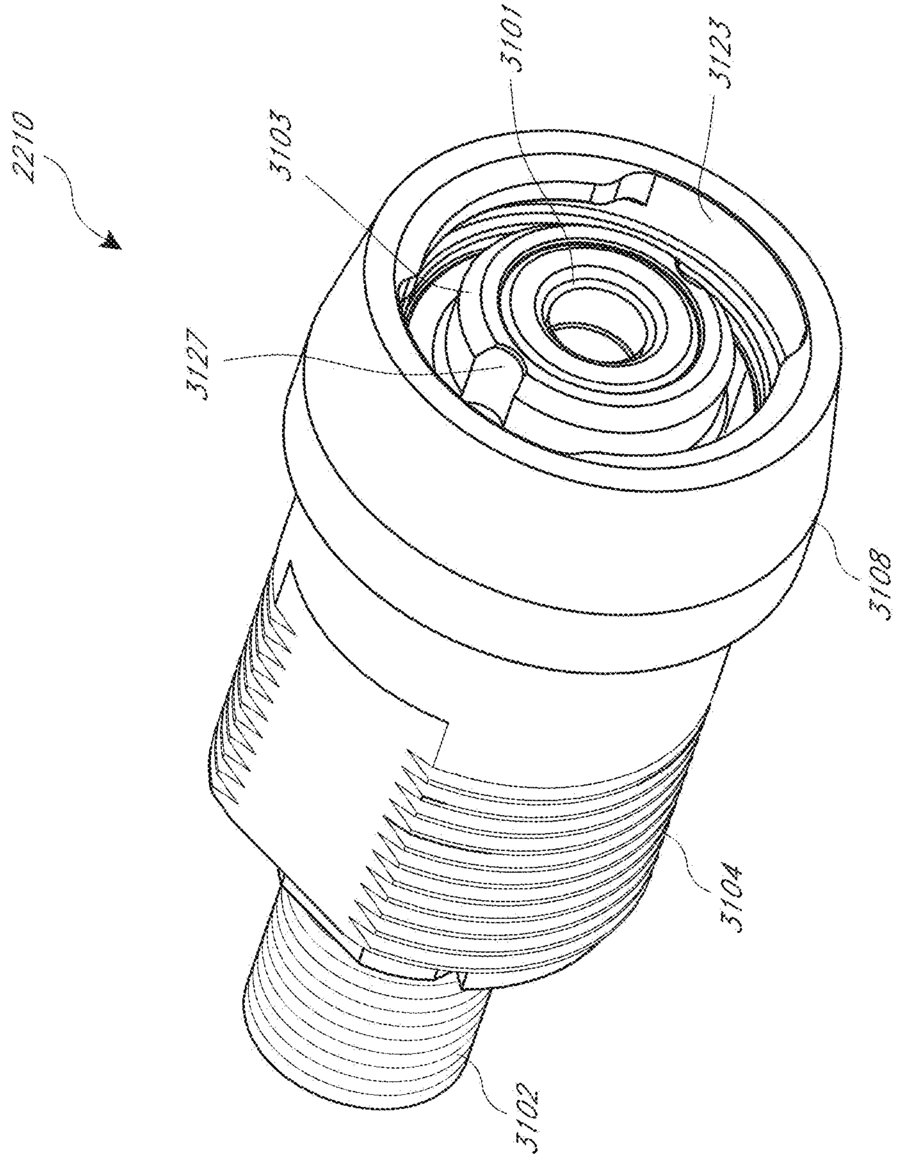
FIG. 31 illustrates a perspective view of an embodiment of a lock assembly.

FIG. 31 illustrates a perspective view of an embodiment of the lock portion 2210 shown in FIG. 30, wherein the lock 2210 is detached from the key head portion 2220 in order to better illustrate features of the front of the lock portion. The lock 2210 may include some or all of the features of the locks described above. The lock 2210 may include one or more shear pin receptacles 3127 configured to receive one or more shear pins, such as those described above with respect to FIG. 24 and others. Furthermore, the housing of the lock may include cutouts 3123 configured to receive corresponding mating structures 2423 shown in FIG. 24.

As described in greater detail above, attempted breaking of the lock 2210 through the application of sufficient rotational torque to the head portion 3108 of the lock can result in breaking of the shear pins of the key, wherein the key may not be able to actuate the locking mechanism when the pins are broken. In certain embodiments, the lock 2210 further includes a body portion 3104 and an inner cylinder portion 3102. The body portion 3104 may at least partly house the cylinder portion 3102, which may include a cartridge portion containing lock circuitry and/or locking mechanics. In certain embodiments, the diameter of the head portion 3108 is larger than the diameter of the body portion 3104.

In certain embodiments, the inner cylinder portion 3102 terminates at a front distal end with a mating portion including a cup assembly 3101 surrounded by a raised cylindrical housing 3103. An annular groove or key recess may be formed between a wall of the head portion 3108 and the raised cylindrical housing portion 3103. The annular groove may be configured to receive the mating structures 2423 of the key head 2420. The cup assembly 3101 may be configured to receive the nose portion 2401 of the key head shown in FIG. 24.

In certain implementations, the key head 2420 may mate with the lock 2210 by placement of the tabs 2423 in the annular cutouts 3123, by placement of the nose portion 2502 (FIG. 25) in the cup 3103, and/or by placement of the shear pins 2427 in the shear pin slots 3127. The female connector cup assembly 3101 may be connected to, or integrated with, the rotatable inner cylinder portion 3102 of the lock 2210. The cup assembly 3101 is illustrated in further detail in FIG. 32, and includes an outer housing and internal capacitive and/or inductive components (not shown) for electrical communication with corresponding components of a key. In certain embodiments, the assembly 3101 includes one or more wire windings for inductively coupling with inductive components of the key. Wire leads 3226 associated with such components may be provided to internal lock circuitry, such as to a circuit board contained within a cartridge in the cylinder portion 3102. The cup assembly 3101 is configured to receive the nose portion of the key in the void 3205 shown in the figure.

Figure 32:
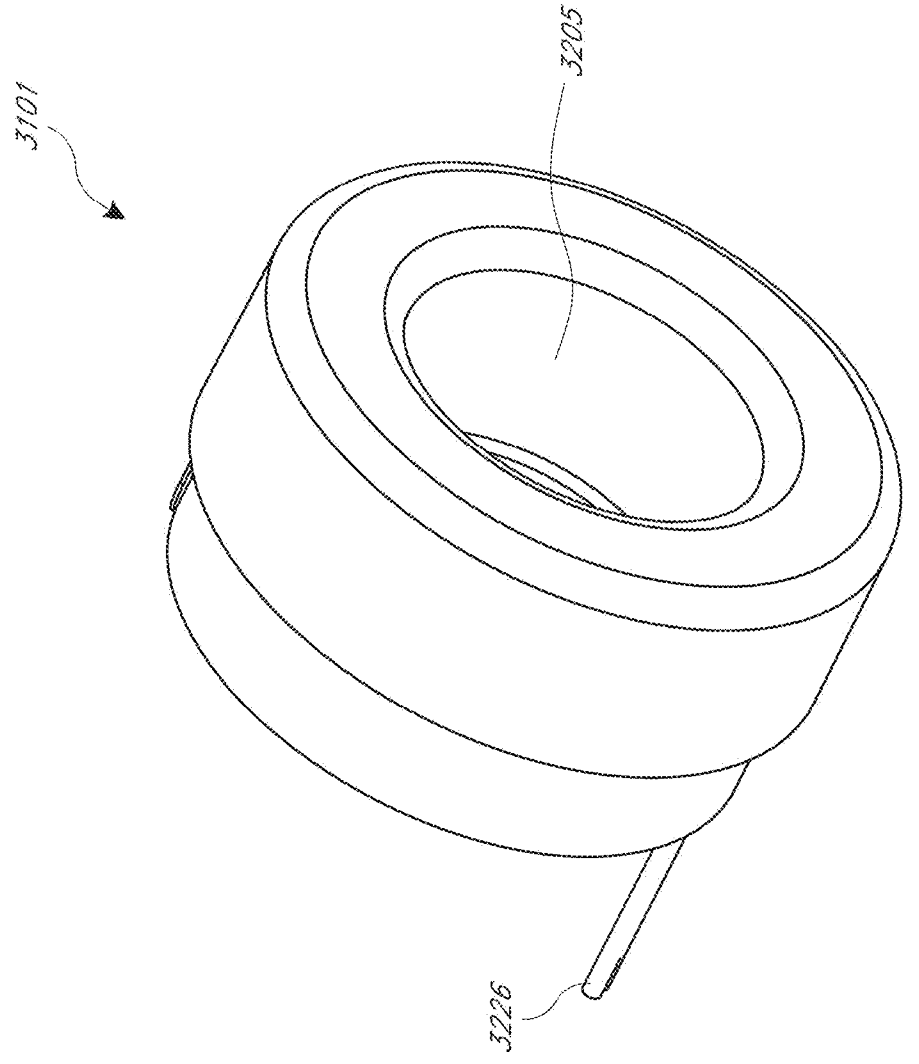
FIG. 32 illustrates a front perspective view of an embodiment of a lock cup assembly.
Figure 33:
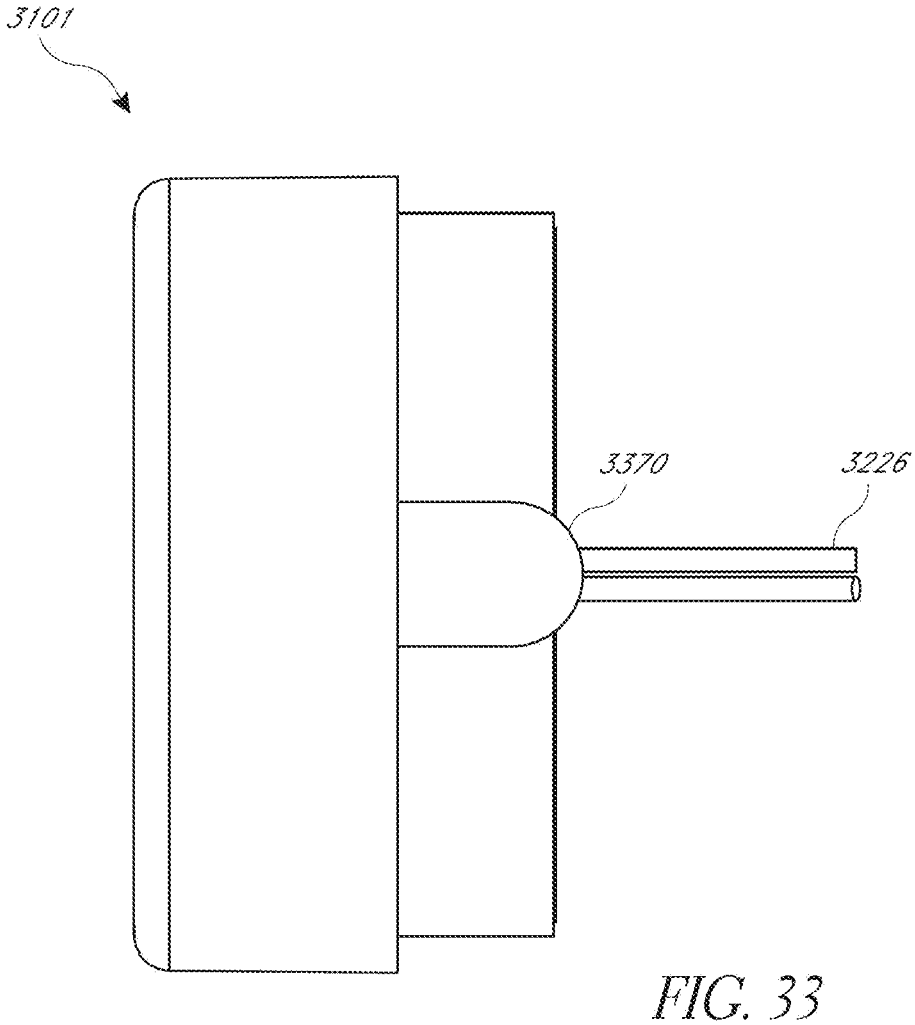
FIG. 33 illustrates a side view of the lock cup assembly of FIG. 32.
Figure 34:
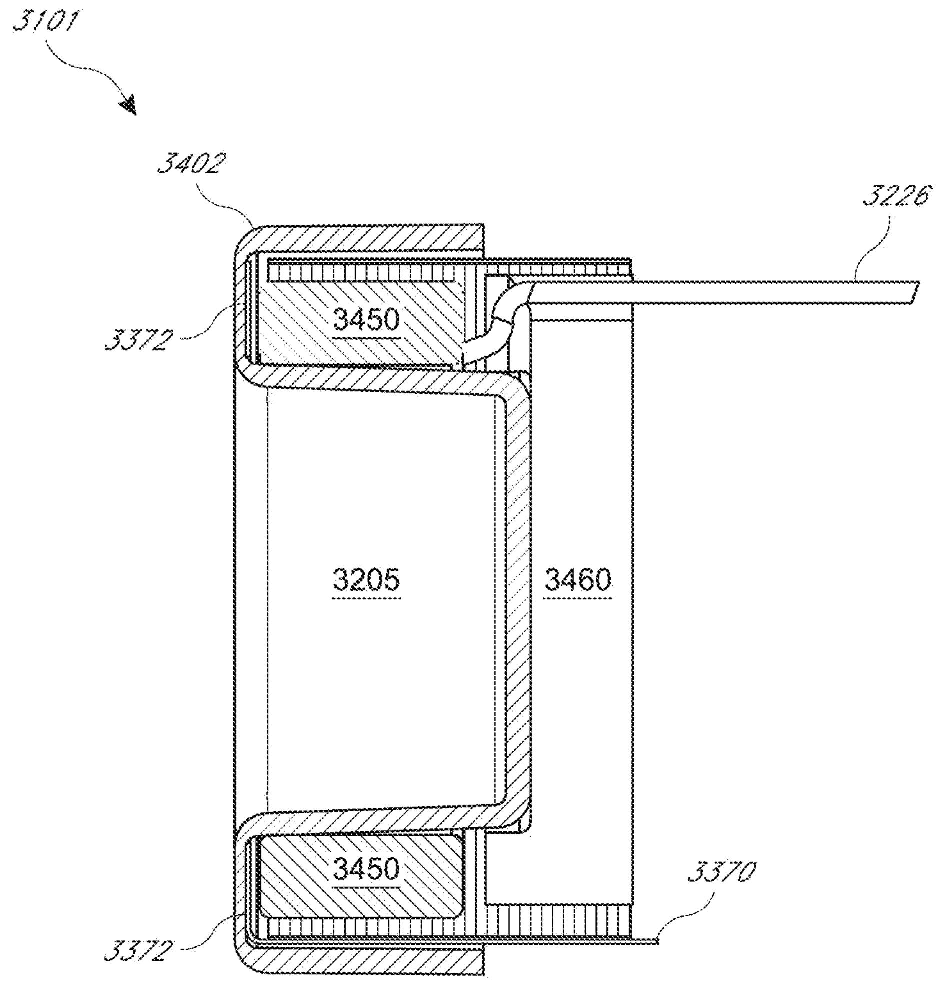
FIG. 34 illustrates a cross-sectional view of the lock cup assembly of FIG. 32.

FIG. 33 illustrates a side view of the cup assembly of FIG. 32. The view of FIG. 33 shows a capacitor contact tab 3370, which may be similar in configuration and function to the tab 2670 shown in FIG. 26. FIG. 34 illustrates a cross-sectional side view of the cup assembly of FIG. 32. In certain embodiments, the cup assembly 3101 includes one or more wire windings 3450 wrapped around the void 3205 of the cup assembly. The assembly 3101 may further include a magnetic core 3460, the functionality and effect of which is described in greater detail above. The windings 3450 and magnetic core 3460 may be at least partially covered or protected by an outer housing layer 3402, such as a rigid plastic material (which may but need not be transparent or translucent), or a metal layer having slits or openings therein to allow for penetration of electromagnetic radiation. The capacitor contact tab 3370 is shown extending past the magnetic core, providing a mechanism to provide to, or receive from, the capacitor 3372 a signal.

Figure 35:
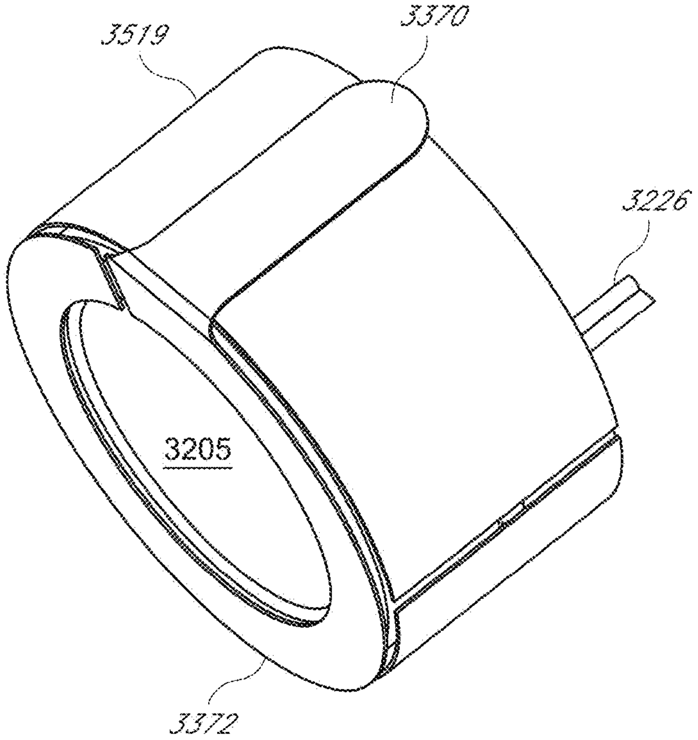
FIG. 35 illustrates a perspective view of internal components of an embodiment of a lock cup assembly.

FIG. 35 illustrates a perspective view of internal components of an embodiment of the cup assembly 3101. The view provided by FIG. 35 shows an embodiment of an annulus-shaped capacitor positioned around the perimeter of the void 3205. The capacitor 3372 and capacitor contact 3370 may be similar in structure and operation to the capacitor 2672 described above with respect to the electronic key. In certain embodiments, the magnetic core and/or wire windings of the cup assembly 3101 are at least partially surrounded or shielded by a mu-metal layer 3519 for magnet field shielding. Such shielding may decrease the amount of heat supplied by the internal coils to the surrounding components.

Reduction of inductive heating may decrease power loss, among other potential benefits.

Figure 36:
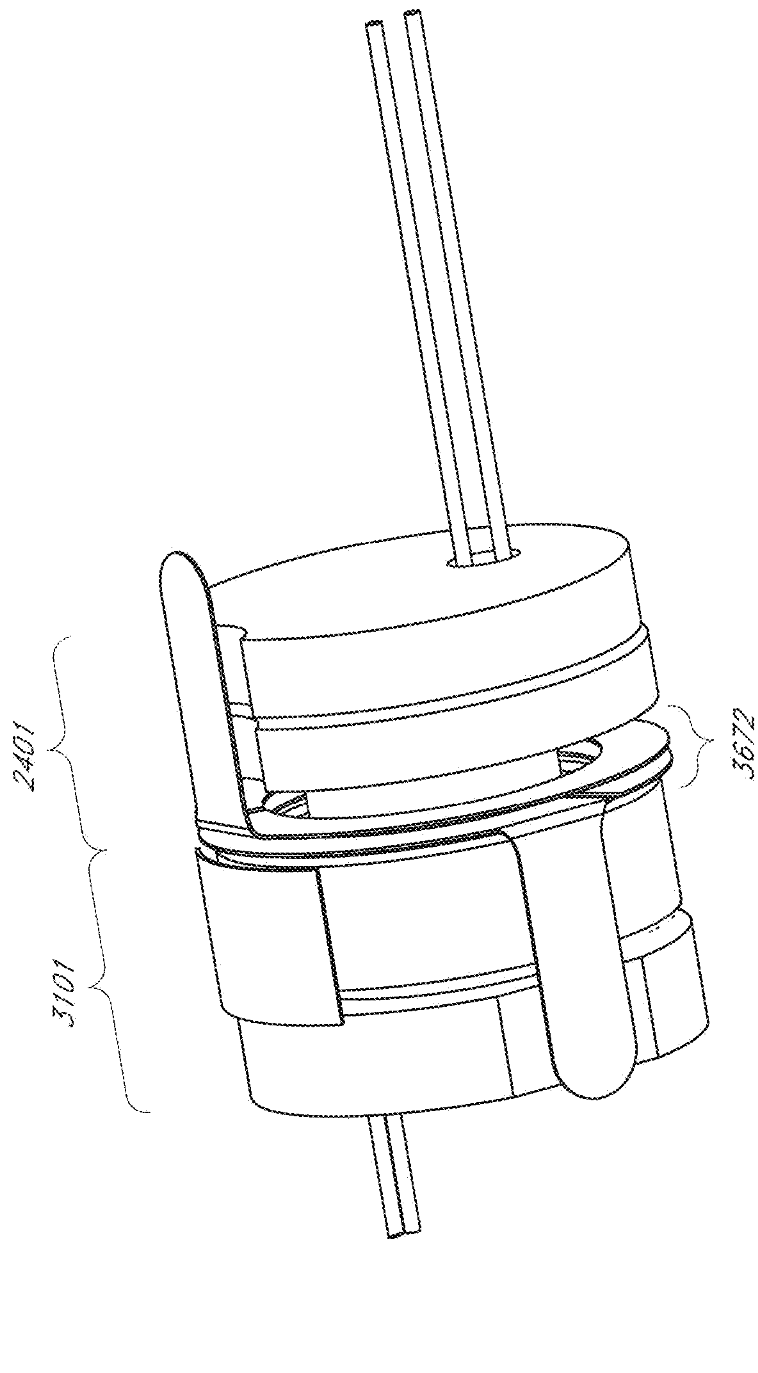
FIG. 36 illustrates a perspective view of internal components of an embodiment of a key/lock engagement assembly.

FIG. 36 illustrates a perspective view of internal components of an embodiment of a key/lock engagement assembly. This figure illustrates how the partial capacitors of cup assembly 3101 and nose assembly 2401, respectively, may be engaged in order to produce a two-plate capacitor 3672. The outer housings of the respective components are omitted for illustrative purposes only. As described above, the partial capacitors of the key and lock assemblies may be covered by a dielectric layer, such as a plastic, for example. The plastic or other material may provide a dielectric effect between the capacitor plates, thereby potentially increasing the capacitance of the capacitor 3672.

Figure 37:
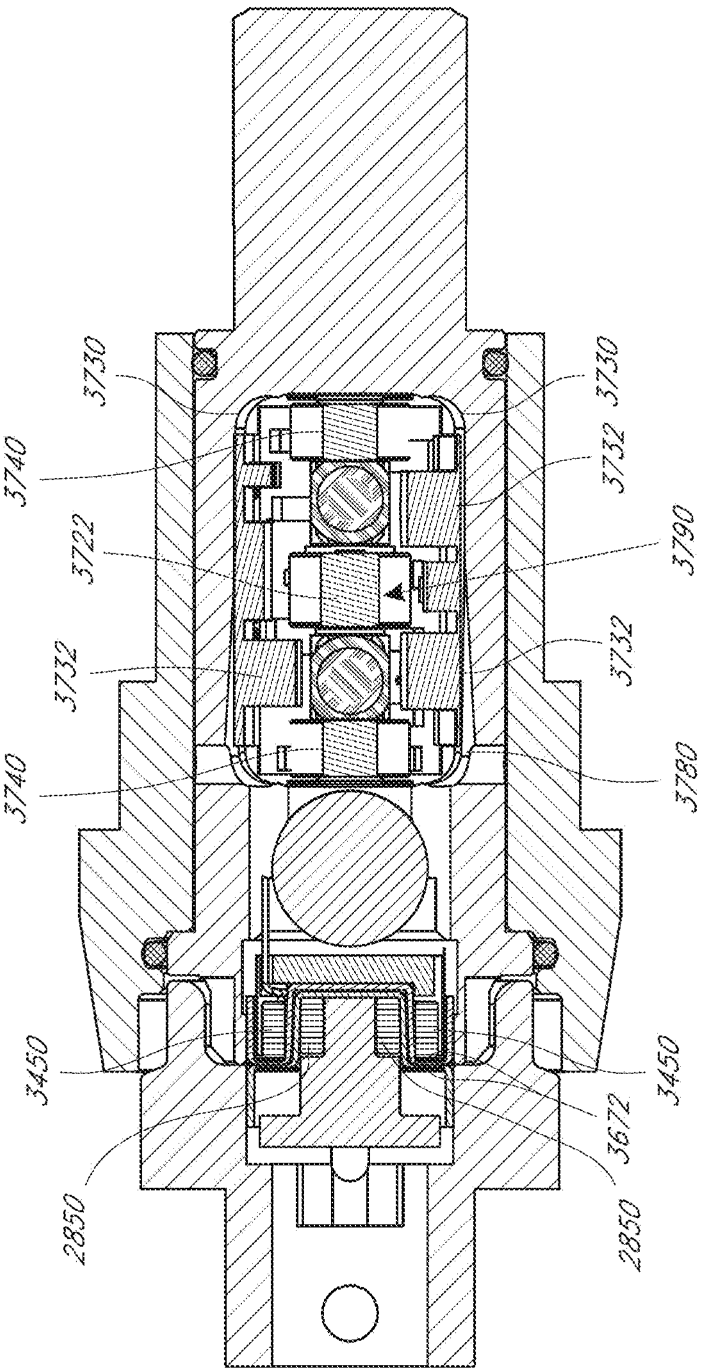
FIG. 37 illustrates a side cross-sectional view of an electronic lock and key assembly.

FIG. 37 illustrates a side cross-sectional view of an embodiment of the electronic lock and key assembly 2200 of FIG. 22. For reference purposes, the key windings 2850 and lock windings 3450, as described with reference to FIGS. 28 and 34, respectively, are called out. The capacitor 3672 is also shown (including the partial capacitors of the key and lock in proximity with each other). The capacitor is electrically coupled to a circuit board disposed within a chamber 3751 of the lock in the depicted embodiment.

With respect to a holding-coil implementation including a locking bolt member similar to that shown in FIG. 21, the view of FIG. 37 represents a view in which the bolt would project from the coil assembly out of the page. The embodiment of FIG. 37 may include a flexible circuit board at least partially wrapped around the coil assembly 3790. Such a configuration may be desirable in order to accommodate a compact chamber configuration. For example, the board may at least partially wrap around the sides and bottom of the coil assembly 3790, wherein the bolt is disposed on a top side with respect to the coil assembly.

As certain of the electronics of the circuit board 3730 may protrude into the internal chamber cavity 2780, the circuit board 3730 may be designed in such a way as to efficiently fill voids in the chamber adjacent to the coil assembly 3790. For example, larger devices may be disposed in areas where there is more room to fit such devices. The circuit board 3730 may include relatively large capacitors 3732, for example. Such devices may be disposed in spaces between the coils, as shown. One or more of the capacitors 3732 may be used to provide current pulses to the coil assembly 3790 as described above. Other, lower-profile devices may be disposed in areas having relatively less available space. The circuit board 3730 may be in electrical communication with the capacitor 3672 shown in FIG. 36 and/or inductive windings of the lock for data and power transfer. Some or all of the voids or cavities within the cylindrical core of the lock or key head assembly can be filled with an epoxy or other substance. Such backfilling may provide structural stability, as well as desirable thermal and/or electrical characteristics.

Figure 38:
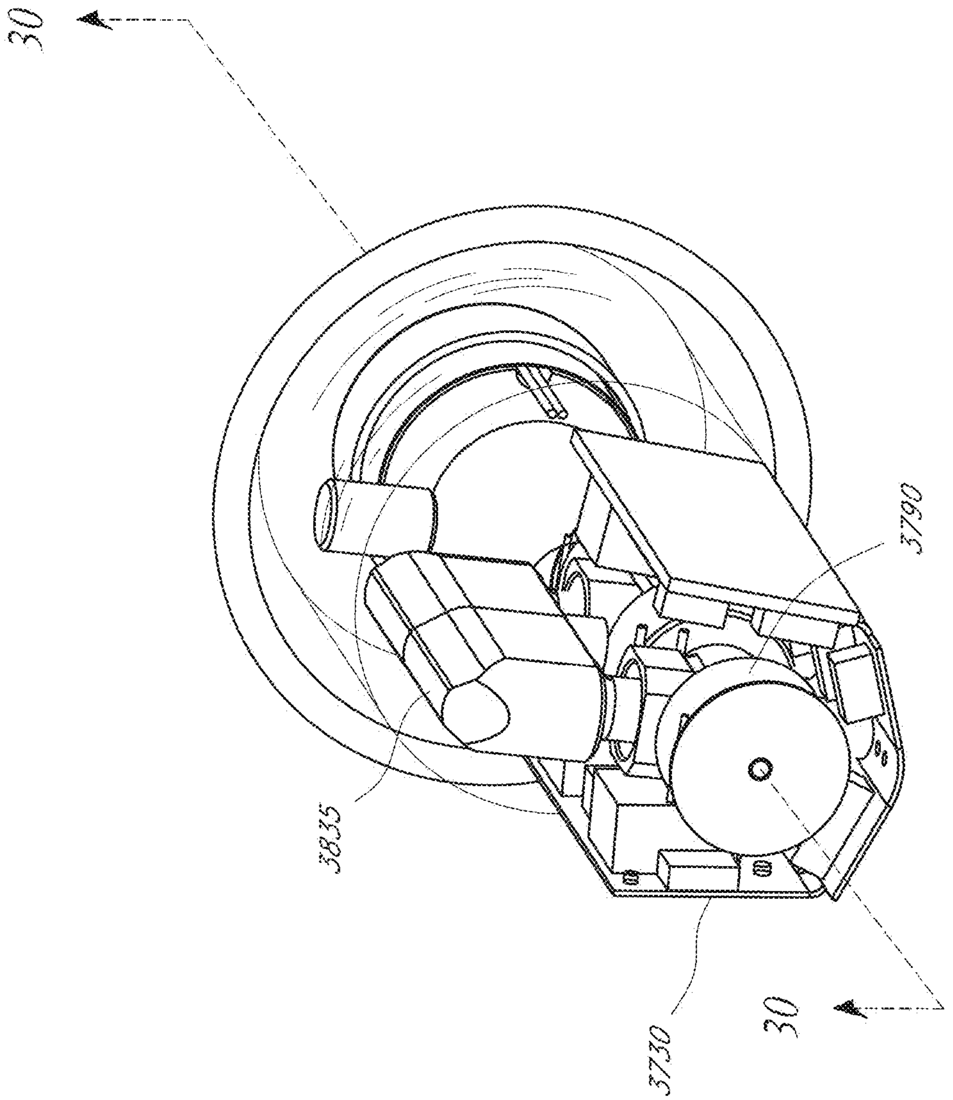
FIG. 38 illustrates a perspective view of an embodiment of internal components of a lock assembly.

FIG. 38 illustrates a perspective view of an embodiment of internal components of the lock assembly shown in FIG. 37. The view of FIG. 38 illustrates the locking bolt 3835 in an upward-facing position. Therefore, with respect to FIG. 38, the cross-section of FIG. 37 provides a view along the line 30 shown in FIG. 38. As shown, the circuit board 3730 wraps at least partially around three sides of the coil assembly 3790. In other embodiments, the circuit board 3730 may wrap around four sides or two sides of the coil assembly 3790 or may wrap around the coil assembly 3790 and overlap with itself.

Figure 39:
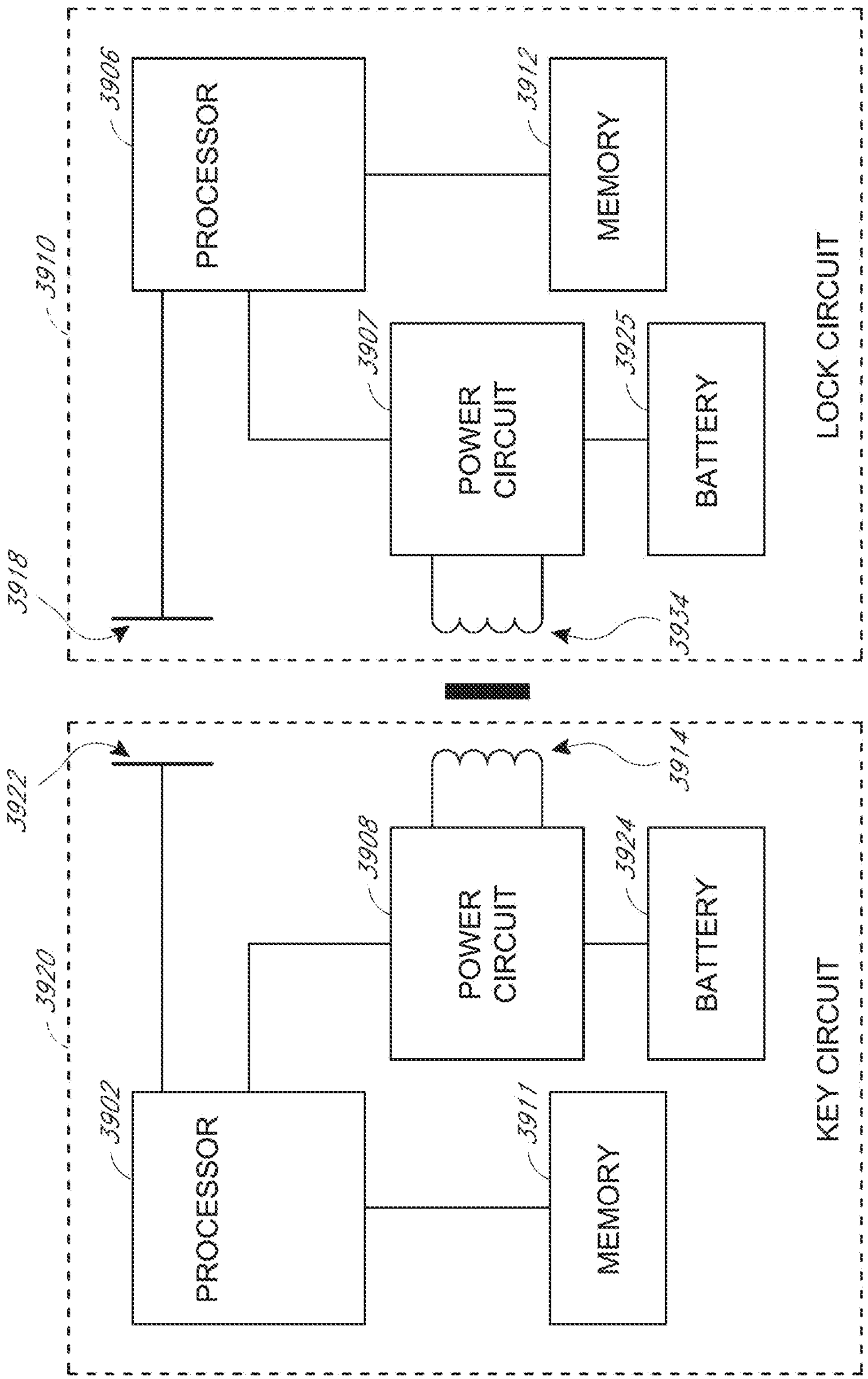
FIG. 39 is an example block diagram of lock and key circuit components in accordance with certain embodiments.

FIG. 39 is an example block diagram of lock and key circuit components in accordance with certain embodiments. Certain functional blocks of key and lock circuits have been omitted for convenience. However, it should be understood that one or more of the following additional functional blocks may be included in the lock and/or key circuits according to embodiments disclosed herein: memory devices, switches, rectifiers, recharge circuits, batteries or other power sources, solenoids, power converters, and/or other components. In the depicted embodiment, the key circuit 3920 is shown in proximity to the lock circuit 3910. The relative proximity of the key circuit 3920 and the lock circuit 3910 as presented in FIG. 39 shows that in certain implementations components of the key circuit can interface with components of the lock circuit when the key is brought into proximity with the lock. Moreover, the key circuit 3920 may be contained in a key assembly such as any of the keys described above. Likewise, the lock circuit 3920 may be contained in a lock assembly such as any of the locks described above.

The example key circuit 3920 shown includes a processor 3902. The processor 3902 may be a microprocessor, a central processing unit (CPU), a microcontroller, or other type of processor (additional examples described below). In certain embodiments, the processor 3902 implements program code to send signals to the lock circuit 3910 and/or receive signals from the lock circuit. Such signals may include power signals, data signals, and the like.

A partial capacitor 3922 is in communication with the processor 3902 through one or more conductors. The partial capacitor 3922 may be any of the partial capacitors (e.g., metal plates) described above. The partial capacitor 3922, when placed in proximity to the lock partial capacitor 3918, may form a capacitor 3972, such that communications from the processor 3902 may be passed through the capacitor 3972 to a processor 3906 in the lock circuit 3910 and vice versa. For example, the partial capacitor 3922 can receive data signals from the processor 3902. For example, such data may be communicated in the form of varying voltage or current levels, which may represent different symbols or encoded information. Thus, the partial capacitor 3922 can facilitate communication between the key circuit 3920 and the lock circuit 3910. In certain embodiments, the partial capacitor 3922 receives data in a like manner from the partial capacitor 3918 of the lock circuit 3910. In certain embodiments, the partial capacitors 3918, 3922 of the lock and key circuits are virtually tied to a common reference point or ground in order to allow for proper communication of signal levels between the two circuits. For example, parasitic capacitance formed between the power coil 3914 and the power coil 3934 may provide such a reference point during operation of the circuits.

A power coil 3914 is in communication with the processor 3902 via one or more conductors. In certain embodiments, the power coil 3914 transmits power to the key circuit 3910. The power coil 3914 may be any of the power coils described above. In one implementation, the power coil 3914 receives a time-varying electrical signal, which induces a magnetic field in a corresponding power coil 3934 in the lock circuit 3910, as described in greater detail above. Power may be provided to the power coil 3914 by a power source, such as the battery 3924.

The lock circuit 3910 includes a processor 3906. Like the processor 3902 of the key circuit 3920, the processor 3906 may be a microprocessor, a central processing unit (CPU), or any other type of processor (additional examples described below). In certain embodiments, the processor 3906 implements program code in order to send certain signals to the key circuit 3920 and/or receive signals from the key circuit 3920. Such signals may include power signals, data signals, and the like.

A partial capacitor 3918 of the lock circuit is in communication with the processor 3906 through one or more conductors. The partial capacitor 3918 may be any of the metal plate described above, such as a washer-shaped disc. In certain embodiments, the partial capacitor 3918 receives data from the processor 3906 and transmits the data to the key circuit 3920. In certain embodiments, the partial capacitor 3918 receives data from the key circuit 3920.

The lock circuit receives an oscillating power signal from the key circuit with power coil 3934. In certain embodiments, the oscillating power signal is provided to a coil or solenoid. The solenoid may use the signal to generate a magnetic field to actuate an unlocking mechanism in a lock, in a manner similar to that described above. For example, the power signal may be used to power one or more coils in a holding coil embodiment, as described above.

While not shown, in certain embodiments the lock circuit 3910 includes a battery in addition to, or in place of, the battery 3924 in the key circuit 3920. In such instances, the lock circuit 3910 may provide power to the key circuit 3920. This power may, for example, be used by the key circuit 3920 to recharge the battery 3924. Alternatively, if the key circuit 3920 does not have a battery or other power source, power transmitted from a battery in the lock circuit 3910 may power the key circuit 3920.

Figure 40:
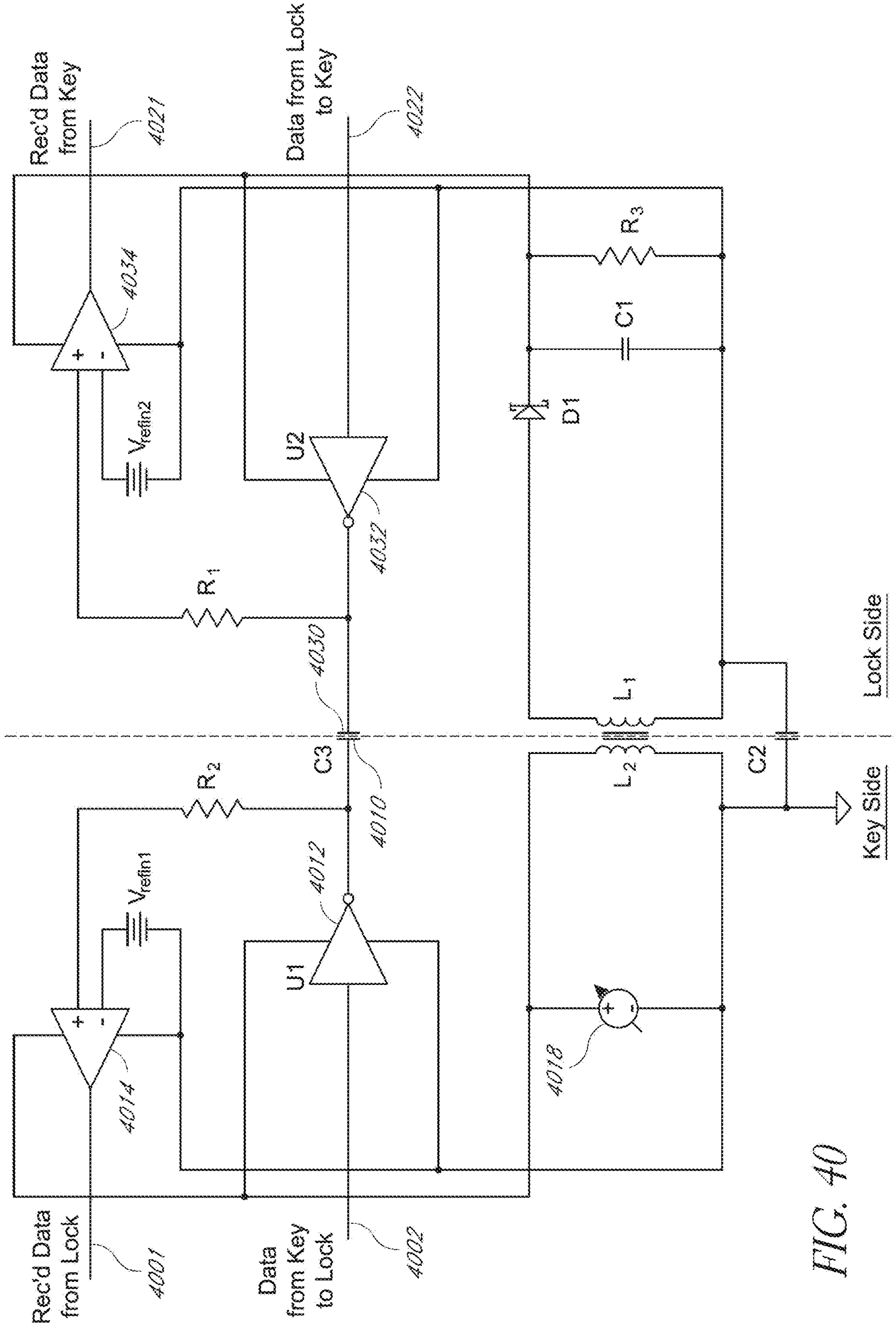
FIG. 40 illustrates an example schematic diagram of key and lock circuit components in accordance with certain embodiments.

FIG. 40 illustrates an example schematic diagram of key and lock circuit components in accordance with certain embodiments. In certain respects, the key circuitry shown may be substantially similar in structure and/or function to one or more of the key circuits described above. The key and lock circuit shown can implement any of the features of the circuit of FIG. 39 and/or be combined with the circuit of FIG. 39. FIG. 40 includes separate key and lock portions, as labeled. Although the implementation shown in FIG. 40 is depicted, other suitable implementations may also be used, which may include alternative and/or additional features.

Although not shown in the figure, conductive lines 4001, 4002, 4021, and 4022 may be coupled to key and lock processor devices, respectively, such as the processors described above with respect to FIG. 39. On the key side, a partial capacitor 4010 is connected to a conductor 4002 through a tri-state inverter 4012. The partial capacitor 4010 may be any of the partial capacitors described above, and may, for example, include an annular-shaped plate having a slit therein, as described above. In certain embodiments, the key circuit may be configured to send data to and/or receive data from the lock circuit using the partial capacitor 4010. When a data signal is sent by the key circuit, the signal can be provided by the key processor and passed through the inverter 4012 to the partial capacitor 4010. In practice, the key circuitry may be positioned in proximity to the lock circuitry, so that the partial capacitor 4010 may be disposed adjacent to a corresponding partial capacitor 4030 of a lock circuit. In certain embodiments, the two partial capacitors 4010, 4030 form a single capacitor C3, through which data signals may be transmitted. The capacitor C3 may have relatively low capacitance, such as about 1 pF, or some other value that may depend on the geometry and size of the partial capacitors 4010, 4030 and/or based on a type of dielectric material between the two partial capacitors 4010, 4030. Therefore, in order to transmit a signal that can be processed by the lock circuit, the inverter 4012 may be driven at a high voltage relative to an input voltage of the key, such as about 60V, for example. Although not shown, a transformer can step up the input voltage of a key (which may be much lower than 60V, e.g. 3-6 volts from batteries) to the higher voltage used to drive the capacitor C3.

The tri-state inverters 4012, 4032 may be configured to be set in high impedance (or high-Z) mode when the respective circuits are receiving data over the capacitor C3. Such a state may present a substantially open circuit in view of the received signal and thereby route the data signal to a comparator device 4014, 4034 in each respective circuit. In one embodiment, the lock and key circuits are in either a transmit or receive mode, but not both, at any given time. Thus, if the key circuit is transmitting data to the lock circuit, the lock circuit may be in a receive mode, and the tri-state inverter 4032 may be set to a high-Z mode (e.g., by a processor). Likewise, if the lock circuit is transmitting data to the key circuit, the key circuit may be in a receive mode, and the tri-state inverter 4012 may be set to a high-Z mode (e.g., by a processor). Each of the inverters 4012, 4032 may also default to high-Z mode unless data is being transmitted one through the inverters 4012, 4032 to the opposing circuit, in which case the processor can disable the high-Z state of the transmitting inverter. In some embodiments, the high-Z mode is enabled by default so that the processor does not need to enable high-Z mode when transmissions are received. Optionally, in other embodiments, the key and lock may operate in a full-duplex configuration instead, such that communications may be sent bidirectionally and simultaneously between the key and the lock.

In the depicted embodiment, the comparators 4014, 4024 are each coupled with a reference voltage (e.g., Vrefin1, Vrefin2). The reference voltage may provide a threshold voltage against which a received signal is compared. For example, when the received signal is greater than the reference voltage, the comparator may provide a high signal to the key processor over conductor 4001. In certain embodiments, the reference voltage level is less or equal to about 1V, such as about 0.5 V. The signal provided to the processor by the comparator, on the other hand, may be larger than 1V, and may advantageously be of a sufficient magnitude to be read and processed adequately by the processor. While certain components are described herein with respect to the key circuit shown, the lock circuit of FIG. 40 may include devices having similar structure, function, and/or values, as shown.

Various encoding schemes may be used to transmit and receive data. For example, a Manchester or NRZ encoding scheme may be used, where each bit of data is represented by at least one voltage transition. Alternatively, a pulse-width modulation scheme may be employed, where a signal's duty cycle is modified to represent bits of data. Furthermore, the circuitry shown in FIG. 40 may be configured to provide data in either or both directions.

A power coil 4016 is connected across an alternating voltage signal 4018, wherein the voltage signal induces a current in the coil. The alternating voltage signal may originate from a DC battery source of the key circuit that is converted into an alternating signal (e.g., using a power inverter or the like) and provided to the inductor 4016. In one embodiment, the inductance of the power coil 4016 is approximately 10 μH, although other values may be used. In certain embodiments, the power coil 4016 transmits power to the lock circuit through inductive coupling with the lock power coil 4036. The power transfer circuitry may be configured to operate similarly to one or more power transfer circuits described above. Power received by the lock circuit using power coil 4036 may be provided to rectifier circuitry in order to at least partially convert the alternating current signal to a direct current signal for use by the lock circuitry.

Figure 41A:
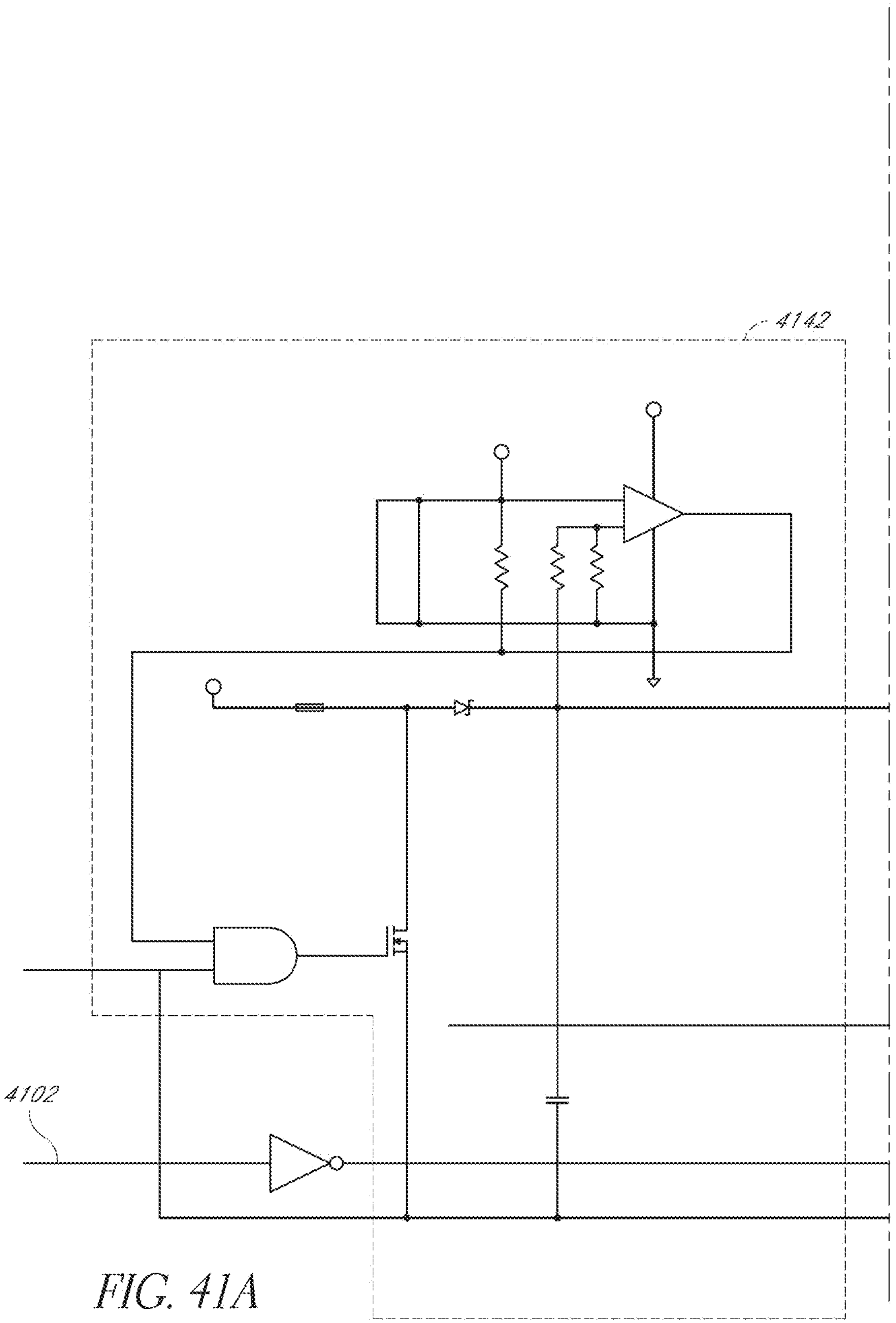
FIGS. 41A-41C illustrate an example schematic diagram of circuit components in accordance with certain embodiments.
Figure 41B:
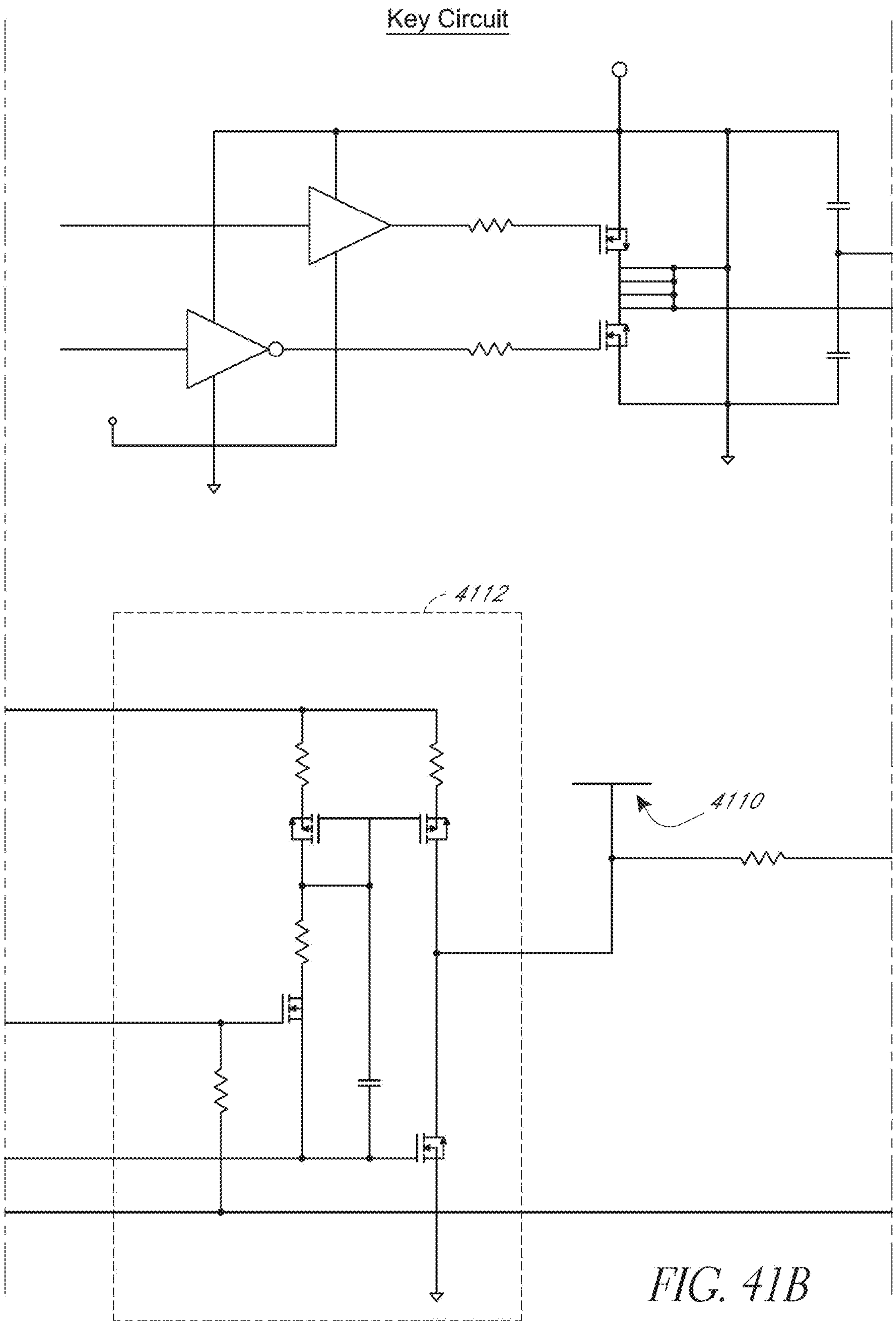
Figure 41C:
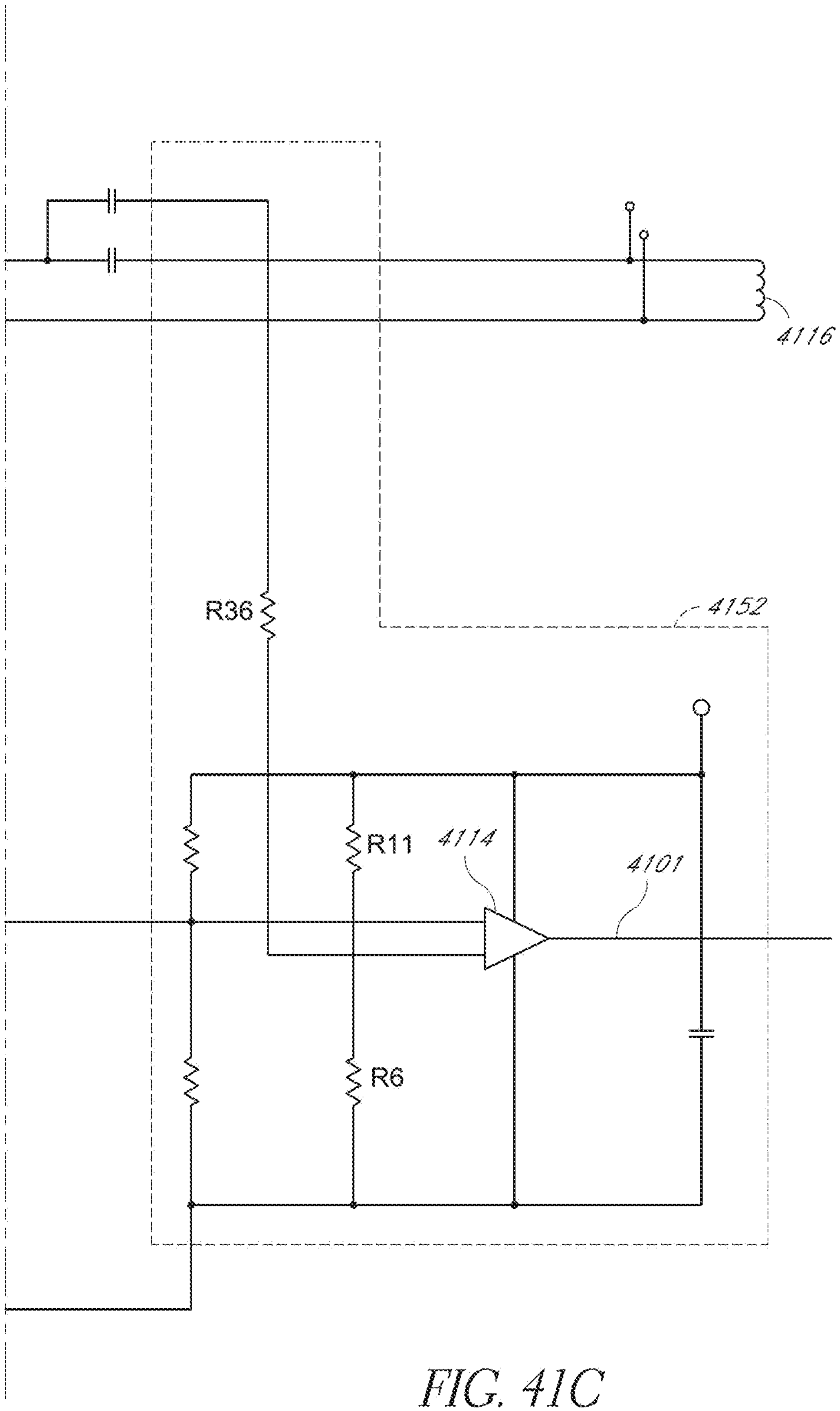

FIGS. 41A-41C illustrate an example schematic diagram of key circuit components in accordance with certain embodiments. The circuitry illustrated in FIGS. 41A-41C may represent a more detailed representation of circuitry associated with the key circuit of FIG. 39 or 40. Dashed boxes represent regions or portions of the key circuit that perform various functions. The circuitry includes a region 4142 configured to provide a regulated high-voltage signal, such as the 60V signal described above with respect to FIG. 40. The circuitry further includes tri-state inverter circuitry 4112 configured to provide a partial capacitor 4110, through which data may be transferred from the key circuit to a corresponding lock circuit. Although not shown, some or all of the key circuitry or variations thereof may also be implemented in the lock. Further, certain aspects of the key circuitry are not shown but may be included herein, including a processor. Moreover, any of the features of the key circuit shown in FIG. 40 can be implemented together with any of the circuits described above.

Data received from a lock circuit may be provided to a receiver circuit 4152 including coupled power compensation circuitry. The receiver circuit can, in addition to including a comparator 4114 that provides an output signal to a processor (not shown), compensate for induced voltage on the partial capacitor 4110. This voltage may be induced by magnetic fields in the ferrite core of the key power coil described above and may be caused by the bending of the power coil magnetic field to a non-perpendicular orientation with respect to the partial capacitor at or near an end region of the power coil. In the depicted embodiment, the receiver circuitry 4152 includes a resistor network that employs a voltage divider to adjust the voltage level provided as a reference input to the comparator 4114. A portion of the power signal provided from the coil 4116 is provided to the reference input to the comparator 4114 in order to offset the reference voltage to at least partially compensate for the unwanted voltage induced on the metal plate 4110. For example, the values of R6, R11, and R36 may be calculated to provide an appropriate offset and compensation level for coupled interference at the comparator input. Thus, for example, the initial voltage reference of the comparator 4114 is raised by an amount approximately equal to an estimated amount of noise received by the capacitor due to coupling with the power coil. As a result, the comparator 4114 may not output a logic high value unless the signal from the partial capacitor 4110 is higher than the noise level plus an initial reference level and therefore not passing a logic high solely due to noise in many instances. In certain embodiments, the circuitry 4152 utilizes an op-amp inverter in place of the comparator.

VI. EXAMPLE LOCK STATE DETECTION

As described above, the key and/or the lock may generate and store audit data for tracking the use of electronic keys and locks. This audit data may include ID numbers of keys used to access locks, including keys which unsuccessfully attempted to open locks, as well as the IDs of users who use the keys and locks (for example, by tracking the users' passcodes entered into the keys or key retention devices (see below)). The audit data may further include several other types of information. For instance, audit data can include data on when a lock is unlocked, data on when a locked item containing the lock is opened, data on when a lock is relocked, or data on when a locked item containing the lock is closed. The audit data can include dates and times for these and possibly other actions. The audit data can also include information about whether a key was lost or whether a key was returned to a docking station or key retention device (examples of which are described below). Audit data can therefore allow administrators to monitor the use of keys and locks as well as the individuals who use those keys and locks.

While it can be useful to track when a lock is unlocked or relocked, it can be difficult to tell when a lock has relocked because the lock typically may relock after the key has been withdrawn from the lock. Once the key has been withdrawn from the lock, the key may not be able to communicate with the lock to determine the lock state (absent wireless communications, which may be included but which may increase the cost of the lock and key). Further, it can be useful to determine whether a locked item (for example, a cabinet, enclosure, door, padlock, or the like) containing the lock is open or closed. Separate hardware can be used to detect opening and closing of the locked item, or whether the item is locked or unlocked. However, it may be desirable to use the key alone (in conjunction with the lock) to heuristically estimate when the locked item is open or closed.

Moreover, it can be particularly useful to track unlockings and relockings in the emergency services industry. Fire and law enforcement departments, for example, may install key cabinets outside buildings, which may store building keys so that emergency personnel can gain access to a building in an emergency instead of breaking a door or window. These key cabinets can include the electronic lock core described above. The corresponding electronic key described above can be used to access those key cabinets. Given that the public may place great trust in emergency personnel by permitting them access to their buildings, it can be important to track and audit the use of electronic keys with these key cabinets so as to identify and address any misuse of those keys or key cabinets.

The following describes example features for detecting a lock state, such as whether the lock is locked, unlocked, or relocked. These features can also be used to heuristically determine whether a locked item containing the lock is opened or closed, or secured or unsecured. Any of the features described below may be implemented using any of the keys or locks described above. For example, the features described below can be implemented with locks whose data transfer functionality includes a capacitive interface, inductive interface, or combinations of the same, as well as locks that inductively transfer data modulating a power signal that delivers power to the lock. Further, the features described below can be implemented with any other electronic keys and lock, including those that operate with electrical contacts. In some implementations, lock state detection can involve the key communicating one or more heartbeat signals to a lock and determining based on the response(s) it receives from the lock, if any, whether the lock is locked, unlocked, or relocked. In some cases, the heartbeat signal may include a periodic signal generated by hardware or software in the key. The periodic signal may be sent to the lock to determine information about the lock and/or the relationship between the key and the lock. For example, the signal may be communicated to the lock to determine whether the key remains in contact with the lock. The determination of whether the key is in contact with the lock may be based on a response to the heartbeat signal. In some cases, the lock may provide a heartbeat signal to the key to communicate to the key that it is in a particular state or remains in communication with the key.

Figure 42:
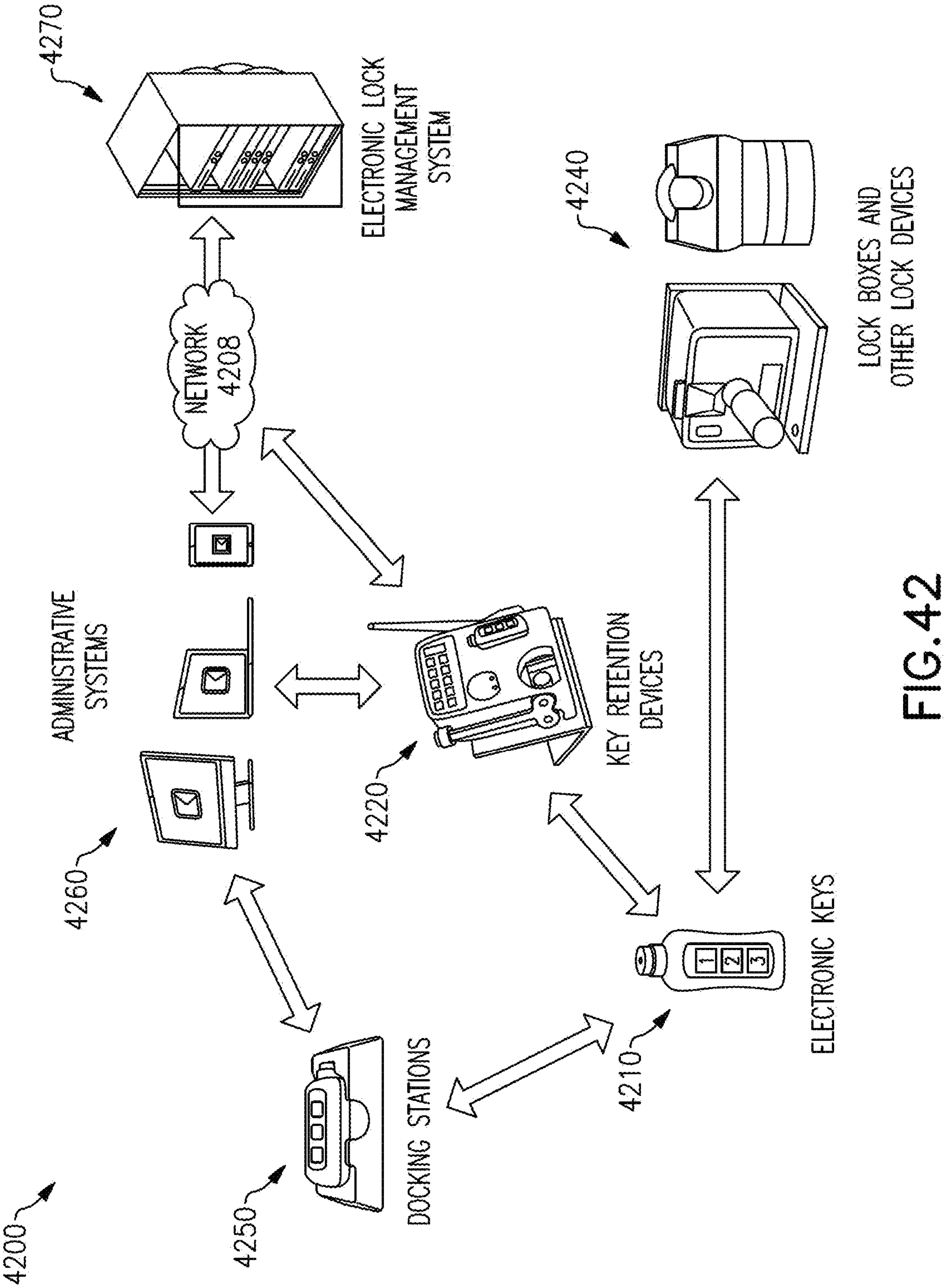
FIG. 42 illustrates an example heuristic lock state detection process.

FIG. 42 depicts an example key management system 4200. The key management system 4200 represents an example environment for using the electronic keys and locks described above. Not every aspect of the key management system 4200 may be implemented in every embodiment, and other features and aspects not shown may be implemented in other embodiments. One or more aspects of the key management system 4200 can facilitate tracking or auditing electronic key and lock usage. For instance, one or more aspects of the key management system 4200 can perform lock state detection.

In the example key management system 4200 shown, there are electronic keys 4210, key retention devices 4220, lock boxes and other locking items 4240 (such as padlocks), docking stations 4250, administrative systems 4260, an electronic lock management system 4270, and a network 4208. The network 4208 can include a wireless and/or wired network, a local area network (LAN), a wide area network (WAN), the Internet, an intranet, combinations of the same, or the like.

The electronic key 4210 can have the features of any of the electronic keys described above. For instance, the electronic key 4210 can have a capacitive and/or inductive interface that permits contactless electronic transmission of data and power to a corresponding lock core installed in a locking device 4240. The key retention device 4220 can secure both the electronic key 4210 and optionally a mechanical key. When a user enters a code into an electronic keypad on the key retention device 4220 (see, e.g., FIG. 44), the key retention device 4220 can release the mechanical and/or electronic key for usage. The key retention device 4220 may be installed in an emergency responders' vehicle, such as a fire truck, ambulance, or police car. In addition, key retention devices 4220 may be provided at emergency facilities such as at a fire station or police station.

The electronic key 4210 can communicate electronically with the key retention device 4220 to transmit audit data regarding electronic key usage with a locking device 4240. In turn, the key retention device 4220 can upload the audit data to one or more administrative systems 4260 over a wired or wireless connection. The administrative systems 4260 may be personal computers, desktops, laptops, tablets, smartphones, or the like operated by one or more administrative users (or simply, "administrators"). The administrative systems 4260 can include software, which may be a standalone application or web application, that submits the audit data to an electronic lock management system 4270 over the network 4208. The standalone application or web application can enable the administrators to view and analyze the audit data to identify irregularities and the like (see, for example, FIG. 45). In addition, the key retention devices 4220 may transmit the audit data directly to the electronic lock management system 4270 over the network 4208, for example, over a wireless connection. In some cases, the electronic key 4210 may itself transmit the audit data to an administrative system 4260 and/or an electronic lock management system 4270 over a wired or wireless connection. For example, the electronic key 4210 may include a radio frequency transmitter or a near field communication device that enables the electronic key 4210 to communicate audit data to the administrative system 4260.

The docking station 4250 may have a similar functionality as the key retention device 4220, including receiving data from the electronic key 4210 and transmitting that data over the network 4208 to the one or more administrative systems 4260 and/or directly to the electronic lock management system 4270. Further, both the key retention device 4220 and the docking station 4250 can charge the electronic key 4210 and can be used to program the key 4210.

The electronic lock management system 4270 can include software implemented on one or more servers, physical or virtual, which may be geographically dispersed in one or more data centers or geographically co-located. The electronic lock management system 4270 can be implemented in a cloud computing platform, such as a platform as a service (PaaS), infrastructure as a service (IaaS), or software as a service (SaaS) platform, examples of which include Microsoft Azure™ and Amazon AWS™. The electronic lock management system 4270 can store and analyze audit data received from the plurality of electronic keys 4210, key retention devices 4220, and/or docking stations 4250. The electronic lock management system 4270 can provide the web application referred to above, which may be accessed using a browser of the administrative systems 4260. The web application may include one or more user interfaces that output the audit data in various forms, such as tables, graphs, charts, or the like (see, for example, FIG. 45).

Figure 43A:
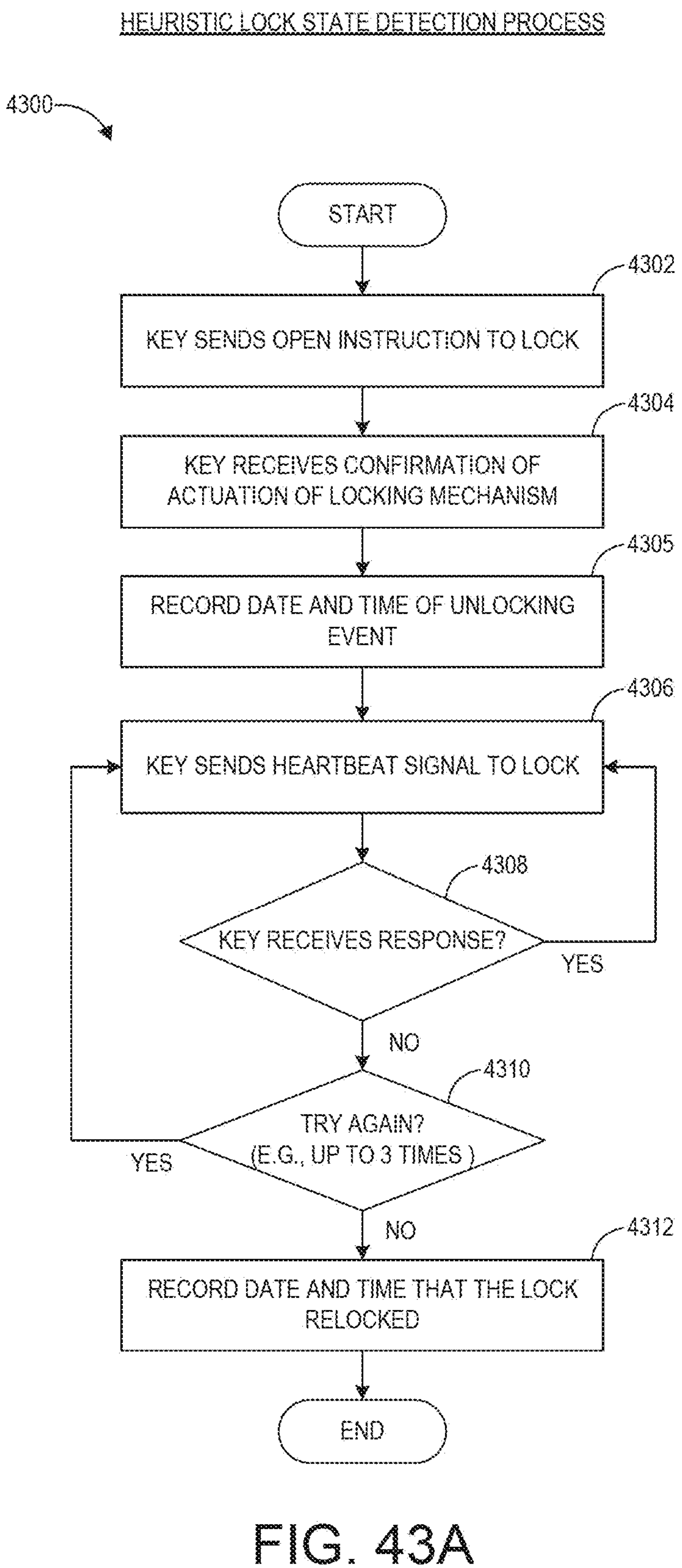
FIGS. 43A and 43B illustrate example heuristic lock state detection processes.

FIG. 43A illustrates an example heuristic lock state detection process 4300. The process 4300 can be implemented by any of the electronic keys described above. For convenience, the process 4300 is described as being implemented by the key 4210 described above with respect to FIG. 42. The process 4300 may be implemented by a hardware processor of the key 4210, which may be programmed to perform the steps of the process 4300 shown. The key 4210 can interface with any of the lock cores described above, including a lock core installed in any of the locking items 4240.

The process 4300 may occur when an electronic key 4210 is mated with an electronic lock including in a locking item 4240. The key 4210 may be mated with the lock when a portion of the key configured to engage with or communicate with a portion of the lock is positioned with respect to a corresponding portion of the lock configured to engage with or communicate with the portion of the key. For example, the key 4210 may mate with the lock when a mating portion 1312 of a key engages a mating portion 1408 of a lock.

The heuristic lock state detection process 4300 may be used to detect whether a lock is locked, unlocked, or relocked. The process may involve the key 4210 sending one or more heartbeat signals to the lock and awaiting one or more responses from the lock. Prior to execution of the process 4300, the key 4210 can be mated with the lock, and a user may enter a passcode using the buttons on the key 4210 described above (see, e.g., FIGS. 2 & 19A). In some implementations, when the key 4210 is mated with the lock and then turned to the unlocked position, the key may be secured within the lock as described above with respect to FIG. 19A. For example, when unlocking, the tabs 1314 of the key 1300 of FIG. 19A may slide under the tabs 1470 of the lock 1400, securing the key in the unlocked position such that the key may not be removed until the key is first moved to the locked position. As will be described in greater detail below, the securement of the key in the lock when in the unlocked position can facilitate the lock state detection process 4300.

In some cases, the process 4300 can be combined with a door state detection process to determine whether a lock is in a locked or unlocked position when a door, a draw, a gate, a container, or any other lockable structure or locking item 4240 is in an open to closed position. For example, the door state may be determined using magnets, one or more accelerometers, electrical connections or circuits, tilt sensors, piezoelectric sensors, pressure sensors, and the like to determine whether the door, or other lockable structure, is open or closed. Further, the door state may be determined using proximity detection sensors, such as radio frequency identification (RFID) sensors. One such non-limiting example of sensors that may be used to determine the door state of a lockable structure includes the Virtual Interlock Validator™ that is incorporated in the Knox® MedVault® product produced by the Knox Company. Further, some additional non-limiting examples of sensors that may be used with the systems described herein are described in U.S. Pat. No. 8,339,261, filed on Jul. 1, 2009, which is hereby incorporated by reference in its entirety herein. The open or closed state information may be combinable with the locked or unlocked state information to provide auditing or status information for a lock or structure including the lock.

At block 4302, in response to receiving this passcode, the key 4210 sends an open instruction to the lock. The key 4210 can send this open instruction over the capacitive or inductive data interfaces described above. (In general, any communications of data between the key 4210 and the lock may be done using either the capacitive or inductive interfaces described above, or via any electronic mechanism usable by an electronics key or lock.) The open instruction may include a series of bits formatted according to a protocol recognized by both the key and the lock. These bits may be conveyed using an analog modulation scheme, such as amplitude modulation (including rectangular pulse amplitude modulation), frequency modulation, or phase modulation, or a digital modulation scheme such as phase-shift keying (PSK), frequency-shift keying (FSK), amplitude-shift keying (ASK), or quadrature amplitude modulation (QAM). Thus, the key may communicate a modulated waveform between a partial capacitor of the key to a corresponding partial capacitor of the lock (or between equivalent inductors). The key and the lock may communicate at baseband frequencies or at modulated carrier signal frequencies.

At block 4304, the key 4210 receives confirmation from the lock of actuation of the locking mechanism described above, for example, by receiving a confirmation signal from the lock indicating that the lock has unlocked. In some cases, the key 4210 may determine that the lock is unlocked by determination of a relative position of the key 4210 when mated with the lock. The determination of the relative position of the key 4210 may be based on alignment of particular elements of the key 4210 (e.g., coils, the nose, or tabs) with particular elements of the lock (e.g., coils, a cup, or tabs). In some such cases, elements of the key 4210 may only be permitted to align with elements of the lock when the correct passcode is provided by the key 4210 to the lock.

At block 4305, the key 4210 records the date and time of the unlocking event, for example, in a memory device of the key 4210. The key 4210 may further record an amount of time that the locking item 4240 is unlocked and/or open. Alternatively, or in addition, the key 4210 provides the date and time of unlocking and locking of the locking item 4240 to an administrative system 4260 and/or electronic lock management system 4270, which may determine the amount of time that the locking item 4240 is unlocked and/or open based on the provided data. In some cases, the key 4210 may record whether the locking item 4240 confirmed its lock status or whether the key 4210 inferred the lock status based, for example, on the heartbeat signal. Further, the key 4210 may record a location of the unlocking event. For example, if the locking item 4240 is portable or within a moveable structure, such as a vehicle, the key 4210 may identify a location of the locking item 4240 using, for example, a global positioning system, that may be embedded in the key 4210 and/or the locking item 4240. In some cases, the location may be determined from information stored in a memory of the locking item 4240. For example, the locking item 4240 may store information identifying whether it is located at a front door or rear door of a building.

In some cases, the key 4210 may associate information about the key 4210 itself with the unlocking event. For example, the key 4210 may associate key identification information or key status information, such as whether the key is a master or administrator key capable of programming a locking item 4210, or a slave or non-administrator key that may have a reduced feature set (e.g., not capable of programming the locking item 4210). In some cases, the locking item 4240 may record the date and time of the unlocking event, for example, in a memory device of the locking item 4240. Some or all of the above described information can be included in audit information that may be stored in memory and/or transmitted over a network to an administrative system 4260 or an electronic lock management system 4270.

At block 4306, the key 4210 sends a heartbeat signal to the lock. This heartbeat signal may be one of several that the key 4210 sends to the lock. In addition to having its ordinary meaning, the term "heartbeat signal" as used herein can refer to a signal that the key periodically sends to the lock for the purpose of eliciting a response that would signify that the lock is still in communication with the key. In some cases, the heartbeat signal may be sent aperiodically or with greater frequency. For example, as described below, if the heartbeat signal is not acknowledged, the heartbeat signal may be sent more frequently.

If the lock is still in communication with the key 4210, then the key 4210 may infer that the lock is still unlocked. This assumption holds in some implementations because in an unlocked state, the key is secured in the lock by the tabs 1314 of the key being engaged with the tabs 1470 of the lock. However, if the key is moved to a locked state and then removed from the lock, the key should no longer receive communications from the lock, and thus the heartbeat signal will not be responded to by the lock (in embodiments where wireless communication is not used). Accordingly, the key 4210 can infer that the lock has relocked. In some cases, the key 4210 may determine or infer that the lock remains in an unlocked position based on an orientation of the key 4210 with respect to the locking item 4240. The orientation of the key 4210 may be determined, for example, based on an alignment of coils between the key 4210 and the locking item 4240, based on a position of a mechanical switch engaged by the key, based on an orientation of the key 4210 while engaged with the locking item 4240, and the like. Further, in some cases, the key 4210 may receive a lock indication signal from the locking item 4240 indicating that the locking item 4240 has relocked.

Thus, if the key receives a response from the lock at block 4308, the key can continue to send heartbeat signals to the lock at block 4306. However, if the key does not receive a response at block 4308, the key can try again to send another heartbeat signal at block 4310, and thus the process 4300 loops back to block 4306. If a certain number of heartbeat signals have been sent to the lock without receiving a response, such as three signals, the key may infer that the lock is now in a locked (or relocked) state because the key is likely removed from the lock. Accordingly, at block 4312, the key can record the date and time that the lock was relocked. This date and time recordation can be part of the audit data stored in the key, together with the date and time recordation of the unlocking event at block 4305.

Although not shown, subsequent to the process 4300, the key 4210 can transmit its stored audit data regarding dates and times of unlocking and re-locking, or any of the additional information described above that can be included as part of the audit data. For instance, when the key 4210 is docked with the docking station 4250 or the key retention device 4220, the key 4210 can upload its stored audit data to the docking station 4250 or key retention device 4220. As described above with respect to FIG. 42, the docking station 4250 or key retention device 4220 can then upload the audit data directly or indirectly to the electronic lock management system 4270 over the network 4208 or through the administrative system 4260. In some cases, the key 4210 may transmit the stored audit data at a point in time when the key 4210 obtains network access or is in communication with a device that has network access.

Figure 43B:
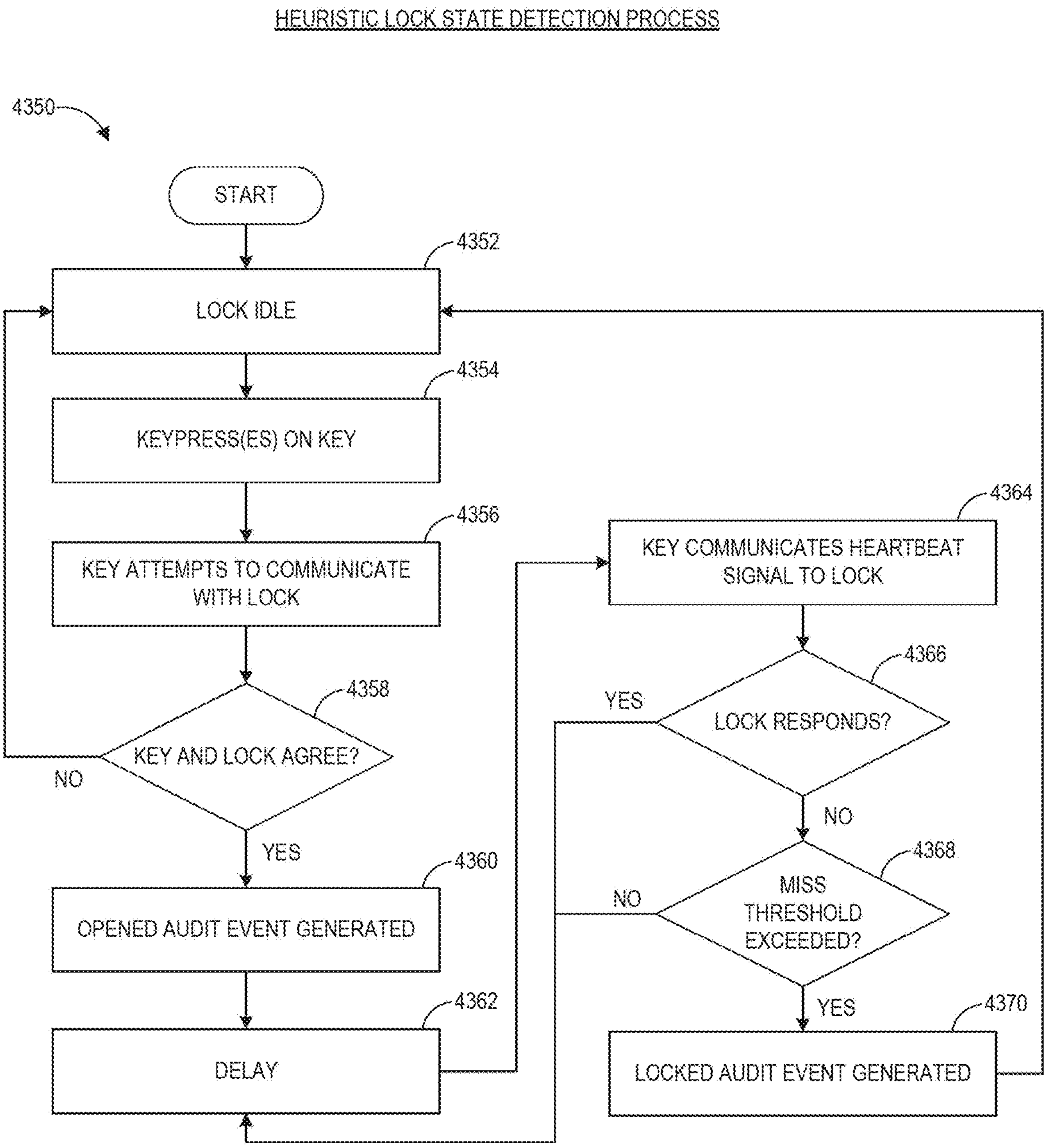

FIG. 43B illustrates another example heuristic lock state detection process 4350. Like the process 4300, the process 4350 can be implemented by any of the electronic keys described above. Further, as with the process 4300, the process 4350 may be combined with a door state detection process. For convenience, the process 4350 is described as being implemented by the key 4210. The process 4350 may be implemented by a hardware processor of the key 4210, which may be programmed to perform the steps of the process 4350 shown. The key 4210 can interface with any of the lock cores described above, including a lock core installed in any of the locking items 4240.

At block 4352, the lock is idle. For example, the lock may be in a locked state. At block 4354, one or more keypresses are detected at the key. The key then attempts to communicate with the lock at block 4356, for example, by supplying an access code derived from the one or more keypresses. At block 4358, it is determined whether the key and lock agree, for example, by the lock determining whether the one or more access codes it received from the key 4210 correspond to a valid access code stored in a memory device of the lock.

If the key 4210 and lock do not agree, the process 4350 loops back to block 4352, and the lock remains idle. Otherwise, an opened audit event is generated at block 4360. The opened audit event can involve the key and/or the lock storing in a memory device of the key and/or the lock audit data indicating that the lock was opened (for example, unlocked), along with a date and time of that opening. The lock audit data may further include a location of the lock and/or how long the lock was opened for. Moreover, the lock audit data may confirm whether the locking item 4240 was confirmed closed when locked or relocked.

At block 4362, the key delays for a predetermined period of time, such as some milliseconds or seconds. For example, the key may delay for 1, 2, 3, 5, or 10 milliseconds or seconds, any amount of time in between the preceding examples, or for more or less time.

At block 4364, the key 4210 communicates a heartbeat signal to the lock. At block 4366, the key determines whether the lock responds. If so, the key again delays at block 4362 and then sends another heartbeat signal to the lock at block 4364. If the lock does not respond, the key determines at block 4368 whether a miss threshold has been exceeded. As described above, in one example, the miss threshold is three missed heartbeat signals. If the miss threshold has not been exceeded, the key again delays at block 4362 and communicates another heartbeat signal to the lock at block 4364. One or more of the subsequent occurrences of the delay 4362 may differ in length from one or more of the previous occurrences of the delay 4362. For example, if the lock does not respond to a heartbeat signal, the delay may be shortened. In contrast, if the lock does respond to the heartbeat signal, or if the lock has responded to a certain number of consecutive heartbeat signals, the delay may be lengthened. Adjusting the length of the delay may provide for a more accurate determination of lock status and/or may alter power consumption of the key 4210.

If the miss threshold has been exceeded, a locked audit event is generated at block 4370. The locked audit event can include the key and/or the lock storing, in a memory device of either the key and/or the lock, audit data indicating that the lock was locked (or relocked), along with a date and time of that locking. In some cases, a lock may provide an indication of the lock status to the key 4210. In other cases, the key 4210 may determine that the lock is locked after a particular period of time has elapsed due, for example, to an auto lock capability of the lock. In some cases, the key 4210 determines or identifies the lock as being locked if or when a closed status for the locking items 4240 is determined or confirmed. The lock status may be included as part of the audit data. In some cases, if a response is not received from the lock indicating lock status, the audit data may include an indeterminate status for the lock.

Figure 44:
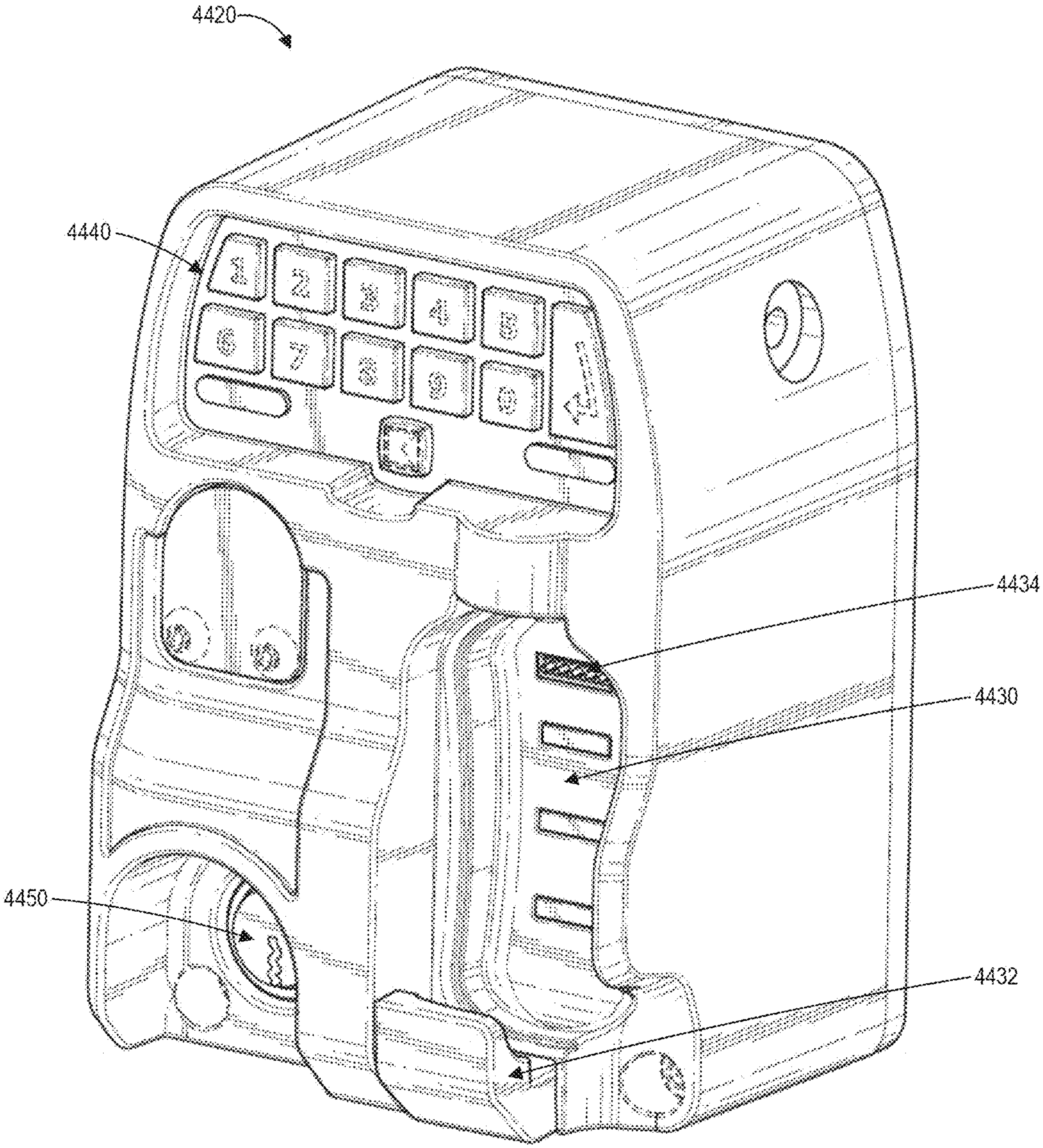
FIG. 44 depicts an example key retention device.

Turning to FIG. 44, an example key retention device 4420 is shown. The key retention device 4420 is an example of the key retention device 4220. Additional details regarding the key retention device 4420 are described in U.S. application Ser. No. 29/601,962, filed Apr. 27, 2017, titled "Docking Station," which is hereby incorporated by reference in its entirety. Because the key retention device 4420 can permit docking of an electronic key (including charging the key, obtaining audit data from the key, and programming the key with new access codes), the key retention device 4420 may also be considered to be a docking device like the docking station 4250. However, the key retention device 4420 may also have additional functionality beyond merely being a docking device.

The example key retention device 4420 shown includes an electronic key holder 4430 and a mechanical key holder 4450 (which may be omitted in some embodiments). The electronic key holder 4430 can hold any of the electronic keys described above, such as the key 4210. A retaining arm 4432 can hold the electronic key in place within the electronic key holder 4430. The retaining arm 4432 may be opened and closed electronically by a motor residing inside the key retention device 4420. A keypad 4440 can enable a user to input a personal or department keycode. The inputted keycode can be provided to a processor inside the key retention device 4420, which can send a signal to the motor, causing the retaining arm 4432 to open so as to release the electronic key from the key holder 4430. Input of the keycode can also release the mechanical key from the mechanical key holder 4450 via similar motor control.

Because a user may need to input a personal key code or department key code into the keypad 4440 before obtaining a mechanical or electronic key, the key retention device 4420 can permit accurate recordation of who accesses keys and when. Whenever a user inputs a code to access a key or returns that key to the key retention device 4420, the key retention device 4420 can record these actions as audit data. Likewise, as described above, whenever a user re-inserts a key into the key retention device 4420, the key can upload its audit data to the key retention device 4420, for example through pins 4434, which may electrically couple with electrical contacts on the back of the key (not shown). The key retention device 4420 thereafter may upload the audit data generated by the key and the audit data generated by the key retention device 4420 to an administrative system 4260 and/or the electronic lock management system 4270.

Figure 45:
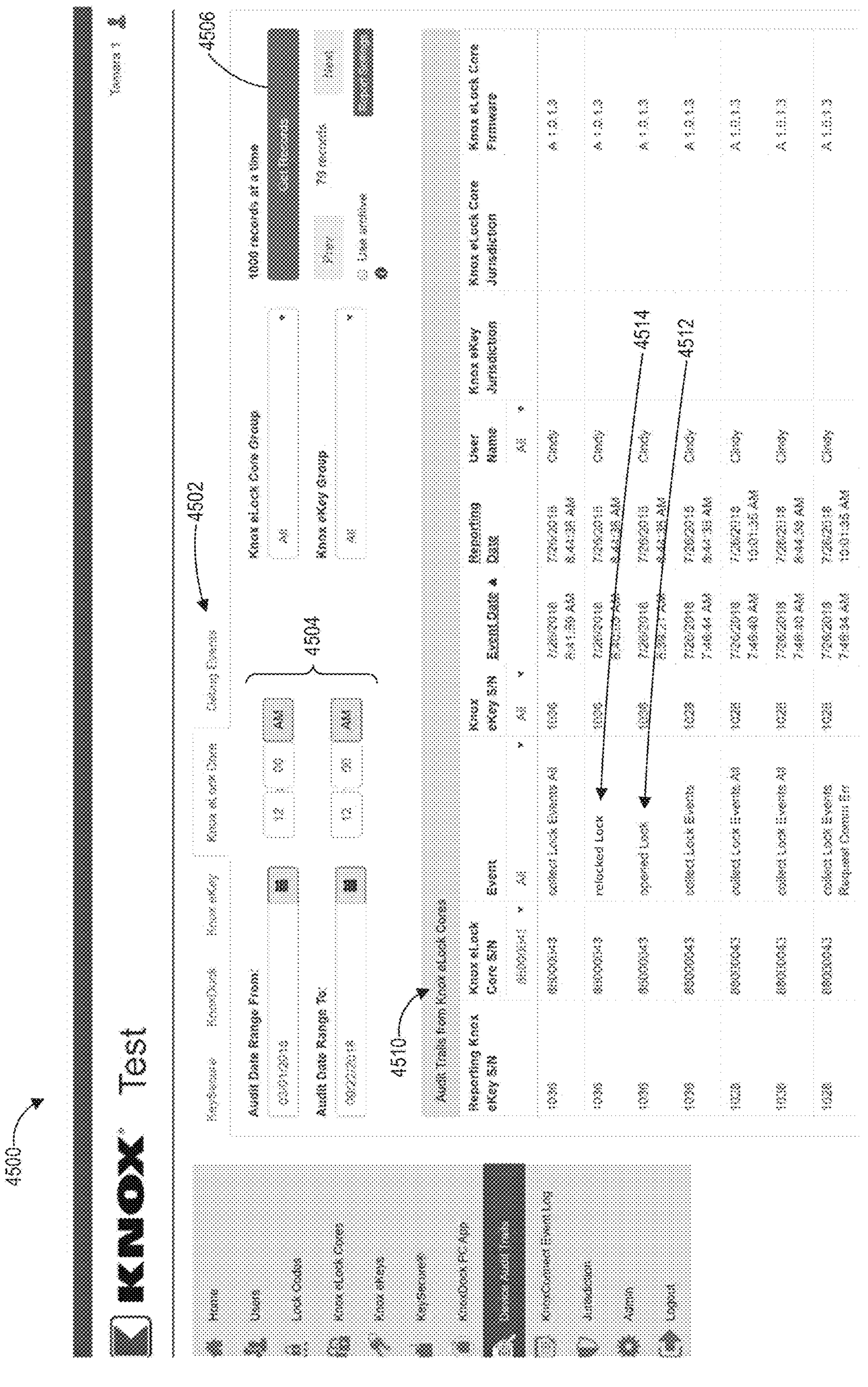
FIG. 45 depicts an example audit trail user interface.

FIG. 45 depicts an example audit trail user interface 4500. The audit trail user interface 4500 may be generated by the standalone application, mobile application, or web application described above with respect to FIG. 42, which may be output by the administrative system(s) 4260 (and which may be generated by the electronic lock management system 4270). The user interface 4500 shown includes one or more user interface elements or controls that can be selected by a user, for example, using a browser or other application software (such as a mobile application). The user interface 4500 can output information regarding audit data corresponding to a key and/or lock, such as opened events and locked (or relocked) events.

In the example user interface 4500 shown, user-selectable tabs 4502 are provided to enable a user to access audit data regarding several different devices. These tabs include a "KeySecure" tab (corresponding to the key retention devices 4220, 4420), a "KnoxDock" tab (corresponding to the docking stations 4250), a "Knox eKey" tab (corresponding to the keys 4210), a "Knox eLock Core" tab (corresponding to the lock cores described above), and a "Debug Events" tab. The "Knox eLock Core" tab 4502 is shown selected in the present example. Date and time controls 4504 are user selectable to select audit data within a date and time range. A get records button 4506 can be selected to obtain the audit data for that date and time range.

In response to user actuation of the button 4506, the audit trail data 4510 corresponding to the selected date and time range is shown. This audit trail data 4510 includes several example entries, including an entry 4512 corresponding to an opened event indicating when a lock was opened, and an entry 4514 corresponding to a relocked event corresponding to when the lock was relocked.

The user interface elements shown are merely illustrative examples and can be varied in other embodiments. For instance, any of the user interface elements shown may be substituted with other types of user interface elements. Some examples of user interface elements that may be used include buttons, dropdown boxes, select boxes, text boxes or text fields, checkboxes, radio buttons, toggles, breadcrumbs (for example, identifying a page or interface that is displayed), sliders, search fields, pagination elements, tags, icons, tooltips, progress bars, notifications, message boxes, image carousels, modal windows (such as pop-ups), date and/or time pickers, accordions (for example, a vertically stacked list with show/hide functionality), and the like. Additional user interface elements not listed here may be used.

Further, the user interface 4500 shown may be combined or divided into other user interfaces such that similar functionality or the same functionality may be provided on more screens or user interfaces. Moreover, each of the user interface elements may be selected by a user using one or more input options, such as a mouse, touch screen input (for example, finger or pen), or keyboard input, among other user interface input options.

VII. CONCLUSION

While various embodiments of key and lock circuits have been depicted, the various illustrative logical blocks, modules, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer readable medium such as RAM memory, flash memory, ROM memory, EPROM memory, EEPROM memory, registers, hard disk, a removable disk, a CD-ROM, memory capable of storing firmware, or any other form of computer-readable (e.g., storage) medium known in the art. An example computer-readable medium can be coupled to a processor such that the processor can read information from, and write information to, the computer-readable medium. In the alternative, the computer-readable medium may be integral to the processor. The processor and the computer-readable medium may reside in an ASIC.

Depending on the embodiment, certain acts, events, or functions of any of the processes or algorithms described herein can be performed in a different sequence, may be added, merged, or left out all together. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others. The scope of certain inventions disclosed herein is indicated by the claims rather than by the foregoing description. All changes which come within the meaning and range of equivalency of the claims are to be embraced within their scope.

What is claimed is:

1. A method of detecting a lock state of an electronic lock, the method comprising:
- by an electronic key comprising a hardware processor,
  - receiving a first signal indicating that the electronic lock is in an unlocked state;
  - storing a first time value corresponding to an unlock event time based at least in part on receiving the first signal;
  - transmitting a second signal to the electronic lock indicating that the electronic key is requesting a response from the electronic lock;
  - determining that the electronic lock is in a locked state based at least in part on not receiving a response to the second signal; and
  - storing a second time value corresponding to a lock event time based at least in part on determining that the electronic lock is in the locked state.

2. The method of claim 1, further comprising determining that the electronic lock is in the unlocked state based at least in part on the first signal.

3. The method of claim 1, further comprising transmitting an unlock signal to the electronic lock prior to receiving the first signal.

4. The method of claim 1, further comprising:
- determining a user identifier associated with the electronic key; and
- associating an unlock event with the user identifier and the first time value.

5. The method of claim 1, wherein receiving the first signal comprises receiving the first signal from the electronic lock, and wherein the method further comprises:
- determining an unlock event based at least in part on receiving the first signal from the electronic lock;
- storing first information indicating that determining the unlock event is based at least in part on receiving the first signal from the electronic lock;
- determining a lock event based at least in part on not receiving a response to the second signal; and
- storing second information indicating that determining the lock event is based at least in part on not receiving a response to the second signal.

6. The method of claim 1, wherein the second signal is one of a plurality of heartbeat signals.

7. The method of claim 1, wherein the second signal is one of a plurality of sequential heartbeat signals, and wherein determining that the electronic lock is in the locked state is further based at least in part on not receiving a response to the plurality of sequential heartbeat signals.

8. The method of claim 1, wherein storing the first time value comprises storing the first time value at one or more of a memory of the electronic key or a memory of the electronic lock.

9. The method of claim 1, further comprising storing an indication of a length of time between the unlock event time and the lock event time.

10. The method of claim 1, wherein the unlock event time indicates a time associated with unlocking of the electronic lock and the lock event time indicates a time associated with locking of the electronic lock.

11. The method of claim 1, wherein the unlock event time indicates a time associated with determining that the electronic lock is in the unlocked state and the lock event time indicates a time associated with determining that the electronic lock is in the locked state.

12. The method of claim 1, wherein the electronic key further comprises a power source configured to power the hardware processor.

13. The method of claim 1, further comprising:
- determining an unlock event location in response to receiving the first signal; and
- storing the unlock event location.

14. The method of claim 1, further comprising:
- determining key identification information for the electronic key; and
- associating an unlock event with the key identification information and the first time value.

15. An electronic key comprising:
- a memory configured to store computer-executable instructions; and
- a hardware processor in communication with the memory and configured to execute the computer-executable instructions to at least:
  - receive a first signal from an electronic lock indicating that the electronic lock is in an unlocked state;
  - store a first time value corresponding to an unlock event time based at least in part on receiving the first signal;
  - transmit a second signal to the electronic lock indicating that the electronic key is requesting a response from the electronic lock;
  - determine that the electronic lock is in a locked state based at least in part on not receiving a response to the second signal; and
  - store a second time value corresponding to a lock event time based at least in part on determining that the electronic lock is in the locked state.

16. The electronic key of claim 15, wherein the hardware processor is further configured to execute the computer-executable instructions to at least:
- receive the first signal in response to an actuation of a locking mechanism of the electronic lock.

17. The electronic key of claim 15, wherein the electronic lock is configured to lock an item, wherein the hardware processor is further configured to execute the computer-executable instructions to at least:
- determine that the electronic lock is in the unlocked state based at least in part on receiving the first signal;
- determine a status of the item, wherein the status of the item indicates that the item is opened or closed; and
- store the status of the item.

18. A method of detecting a lock state of an electronic lock, the method comprising:
- by an electronic key comprising a hardware processor,
  - determining that the electronic key is in a first position with respect to the electronic lock;

determining that the electronic lock is in an unlocked state based at least in part on determining that the electronic key is in the first position;

storing a first time value corresponding to an unlock event time based at least in part on determining that the electronic lock is in the unlocked state;

determining that the electronic key is in a second position with respect to the electronic lock;

determining that the electronic lock is in a locked state based at least in part on determining that the electronic key is in the second position; and storing a second time value corresponding to a lock event time based at least in part on determining that the electronic lock is in the locked state.

19. The method of claim 18, wherein the electronic key is unable to be removed from the electronic lock while the electronic key is in the first position.

20. The method of claim 18, wherein determining that the electronic key is in the first position is based at least in part on alignment of one or more elements of the electronic key with one or more elements of the electronic lock.

* * * * *